(12) United States Patent
Chang

(10) Patent No.: US 7,364,070 B2
(45) Date of Patent: Apr. 29, 2008

(54) SYSTEM AND METHOD FOR REAL-TIME REMOTE SHOPPING

(75) Inventor: Seok Kyu Chang, Taejon (KR)

(73) Assignee: Korea Atomic Energy Research Institute, Taejon (KR)

( * ) Notice: Subject to any disclaimer, the term of this patent is extended or adjusted under 35 U.S.C. 154(b) by 433 days.

(21) Appl. No.: 11/109,059

(22) Filed: Apr. 19, 2005

(65) Prior Publication Data

US 2005/0230472 A1    Oct. 20, 2005

(30) Foreign Application Priority Data

Apr. 20, 2004  (KR) .................. 10-2004-0027196
Mar. 2, 2005   (KR) .................. 10-2005-0017203

(51) Int. Cl.
   *G06K 15/00*   (2006.01)
(52) U.S. Cl. ................. 235/383; 235/381; 235/385
(58) Field of Classification Search ............. 235/383, 235/385, 381, 378, 462.01
See application file for complete search history.

(56) References Cited

U.S. PATENT DOCUMENTS

| | | | |
|---|---|---|---|
| 4,929,819 A | 5/1990 | Collins, Jr. | |
| 5,047,614 A | 9/1991 | Bianco | |
| 5,424,524 A | 6/1995 | Ruppert et al. | |
| 5,595,264 A * | 1/1997 | Trotta, Jr. ................. | 186/56 |
| 5,630,071 A | 5/1997 | Sakai et al. | |
| 5,877,485 A | 3/1999 | Swartz | |
| 6,129,276 A | 10/2000 | Jelen et al. | |
| 6,179,206 B1 | 1/2001 | Matsumori | |
| 6,409,086 B1 | 6/2002 | Pellaumail et al. | |
| 6,484,939 B1 | 11/2002 | Blaeuer | |
| 6,659,344 B2 | 12/2003 | Otto et al. | |
| 7,024,378 B2 * | 4/2006 | Razumov .................. | 705/26 |
| 2002/0016715 A1 * | 2/2002 | Razumov .................. | 705/1 |
| 2002/0034168 A1 | 3/2002 | Swartz et al. | |
| 2002/0161658 A1 | 10/2002 | Sussman | |
| 2002/0170961 A1 | 11/2002 | Dickson et al. | |
| 2003/0130909 A1 | 7/2003 | Caci et al. | |
| 2003/0132298 A1 | 7/2003 | Swartz et al. | |

(Continued)

FOREIGN PATENT DOCUMENTS

KR    2000-0000125    1/2000

(Continued)

*Primary Examiner*—Daniel Stcyr
(74) *Attorney, Agent, or Firm*—John K. Park; Park Law Firm

(57) ABSTRACT

A method for real-time remote shopping using a real-time remote shopping system includes the steps of (a) obtaining the commodity information from a hand-held terminal and registering the information on a customer, (b) sending the shopping request information including the commodity information to a host server or a mobile terminal through the wired/wireless communication device, (c) receiving, at the mobile terminal, the shopping request information from the hand-held terminal or the host server, and sending the shopping data processed in real-time to the host server or the hand-held terminal, (d) receiving, at the hand-held terminal, the shopping data from the server or the hand-held terminal, and (e) sending, at the hand-held terminal, a shopping-ended signal to the host server or the hand-held terminal, and paying the price. The hand-held terminal includes a hand-held electronic device of the customer. The system and method can be applied to an internet shopping.

40 Claims, 30 Drawing Sheets

U.S. PATENT DOCUMENTS

2003/0154135 A1 8/2003 Covington et al.
2003/0234288 A1 12/2003 Canipe

FOREIGN PATENT DOCUMENTS

| KR | 2001-0105593 | 11/2001 |
| KR | 2002-0021565 | 3/2002 |
| KR | 20-0319013 | 7/2003 |
| KR | 10-0397257 | 9/2003 |
| KR | 2003-0089045 | 11/2003 |
| KR | 2003-0089683 | 11/2003 |
| KR | 10-2004-0036826 | 5/2004 |
| KR | 10-2004-0091911 | 11/2004 |

* cited by examiner

SYSTEM AND METHOD FOR REAL-TIME REMOTE SHOPPING

CROSS-REFERENCE TO RELATED APPLICATIONS

This application claims benefit under 35 U.S.C. § 119 from Korean Patent Application No. 10-2004-0027196, filed on Apr. 20, 2004, and Korean Patent Application No. 10-2005-0017203, filed on Mar. 2, 2005, the entire content of which is incorporated herein by reference.

BACKGROUND OF THE INVENTION

The present invention relates to a system and method for real-time remote shopping, in which the shopping is performed, in a shopping store with a sample item display section for the shopping customers and a commodity item display section for the store worker. More particularly, this invention relates to a system and method for real-time remote shopping, in which the customer chooses shopping items from the sample item display section using a remote shopping controller (RSC) for a shopping customer, the shopping information is sent to a mobile terminal for store worker through a wired or wireless communication networks, the store worker collects the ordered shopping items according to the received shopping information and sends the results to the RSC, the customer verifies and pays for the shopping items, and the customer finishes the shopping by picking up the shopping items.

The present invention applies generally to off-line or on-line commodity transactions, especially to a large-scale retail distribution industry.

Recently, the retail distribution industry has a trend to be larger and larger from a small retail store or a super market to a shopping mall or a shopping center. Customers want to use or enjoy many kinds of services at facilities including cinema, restaurant, health club, and government service on the same spot as well as the shopping itself. The service providers or the business owners of the large-scale shopping center tries to provide the customers with commodities of high quality and low price, to increase the profit by providing a convenient and enjoyable shopping environment. Until recently for a long time, the customers have carried a shopping cart or a shopping basket around in the store, selected and piled up the shopping items in the shopping cart or basket, proceeded to the cash register, got the casher to scan the bar-code of the items, and paid the price to finish the shopping.

The above-mentioned traditional shopping has problems. To the customers, it is tiresome to push the cart and walk around the large shopping area. Sometimes, the carts become a source of clear danger of getting personal injuries or a source of noise. Most of all, all the shopping items must be unloaded, scanned, loaded again, and then paid at the same cash register, almost all the time, in a long waiting line. The shopping was inconvenient, tiresome, and time-consuming. In the middle of shopping, the customers cannot take any rest in a relaxed environment just because of the bulky shopping carts.

To the store manager, it is also a tough job, onerous and inefficient, to keep checking and tidying up the commodity display, which is being touched and messed by the customers. It takes more staffs to take care of the situations such as missing of or damaging to the displayed or purchased commodity, which usually happens during the customer's shopping.

Recently, some advanced shopping methods using a recognition technology and communication technology to improve the problems of the traditional shopping method have been proposed. In one of them, a customer collects the shopping items in the shopping cart and inputs the information of the shopping items into a wireless terminal with a bar-code reader or RF reader, which the customer can hold on a hand or is installed on a shopping cart, while the shopping information is sent to a server in real-time, and thereby it was possible to simplify the paying procedure in the cash register. With that method, however, it was not easy to check the one-to-one correspondence between the shopping item information in the server and the shopping items in the shopping cart, and it took an extra investment in another checking method or equipments including a special bar-code, X-ray machine, weight-measuring, sample test, surveillance camera to do the necessary checking, which is also not perfect. More than anything else, the method could provoke an undesirable abhorrence from the customers.

Also, the proposed methods include a method, in which a customer collects the information of shopping items with a hand scanner, gets verified for the shopping item list and pays at the counter, and collect/picks up the shopping items at the inventory section, and other method, in which a shopping is performed by collecting the information of shopping items with a wireless terminal having a bar-code reader, sending the shopping list to a server, paying wireless, and then the store's collecting and handing over the shopping items. A problem in these methods is that the customer must wait for a long time after paying while a store worker receives the shopping item list, collects the items, packs the items, and then hands over to the customer. In addition to these, there are problems in applying due to the difficulties in pre-shopping registration, paying, and pick-up.

Accordingly, a need for a system and method for real-time remote shopping has been present for a while and got higher and higher. This invention is directed to solve these problems and satisfy the long-felt need.

SUMMARY OF THE INVENTION

The present invention contrives to solve the disadvantages of the prior art.

An objective of the invention is to provide a system and method for real-time remote shopping, in which a customer shops conveniently using a hand-held remote shopping controller (RSC), a hand-held terminal for customer without any shopping cart or basket.

Another objective of the invention is to provide a system and method for real-time remote shopping, in which by dividing a store into a sample item display section for the customers and a commodity item display section for a store worker, the sample items only are displayed the sample item display section to save the store space and to optimize the shopping environment for the customers and the commodity items are disposed in the commodity display section to optimize storing of the commodities and the worker's working.

Still another objective of the invention is to provide a system and method for real-time remote shopping, in which the store worker receives and handles the customer's order in real-time with a purchase order processing terminal (POPT), a mobile terminal for worker, the customer picks up the shopping items as soon as finishing the shopping without any delay.

Still another objective of the invention is to provide a system and method for real-time remote shopping, in which a store manager manages the store efficiently using the real-time shopping information collected in the server, and the shopping information and the customer information database from the card reader of RSC or an external terminal is used as a marketing data.

Still another objective of the invention is to provide a system and method for real-time remote shopping, in which a possibility of a loss of or damage to the shopping items is eliminated since customers shop with RSC in the sample item display section and do not have to carry around the shopping items with them.

Still another objective of the invention is to provide a system and method for real-time remote shopping, in which an online shopping featuring purchase by reservation, a same-day purchase/delivery is provided by uploading the same contents of the sample item display section onto the Internet cyber space.

For the invention, an information reading and decoding technology is applied in order to recognize and take in machine-readable information. The machine-readable information includes a bar-code, an RFID (radio frequency identification) tag, and a shape or means machines can read. The information to read includes commodity or service information, personal information, and device information. The recognizing or reading of the information is accomplished in wired or wireless communication including cable, optical means, laser, and RFID technology.

Also, a bilateral wired or wireless communication technology is applied for the flow of the information received, manipulated or produced. A wired or wireless LAN is used for the communication between the fixed or mobile terminals in the store and the server, and WAN (wide-area network) or the Internet is used for the communication between the store and an external server or machines. For the wireless communication of the mobile terminals inside the store, RF communication, IR communication, or Blue Tooth technology is used.

In another embodiment, a method for real-time remote shopping using a real-time remote shopping system having a first building space including a sample item display section, a second building space including a commodity item display section, a first terminal for communicating a shopping information in the first building space, and a second terminal for communicating the shopping information in the second building space, includes steps of (a) obtaining the shopping information with the first and second terminals, (b) processing the shopping information with the first and second terminals to produce a shopping data, and (c) communicating the shopping information and the shopping data among the first terminal and the second terminal.

More specifically, the system includes (1) a hand-held terminal for customer in a sample item display section including a device for registration and pay, a device for obtaining a commodity information, and a communication device to communicate a shopping request information with other corresponding terminals, (2) a mobile terminal for worker in a commodity item display section including a communication device to communicate the shopping request information with other corresponding terminals and a device to obtain a commodity information, and (3) a host server including a wired/wireless communication device relaying the shopping request information between the terminals and providing a derived information to the terminals.

The method includes the steps of (a) obtaining the commodity item information from the hand-held terminal for customer and registering the information on the customer, (b) sending the shopping request information including the commodity item information to the host server or the mobile terminal for worker through the wired/wireless communication device, (c) receiving, at the mobile terminal for worker, the shopping request information from the hand-held terminal for customer or the host server, and sending the shopping data processed in real-time to the host server or the hand-held terminal for customer, (d) receiving, at the hand-held terminal for customer, the shopping data from the server or the hand-held terminal for customer, and (e) sending, at the hand-held terminal for customer, a shopping-ended signal to the host server or the hand-held terminal for customer, and paying the price.

Each of the hand-held terminal and the mobile terminal for worker has its own proper identification information including identification number or owner's credit information. The host server produces and assigns an additional identification number to the hand-held terminal and the mobile terminal for worker during the wired or wireless communication. And the host server recognizes the hand-held terminal and the mobile terminal for worker by the proper identification information or by the additionally produced/assigned identification number.

The host server checks the version of the commodity information file stored in the built-in memories of the hand-held terminal and the mobile terminal for worker and upgrades with a latest version.

The hand-held terminal and the mobile terminal for worker are switched on automatically or manually, boot up, and display a predetermined initial screen when detached from the charging stations.

The host server issues an alarm to request starting operation to the mobile terminal for worker on the POPT charging station, when the host server detects the detachment of the hand-held terminal for customer from the RSC charging station or receives the personal or credit information of the hand-held terminal. The host server recognizes the identification numbers of the hand-held terminal, the mobile terminal for worker, and cart, and establishes a shopping unit with the set of the identification numbers. And the host server receives the personal or credit information from the hand-held terminal, categorizes the customer into new, present, or anonymous, produces a shopping information customized to the customer, and sends the shopping information to the hand-held terminal.

The commodity information displayed on the hand-held terminal for customer to verify is retrieved from the built-in memory of the hand-held terminal, from the database of the host server, or from the bar-code or RF tag on the sample item.

The mobile terminal for worker having an alarm device receives a purchase orders of commodity items, including changing and canceling, issues an alarm, and displays the shopping item list on the mobile terminal for worker.

The inputting the commodity information into the mobile terminal for worker is allowed under the condition that the commodity information matches with the information on the commodity items, including changing and canceling, received from the hand-held terminal for customer, and the processed result of the information on the commodity items, including changing and canceling, is sent in real-time to the hand-held terminal for customer.

When the hand-held terminal for customer sends out the shopping-ended message the host server issues message-received alarm to the hand-held terminal for customer, the mobile terminal for worker sends a cart's waiting-at-exit message to the hand-held terminal for customer, the host server sends a pay-requesting message to the hand-held terminal for customer, and the hand-held terminal for customer sends a pay-approved message to a host server through a wired or wireless communication network.

On receiving the pay-approved message the host server sends a receipt or an identification number of a cart for picking up of items to the hand-held terminal for customer.

The hand-held terminal for customer is rented in the sample item display section, and the method includes the steps of (1) charging the hand-held terminal for customer and the mobile terminal for worker on respective charging stations, and upgrading the commodity information in the hand-held terminal for customer and the mobile terminal for worker on the same charging stations, where the charging station includes a charging port and a server interface, where a battery in the hand-held terminal for customer or the mobile terminal for worker is charged by the charging port, where the commodity information on the terminal memory built in the hand-held terminal for customer or the mobile terminal for worker is checked and upgraded with the latest version of the commodity information by the host server, (2) starting the hand-held terminal for customer or the mobile terminal for worker before shopping and setting as a shopping unit with an identification number, on detaching from the RSC or POPT charging station, where the hand-held terminal for customer detached from the RSC charging station is started automatically or manually and initialized, where the host server recognizes the hand-held terminal for customer detached from the RSC charging station and issues an alarm to the POPT charging station in the commodity item display section, where the mobile terminal for worker detached from the POPT charging station is started automatically or manually and initialized, where the identification number of a cart is inputted into the mobile terminal for worker installed automatically or manually on the cart and sent to the host server, (3) selecting paying method and recognizing a customer, including categorizing the customer into new, present, or anonymous, by the host server, producing a shopping information customized to the customer, and sending the shopping information to the hand-held terminal for customer, (4) taking and verifying the commodity information including bar-code or RFID tag, including inputting the commodity information and the amount into the hand-held terminal for customer including a bar-code/RF reader, (5) requesting and transacting shopping, including sending the purchase orders on commodity list, including changing and canceling, that inputted into the hand-held terminal for customer, to the host server or the mobile terminal for worker, issuing an order-received alarm on receiving orders at the mobile terminal for worker in the commodity item display section, and collecting, including changing the amount or removing, the ordered items in the cart, inputting the information on the collected items, and sending the transaction results to the hand-held terminal for customer, (6) ending shopping and paying, including sending the shopping-ended message to the hand-held terminal for customer, the mobile terminal for worker's issuing an message-received alarm, finishing the shopping in process, moving the cart to the commodity item display section exit, the host server's sending the pay-requesting message according to the selected paying method to the hand-held terminal for customer, sending the paying-by-credit approval message to the host server in the case of paying by credit, the host server's sending a counter-guide message to the hand-held terminal for customer in the case of paying by cash, recognizing the hand-held terminal for customer connected to the communication network at the counter, inputting the 'paid' message at the counter terminal with paying by cash, and (7) picking up the shopping commodity and retrieving the shopping equipments by switching off and returning to the respective charging stations for the next usage, where the host server sends the identification number of the cart to the hand-held terminal for customer to pick up the shopping commodity, the mobile terminal for worker on the shopping cart that moved to the commodity item display section exit sends a waiting message to the hand-held terminal for customer, and the customer proceeds to the pick-up window, picks up the shopping commodity on showing the cart identification number.

Also, the hand-held terminal for customer includes a hand-held electronic device owned personally by the customer. Then, the shopping method includes steps of (1) storing and upgrading the personal or credit information in the hand-held terminal, where the hand-held electronic device takes and stores the personal and credit information through an input means including a keypad or a card reader or by wired or wireless accessing of a related database, and the hand-held electronic device downloads or upgrades the commodity information through the wired or wireless communication network, (2) charging and upgrading the commodity information of the mobile terminal for worker on the POPT charging station including a charging port and a server interface, where a battery in the hand-held electronic device is charged by the charging port, and the commodity information on the memory built in the hand-held electronic device is checked and upgraded with the latest version of the commodity information by the host server, (3) starting the hand-held electronic device before shopping and setting a shopping unit with an identification number, where when the hand-held electronic device is switched on and sending the personal and credit information to the host server, the host server recognizes the hand-held electronic device and issues an alarm to the POPT charging station in the commodity item display section, and a mobile terminal for worker recognized by the host server is switched on automatically or manually and initialized, and the identification number of a cart is inputted into the mobile terminal for worker installed on the cart automatically or manually and sent to the host server, (4) providing the customer with a pre-shopping guide, where the host server searches for the credit information and purchase history of the customer, producing the information on service and shopping customized for the customer, and sends the information to the screen of the hand-held electronic device through the wired or wireless communication network inside the store, (5) taking and verifying the commodity information, including inputting the commodity information and the amount of the item to shop with the hand-held electronic device having bar-code or RFID tag reader and verifying the detailed information including commodity information by retrieving from the built-in memory of the hand-held electronic device or from the database of the host server and displaying at the screen of the hand-held terminal for customer, (6) requesting and transacting shopping, including sending the purchase orders on commodity list, including changing and canceling, that inputted into the hand-held electronic device, to the host server or the mobile terminal for worker, issuing an alarm on receiving orders at the mobile terminal for worker in the commodity item display section, and collecting, including changing the amount or removing, the ordered items in the cart, inputting the information on the collected items, and sending the transaction results to the hand-held electronic device, (7) ending shopping and paying, including sending the shopping-ended message to the hand-held electronic device, the mobile terminal for worker's issuing an message-received alarm, finishing the shopping in process, moving the cart to the commodity item display section exit, the host server's sending the pay-requesting message to the hand-held electronic device, and the hand-held electronic device's sending pay approval message to the host server, and (8) picking up the shopping commodity and retrieving the mobile terminal for worker by switching off and returning to the POPT charging station for the next usage, where the host server sends the identification number of the cart to the hand-held electronic device to pick up the shopping commodity, the mobile terminal for worker on the shopping cart that moved to the commodity item display section exit sends a waiting message to the hand-held terminal for customer, and the customer proceeds to the pick-up window, picks up the shopping commodity on showing the cart identification number.

In still another embodiment, a system for real-time remote shopping includes a first building space including a sample item display section, a second building space including a commodity item display section, a first terminal for communicating a shopping information in the first building space including a hand-held terminal for customer, and a second terminal for communicating the shopping information in the second building space including a mobile terminal for worker, where the first and second terminals communicate the shopping information with each other to perform a remote shopping in real-time.

The system further includes a host server including a wired/wireless communication device relaying the shopping information between the first and second terminals and providing a derived information to the first and second terminals.

More specifically, the system includes (a) a hand-held terminal for customer in a sample item display section including a device for registration and pay, a device for obtaining a commodity information, and a communication device to communicate a shopping request information with other corresponding terminals, (b) a mobile terminal for worker in a commodity item display section including a communication device to communicate the shopping request information with other corresponding terminals and a device to obtain a commodity information, and (c) a host server including a wired/wireless communication device relaying the shopping request information between the terminals and providing a derived information to the terminals.

The sample item display section includes (a) a sample item with an electronically readable commodity information attached, (b) a sample item display rack, (c) a wired or wireless communication network for exchanging information between wired or wireless terminals in the store, (d) a charging station for charging a battery of the hand-held terminal and accessing the host server, and (e) a customer terminal and a counter terminal connected to the wired or wireless communication network for processing the shopping task of the customer and the worker.

The commodity item display section includes (a) a commodity item with an electronically readable commodity information attached, (b) a commodity item display rack, (c) a wired or wireless communication network for exchanging information between wired or wireless terminals in the store, (d) a charging station for charging a battery of the mobile terminal for worker and accessing the host server, (e) a plurality of shopping carts; and (f) a store terminal connected to the wired or wireless communication network for processing the shopping task of the worker.

The host server includes (a) a computer for relaying transmission and reception of the shopping information between the wired or wireless terminals in the store and analyzing and manipulating the accumulated commodity information and shopping information, (b) a data storing device for storing the shopping information and customer information and providing the commodity information and shopping information to the customer, (c) a wired or wireless communication network for exchanging the information among the wired or wireless terminals, and (d) an Internet for a data communication with an external device outside of the store.

In order to register and pay, obtain a commodity information, and to communicate a shopping request information with other corresponding terminals, the hand-held terminal for customer includes (a) a bar-code or RF reader for inputting the commodity information of the sample item in the sample item display section, (b) a card reader in a type of magnetic-tape or RF recognition for inputting information on the customer's credit card or membership card, (c) an RF or IR transceiver for a wireless data communication with the host server or the mobile terminal for worker, (d) an interface for a wired data communication with the host server, (e) a control device and output device including a keypad, a touch (pen) screen, and LCD panel, (f) a power supply or charging device including a battery and charging port, (g) a central processing unit for operating and controlling the system, (h) a memory device for storing software and data for operating the system, and (i) an alarming device for representing the status of operation with sound and light.

The hand-held terminal for customer includes a hand-held terminal, where the hand-held terminal normally works with original functions and works as an hand-held terminal for customer when shopping in the sample item display section of the store, where the hand-held terminal includes a central processing unit for original functions and a plurality of auxiliary devices including a data storing device, an output device, a control device, a power supply device, and an alarm sound/light device, where the hand-held terminal is combined with a built-in or external module including a central processing unit for original functions the hand-held terminal for customer and a plurality of auxiliary devices including a host server, a data communication device for communicating with the mobile terminal for worker, and a data scanning device for obtaining the commodity information and credit information, where the hand-held terminal shares the auxiliary devices including a data storing device, an output device, a control device, a power supply device, an alarm sound/light device.

The mobile terminal for worker performing a shopping operation including obtaining of a commodity information and communicating the shopping information with a corresponding terminal, includes (a) a bar-code or RF reader for inputting the commodity information of the commodity item in the commodity item display section, (b) an RF or IR transceiver for a wireless data communication with the host server or the hand-held terminal, (c) an interface for a wired data communication with the host server, (d) a control device and output device including a keypad, a touch (pen) screen, and LCD panel, (e) a power supply or charging device including a battery and charging port, (f) a central processing unit for operating and controlling the system, (g) a memory device for storing software and data for operating the system, (h) a message-received alarm device including an alarm lamp or buzzer to acknowledge a reception of a message from the host server or the hand-held terminal, and (i) an alarming device for representing the status of operation with sound and light.

The charging station includes a charging port for charging the battery of the terminals and a server interface for a wired communication with the host server, where the charging station further includes an alarm device for informing the operation request of the mobile terminal for worker.

The wired communication network includes auxiliary devices including a wireless LAN interface, an interface to the hand-held terminal for customer, a customer terminal, a counter terminal, a store terminal, a printer, a card reader, and an RF reader at an end, and performs a wired or wireless communication among the host server and the auxiliary devices Each of the hand-held terminal for customer and mobile terminal for worker includes an original identification information including an identification number and owner's credit information, where the host server produces a new additional identification number from the original identification information and assigns the new additional identification number in a wired or wireless communication with the hand-held terminal for customer or the mobile terminal for worker, where the host server recognizes a specific hand-held terminal for customer or mobile terminal for worker by the new additional identification number.

The host server checks the version of the commodity information file stored in the built-in memories of the hand-held terminal for customer, and the mobile terminal for worker and upgrades with a latest version.

The hand-held terminal for customer, and the mobile terminal for worker are switched on automatically or manually, boot up, and display a predetermined initial screen when detached from the charging stations.

The host server issues an alarm to request starting operation to the mobile terminal for worker on the POPT charging station, when the host server detects the detachment of the hand-held terminal for customer from the RSC charging station or receives the personal or credit information of the hand-held terminal for customer.

The host server recognizes the identification numbers of the hand-held terminal for customer, the mobile terminal for worker, and cart, and establishes a shopping unit with the set of the identification numbers. The host server receives the personal or credit information from the hand-held terminal, categorizes the customer into new, present, or anonymous, produces a shopping information customized to the customer, and sends the shopping information to the hand-held terminal for customer.

The commodity information displayed on the hand-held terminal for customer to verify is retrieved from the built-in memory of the hand-held terminal for customer, from the database of the host server, or from the bar-code or RF tag on the sample item.

The mobile terminal for worker having an alarm device receives a purchase orders of commodity items, including changing and canceling, issues an alarm, and displays the shopping item list on the mobile terminal for worker.

The inputting the commodity information into the mobile terminal for worker is allowed under the condition that the commodity information matches with the information on the commodity items, including changing and canceling, received from the hand-held terminal for customer, and the processed result of the information on the commodity items, including changing and canceling, is sent in real-time to the hand-held terminal for customer.

When the hand-held terminal for customer sends out the shopping-ended message the host server issues message-received alarm to the hand-held terminal for customer, the mobile terminal for worker sends a cart's waiting-at-exit message to the hand-held terminal for customer, the host server sends a pay-requesting message to the hand-held terminal for customer, and the hand-held terminal for customer sends a pay-approved message to a host server through a wired or wireless communication network.

On receiving the pay-approved message the host server sends a receipt or an identification number of a cart for picking up of items to the hand-held terminal for customer.

The system further includes an Internet VR (virtual reality) shopping mall connected the host server through a wired or wireless Internet for an Internet shopping, where the Internet VR shopping mall displays VR commodities corresponding to the commodity in the sample item display section, where a customer accesses the Internet VR shopping mall with a computer or a wireless hand-held communication device and sends the shopping-request information to the host server, where the host server sends a collect-shopping-item message with a shopping order information from the customer to the mobile terminal for worker before a preferred shipping date, where the mobile terminal for worker takes the commodity information, collects the ordered shopping items, downloads a receipt and a shipping information, prints out in a printer, attaches the receipt and the shipping information on a shipping box, and sends out the shipping box.

The system further includes a sample item display rack and a weighing machine with a function of printing a commodity information inside the sample item display section, and a conveyor system 996 connected to the commodity item display section, for providing a sales service combined with a customer's self-packing, where an Internet shopping is provided by measuring the packed shopping item with the weighing machine, attaching the commodity information including name of item, weight, and shopping time printed by the weighing machine, inputting and sending the commodity information, moving the shopped items to the commodity item display section with the conveyor system 996, having the customer to collect the items corresponding to the commodity information the mobile terminal for worker received in the cart.

The host server includes a module to analyze the shopping pattern of the customer using the customer's shopping history and a module to produce and send out to the customer a list of commodity the customer is expected to purchase or to provide the list of commodity to the hand-held terminal for customer through the internal communication network.

The system includes a customer terminal, a hand-held terminal interface, a card reader, a printer, and auxiliary devices in the sample item display section, where the system further includes a store terminal and a printer in the commodity item display section, where the shopping is done by (a) the customer's determining shopping items by searching the commodity information that the host server provided, or by searching the accumulated commodity list obtained by connecting the hand-held terminal for customer to the hand-held terminal interface, (b) the customer's approving the paying of the ordered items by inputting the credit card information through the card reader or by sending the credit information stored in the hand-held terminal for customer connected to the host server, (c) the host server's recognizing the mobile terminal for worker that was detached from the charging station and installed on the cart, and sending the order number and the shopping list of the customer to the mobile terminal for worker, (d) the mobile terminal's collecting the ordered items and inputting the commodity information, and sending the shopping-ended message to the host server, (e) the host server's sending the shopping-ended message to hand-held terminal for customer, and attaching the order information printed by the printer on the package box, and (f) the customer's displaying the order number and picking up the package box at the commodity pick-up window.

Each of the hand-held terminal for customer, and the mobile terminal for worker includes a paging device to talk with a store clerk and the paging device is installed at a plurality of locations in the store.

The hand-held terminal includes an RFID tag storing an identification information of hand-held terminal, where the system further includes a plurality of RF readers at predetermined locations and the entrance of the store, where the customer's location is tracked down and a movement outside of the store is monitored by reading the identification information of the hand-held terminal with the RF reader.

The advantages of the present invention are: (1) The system and method provides a safe and convenient shopping environment by eliminating the shopping cart-related injury or noise; (2) The customers can enjoy the other neighboring facility (cinema, restaurant, health club, etc) even during the shopping; (3) The paying procedure is simplified because the customer can verify and pay by credit card with the RSC.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

In the remote shopping system and method of the invention, the store is divided into two sections; a sample item display section 100 and a commodity item display section 200. A customer shops using a RSC that reads in the shopping item information, send/receives the shopping order and related information to/from the host server or the corresponding terminal. A store worker collects the shopping items and hands over the collected items to the customer at the end of shopping using a mobile terminal for worker that reads in the shopping item information, send/receives the shopping order and related information to/from the host server or the corresponding terminal. In the system and method of the invention, the transfer of shopping information between the customer and the store worker is achieved in real-time and bilaterally, and there is no time delay between the shopping decision and the collection of shopping items.

Figure 1:
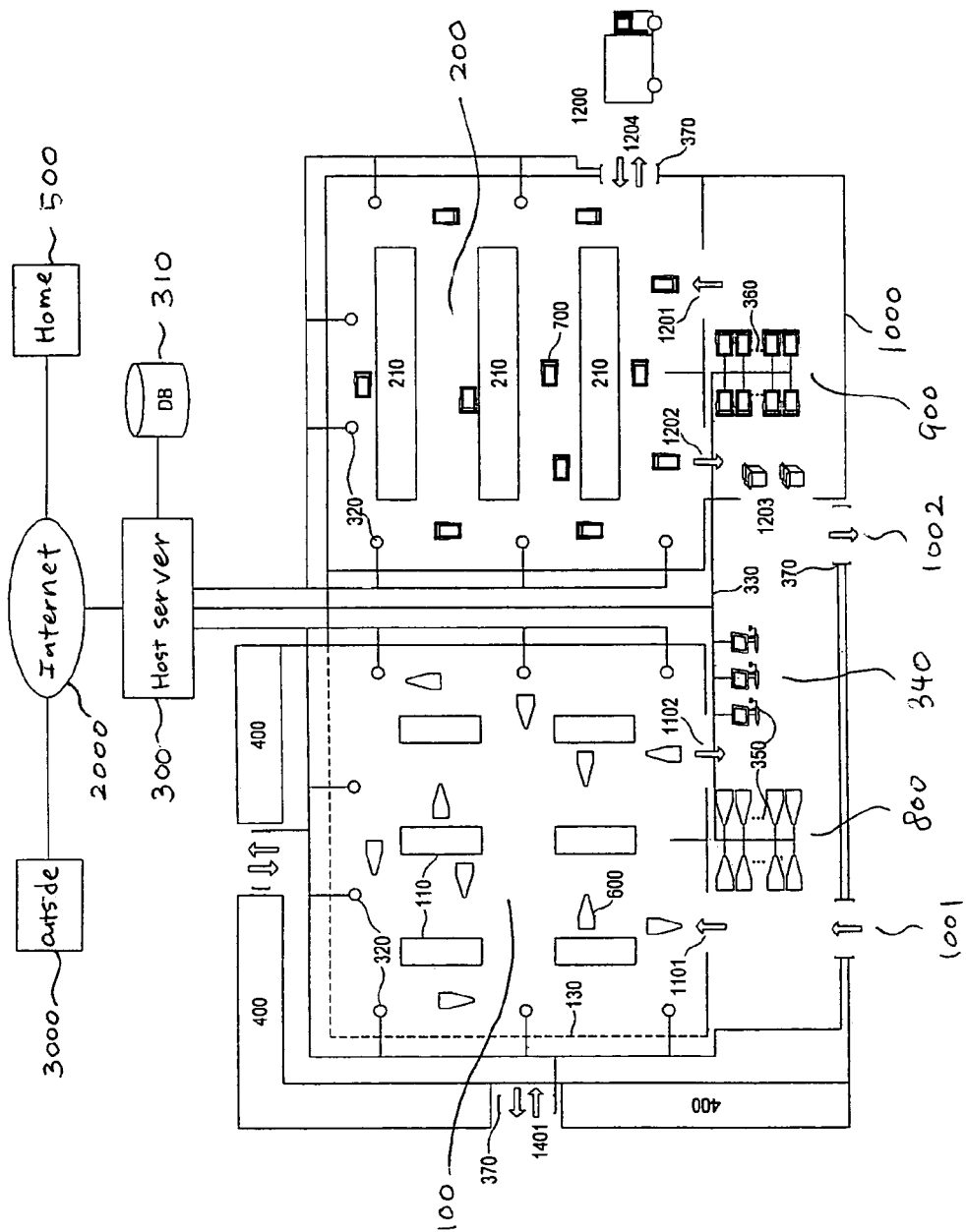
FIG. 1 is a perspective diagram of the store showing the concept of the shopping according to the invention.

FIG. 1 shows a schematic diagram of the store showing the concept of the shopping with a wireless recognition system.

A shopping center 1000 is divided into a sample item display section 100 and a commodity item display section 200 along with other service-providing facilities 400 including cinema, restaurant, and health club.

The shopping center 1000 is managed by a host server 300. The host server 300 is connected to the fixed and mobile terminals through a wired or wireless communication network, controls the flow of the shopping related information, and also connected to an external server or devices through a wired or wireless communication networks, and controls the flow of the other information with an external customer, finance company, and other shopping store. Preferably, all the shopping information is collected through a wireless LAN 320 and a wired communication network 330 and processed by the host server 300, and the information is exchanged with the outside of the store including customer and finance company through the Internet 2000.

The customer detaches a RSC 600 from a RSC charging station 800, and scans the information including bar-code and RFID tag of items displayed in the sample item display section 110, and sends the shopping information to the POPT 700 through the host server 300 and the wireless LAN 320.

While she or he shops or after, the customer can use the other neighboring facilities 400 such as cinema, restaurant, health club. If in the middle of shopping, the customer can stop the RSC 600 temporarily. If just finished shopping, the customer can return the RSC 600, but pick up the shopping items later. The store manager installs an RF reader 370 at the entrance 1001, exit 1002, and the gate of the neighboring facilities 1401, and detects an exit of the RSC 600 with a RFID tag in order to keep the customer from going out of the store with the RSC 600 with her or him. Meanwhile, another customers without a RSC 600 are allowed at the gates 1001, 1002, 1401, 1101, 1102 to walk around the shopping center 1000 for an eye-shopping at the sample item display section 100 or to use the neighboring facilities 400. The sample item display section 100 is delimited by the gates and walls, and part of the walls can be open to the neighboring facilities 400.

A store worker in the commodity item display section 200 checks the shopping information sent from the POPT 700 the customer carries, scans into the POPT 700 the commodity information including bar-code or RF tag and collects the items into a shopping cart from the commodity item display rack 210, and sends back to the RSC 600 of the customer for verification through the wireless LAN 320.

On finishing the shopping, the customer notifies the host server 300 of finishing of the shopping, pay online by inputting the credit card information into the RSC 600 or pay in cash at the counter 340. After paying, the customer receives a pick-up number from the host server 300, picks up the shopping items at the commodity item display section exit 1203, and returns the RSC 600. The returned RSC 600 and the POPT 700 are set and charged on the respective charging stations 800, 900 for the next user.

The shopping items ordered to the host server 300 by a customer 500 outside of the store through the Internet 2000 are collected in the commodity item display section 200, and shipped to a vehicle 1200 on time when the customer 500 has chosen.

The items for the stock enter the shopping center 1000 through the commodity item shipping entrance/exit 1204, and the related information such as the amount and the kinds of items is read at the RF reader 370 installed at the entrance/exit 1204, and collected and handled by the host server 300.

The RSC 600 and the POPT 700 are mobile and scan and input machine-readable information into devices. The machine-readable information includes bar-code, an RFID (radio frequency identification) tag, and a shape or means machines can read. The information to read includes commodity or service information, personal information, and device information. The recognizing or reading of the information is accomplished in wired or wireless communication including cable, optical means, laser, and RFID technology. To recognize or detect the commodity information, a bar-code, RFID tag, or transponder is used.

The bar-code is a machine-readable representation of information usually in the widths and spacings of printed parallel lines, and is used widely to store the information on name of commodity, content, price, etc. There are two types of bar-code; CCD type and laser type. Both types can be applied to the invention.

Other method to recognize or detect the commodity items is an RFID tag method, the tag or transponder in which includes a memory, an antenna, and driving circuit. The RFID tag method is currently very popular because of its large memory capacity, long detection range, and flexibility for wide range of application. The RFID tag (transponder) is detected by an RF reader. That is, if the RF reader applies RF power to the RFID tag, the information in the tag is sent to the RF reader. In the invention, an RF reader can be used instead of a bar-code reader for the commodity with RFID tag.

The RSC 600 includes a function to recognize or detect the customer information including the credit card or membership card information. There are two major methods to recognize a card; magnetic tape type and RF tag type. The present invention includes a magnetic tape card reader or RF tag card reader as an RSC built-in card reader.

In the present invention, the RSC 600 and the POPT 700 exchange the commodity information and the shopping progress information with the host server 300 wirelessly.

Any type of wireless communication method can be applied to the present invention for the communication between the host server 300 and the mobile terminals 600, 700 in the store. One of the method is a wireless LAN, in which the wireless terminal 600, 700 and the host server 300 exchange data using an electromagnetic wave of radio frequency (RF) or infrared (IR). The wireless LAN system includes a backbone LAN, a plurality of access points with RF or IR transceiver, and mobile terminals (notebook PC or hand-held terminals with a built-in receiver). The user with a mobile terminal can have a data communication with the host server or the other mobile terminal inside an area covered by a transceiver. The electromagnetic wave of RF range is better in penetrating obstacles and directional propagation than that of IR. The range of RF type is about 30 to 150 meters.

Figure 2:
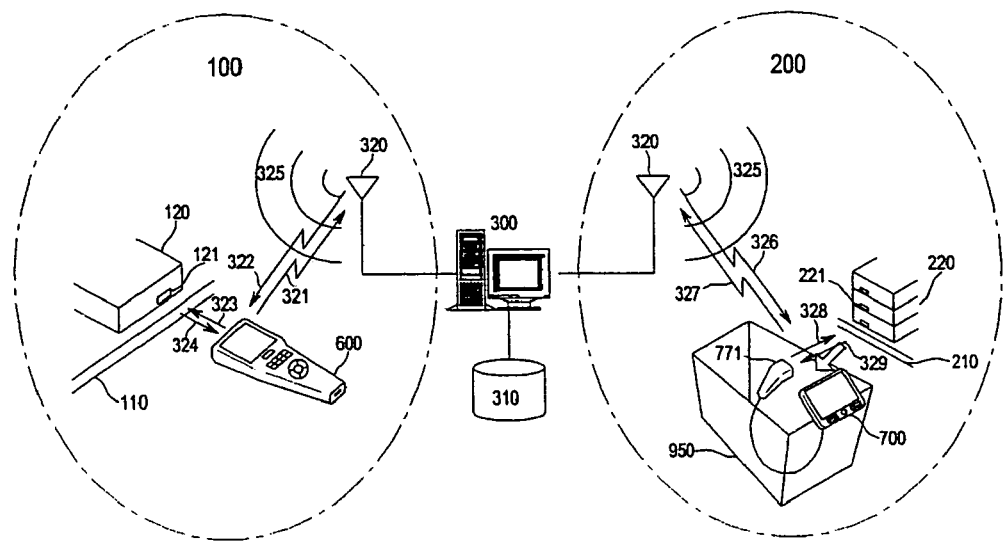
FIG. 2 is a concept diagram of remote shopping showing selecting a shopping item in the sample item display section with the RSC and collecting the shopping item in a shopping cart with the POPT in the commodity item display section.

FIG. 2 is a schematic diagram showing how to collect the shopping items in shopping.

The customer shops with the RSC 600 on the sample items 120 on the sample item display rack 110 in the sample item display section 100. The RSC 600 recognizes the commodity information by a bar-code or an RFID tag attached on the items. The commodity information is read in 323, 324 by approaching the RSC 600 with a bar-code or RF reader to the bar-code or the RFID tag 121 of the commodity and pressing a button. The information read from the bar-code is decoded with a decoder, used to retrieve a corresponding commodity information from the memory of the RSC 600, and displayed on the LCD screen. The information read from the RFID tag is directly displayed on the LCD screen of the RSC 600. The information read from the bar-code can be sent wirelessly to the host server 300 through an RF transceiver built in the RSC 600 to conjure up the corresponding commodity information from the database 310 and to send back to the RSC 600. The customer verifies the commodity information on the LCD screen of the RSC 600 and chooses purchase or cancel. In the case of purchasing, the shopping order is sent to the POPT 700 in the commodity item display section through the transceiver of the RSC 600 and then the host server 300 when the customer choose to purchase by pressing a corresponding menu button on the screen.

On receiving the shopping information, the POPT 700 operates a order-received alarm in sound or light. And, a store worker checks the shopping item displayed on the screen of the POPT 700, moves a shopping cart 950 installed with the POPT 700 to the commodity item display rack 210, and collects the shopping item 220 in the shopping cart 950. The information 221 of the collected item 220 is read 328, 329 by the bar-code or RF reader 701, and the decoded information is sent wirelessly to the RSC 600 of the customer through the transceiver built in the POPT 700. The customer receives from the POPT 700 and verifies the processed result of the shopping. If she or he wants to cancel a certain item, the customer selects the item from the commodity list stored in the RSC 600, and presses the corresponding button. Then, the POPT 700 receives the cancel message, the store worker removes the cancelled item from the shopping cart 950, and the result is sent out to the RSC 600 of the customer.

The commodity item display section 200 is designed to be able to process the shopping order information and the shipping and handling in real-time. Preferably, the disposition of the sample item display rack and the display order or location of the sample items in the sample item display section 100 is identical or symmetrical with those in the commodity item display section 200, so that the line of work becomes efficient as the motion line of the store worker is similar to that of the customer. Also, in a large-scale of shopping center, a conveyor belt system 996 can be installed in the commodity item display section 200 to automatize the transportation of the shopping cart or shopping items.

Figure 3:
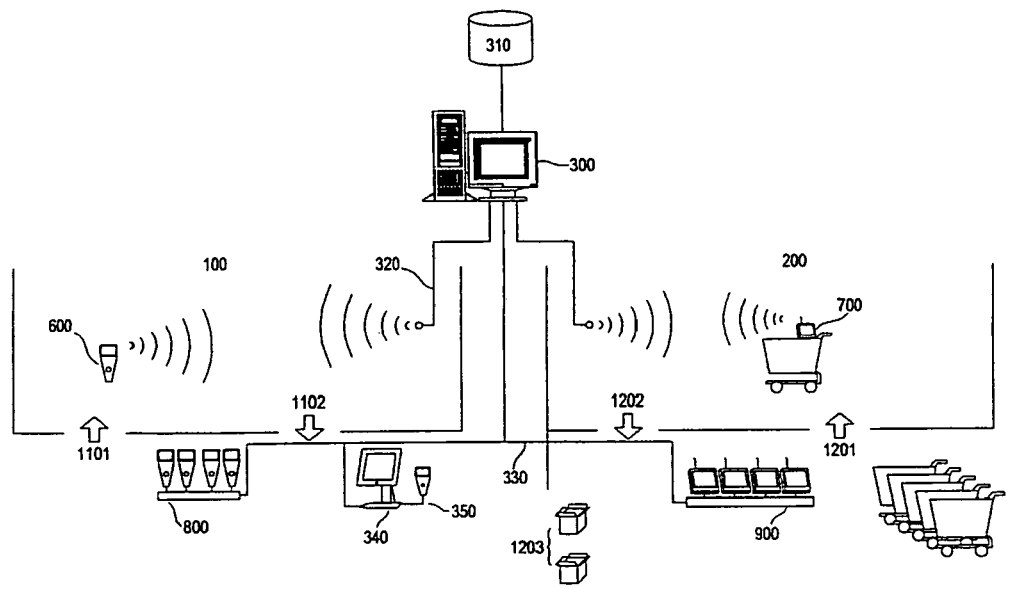
FIG. 3 is a concept diagram showing the start and finish of the operation of POPT according to the start and finish of the operation of the RSC and the connection by the server.

FIG. 3 is a schematic diagram showing the start and the finish of shopping.

The menu on the screen asks the worker to input the identification number of the shopping cart 950, and the inputted identification number is sent to the host server 300.

The customer presses the finish button on the LCD screen of the RSC 600 when finished shopping, and sends the message to the POPT 700 through the host server 300. The store worker gets to know the finish of shopping seeing the message from the RSC 600, moves the shopping cart 950 to the commodity item display section exit 1202, and sends a message to inform the customer of the waiting of the shopping cart 950 at the exit. The POPT 700 is restocked on the charging station 900 for the next user while it is switched off and its original identification number is recognized by the host server 300. Upon a request from the RSC 600, the customer who finished shopping pays for the shopping in a way that she or he has chosen in the beginning of shopping. For the case of paying in a credit card, the customer finishes paying by authorizing the paying and sending the information to the host server 300. For the case of paying in cash, the customer proceeds to the counter 340 and connects the RSC 600 to the server interface 350 in order for the host server to recognize the identification of the RSC 600, and then the cashier at the counter 340 receives the cash and sends the information to the host server 300. On verifying that it has been paid, the host server 300 sends to the RSC 600 the original identification of the shopping cart 950 which the collected shopping items are loaded in. The customer who wants a receipt connects the RSC 600 to the counter terminal 340, downloads the information on the receipt, and prints out the receipt. The customer proceeds to the commodity pickup window 1203 with the receipt or the RSC 600 having the information on pickup including the original identification number of the shopping cart, shows the receipt, picks up the shopping item, and returns the RSC 600. The RSC 600 is switched off automatically or manually.

(1) RSC, Remote Shopping Controller

The remote shopping controller 600 in the present invention is a hand-held terminal for reading a commodity information, communication a shopping order or related information with the POPT 700 or the host server 300, registering the customer, paying etc. in order to realize the real-time remote shopping. An embodiment of the RSC 600 may have various shape, outlook, and functions.

Figure 4:
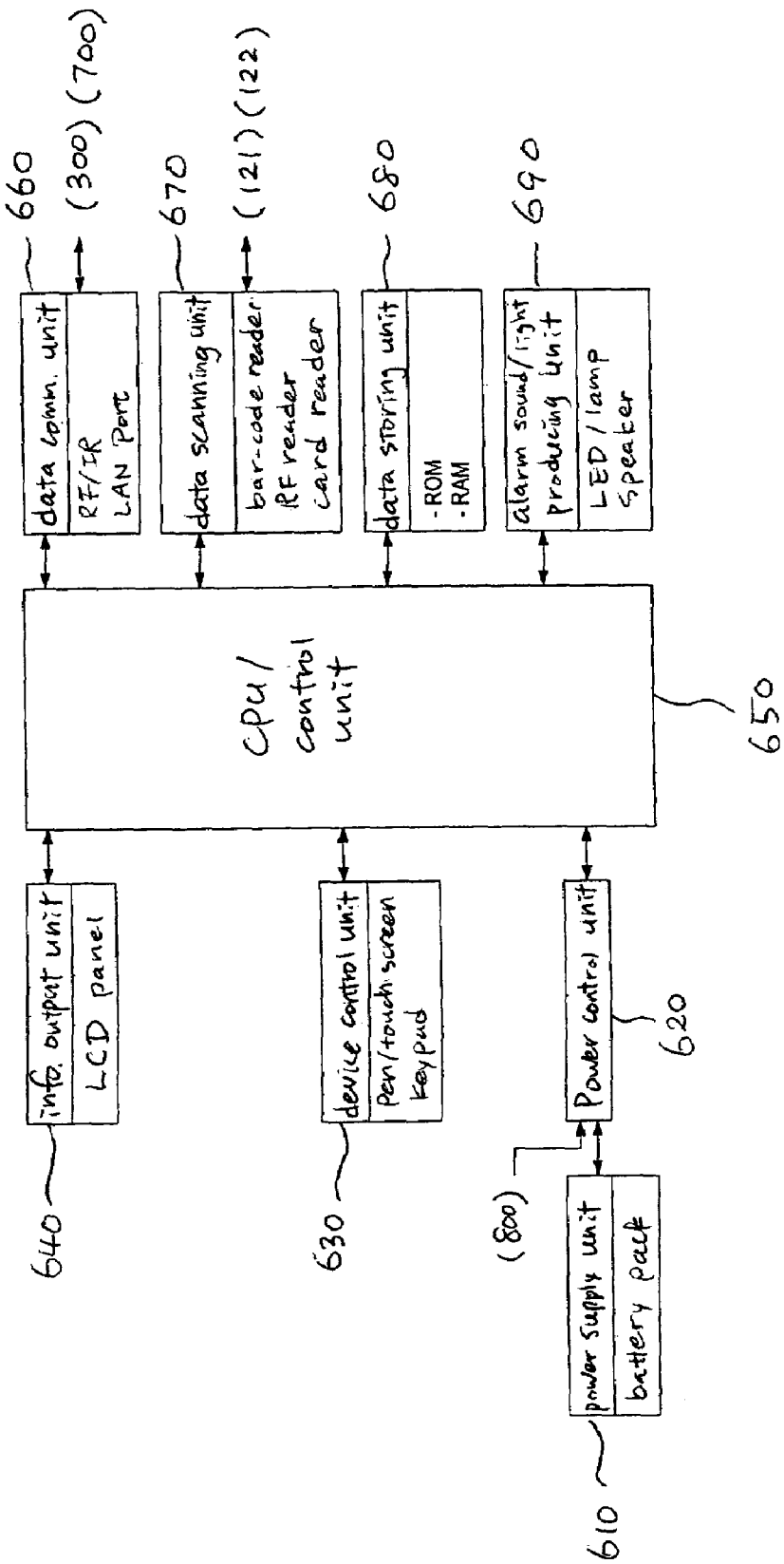
FIG. 4 is a block diagram of internal circuitry of the RSC.

FIG. 4 shows a block diagram of internal circuitry of the RSC 600. The RSC 600 includes a power supply unit 610, a power control unit 620, a device control unit 630, an information output unit 640, a CPU 650, a data communication unit 660, a data scanning unit 670, a data storing unit 680, and an alarm sound/light producing unit 690.

The power supply unit 610 includes a battery to supply electric power to each unit of the RSC 600 while the RSC is moving off the external power source. The battery includes nickel-cadmium (Ni—Cd), lithium ion (Li-Ion), and lithium polymer (LiPo) batteries, and they are rechargeable by the RSC charging station 800 from the wall outlet.

The power control unit 620 rectifies the electric power from the RSC charging station 800 to supply stable voltage. While the RSC 600 is in use, the power control unit 620 supplies the power to the CPU 650 as an operating power for the RSC 600. When the RSC 600 is being charged, the power is supplied to the power supply unit 610 to charge the battery.

The device control unit 630 includes a key, a switch, and a button, generates an electrical signal according to the user's manipulation, and performs tasks such as scanning of the commodity information, wireless communication, and information inquiry. The device control unit 630 can includes a keypad and touch pen or screen.

The information output unit 640 including an LCD panel displays and informs the user of the shopping information, commodity list, and direction menu that the RSC 600 acquired.

The CPU 650 acquires and shows to the user the commodity information and communicates data with the host server 300, and controls all the operations of the RSC 600.

The data communication unit 660 communicates, with the host server 300 or the POPT 700 through the host server 300, data obtained by the RSC 600 including the commodity information, the user's instruction, and the processed results from the host server 300. The data communication unit 660 includes devices for a wireless LAN and a wired communication. The wireless LAN is used for the communication with the host server 300 or the POPT 700 while the RSC 600 moves, and includes RF or IR transceiver. The wired communication is used to communication with the host server 300 while the RSC 600 is being charged or connected to the host server interface 350 at the counter, and includes a various type of port.

The data scanning unit 670 verifies the information on the shopping item the user wants to purchase and takes the commodity information by scanning the bar-code or RFID tag on the commodity. The type depends on the type of the commodity information. A bar-code scanner or reader is used for the bar-code type information, which is being widely used. For the RFID tag (transponder) type, an RF reader is used. Also, the RSC 600 includes a built-in card reader for the user registration and the input of credit card or membership card, and the card reader is a magnetic tape reader or a RF reader depending on the type of card.

The data storing unit 680 includes RAM and flash ROM, and the shopping item list and the processed shopping result are stored in the RAM. The code of commodity information, the detailed information, the device operating software, and the application software are stored in the flash ROM, which is nonvolatile and repeatedly deleted or recorded.

The alarm sound/light producing unit 690 produces an alarm sound or alarm light to inform the user of the operation status of the devices in reading or sending the commodity information and in handling the operation errors of the devices. The unit 690 includes a built-in speaker, an LED or a lamp.

Figure 5:
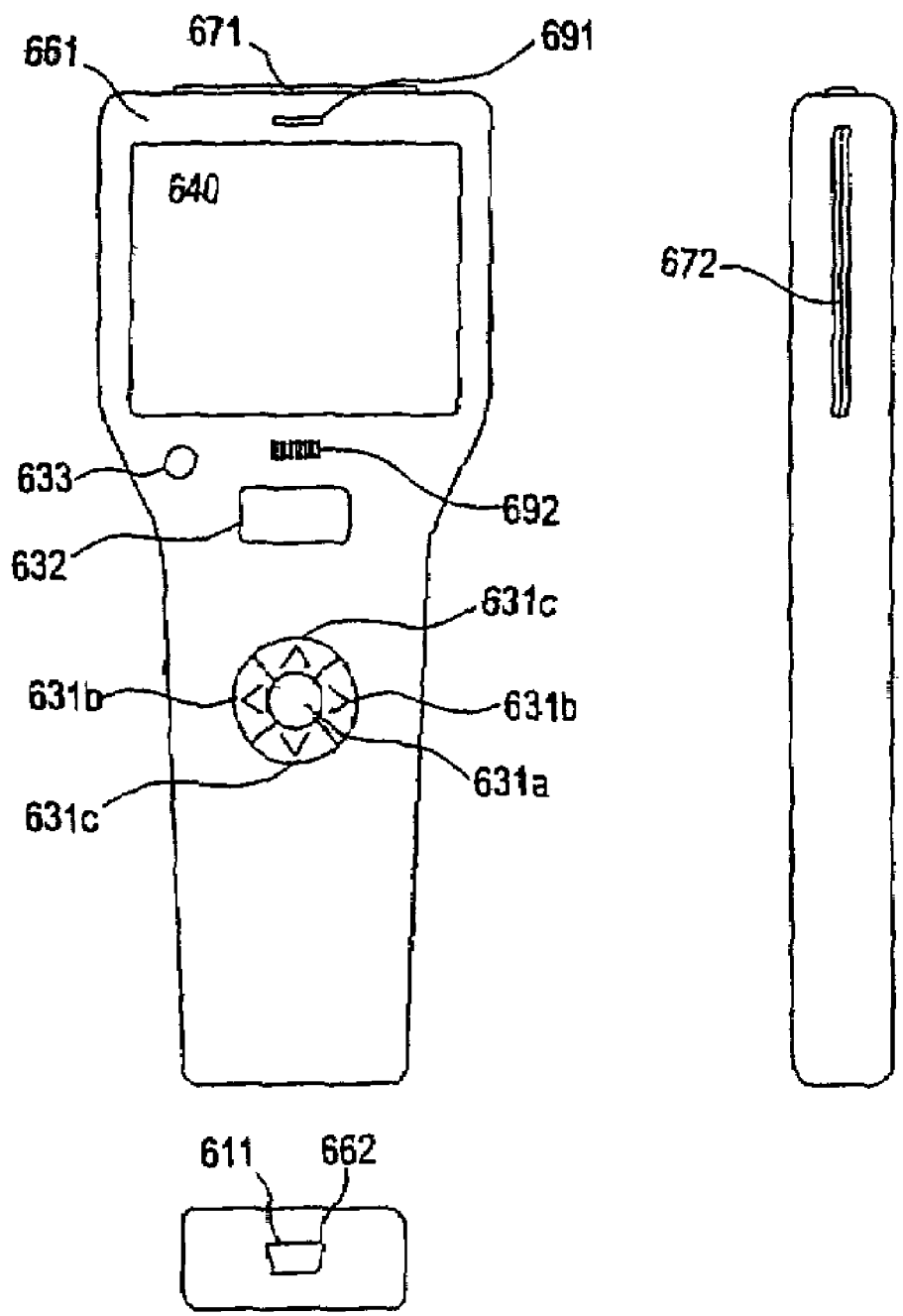
FIG. 5 is a perspective view of an embodiment of the RSC.

FIG. 5 shows an embodiment of the RSC 600 according to the block diagram in FIG. 4. The outlook or other details can be accommodated for the convenience within the objectives of the invention. The RSC 600 of the embodiment has a narrow lower part for the user to hold conveniently, and includes an LCD display 640 on the front top portion. The bar-code reader or RF reader 671 is disposed at the top of the RSC 600, and the card reader 672 is disposed at the side and has a slit to scan by sliding the magnetic band of the card through. The RF reader 671 can be used as the card reader for the RF type card. The top buttons 632 of the simplified key pad for the RSC 600 are used for the bar-code or RF reader, and the bottom arrow keys and buttons 671 are used for the screen change or menu selection. The function key 673 is used with the top buttons 672 for sending the shopping order, and used with the bottom buttons 671 for deleting or changing the items and amount. The RF or IR transceiver 661 for the wireless data communication with the host server 300 or POPT 700 is built inside the RSC 600 along with an antenna. At the bottom of the RSC 600 installed the interface ports 662, 611 for a wired communication with the host server 300 when the RSC 600 is inserted into the charging station 800 or the server interface 350, and for charging when inserted into the port of the charging station 800. The functions of communication and charging are either combined into a single port or separated into a port for each. The alarm lamp 691 and the speaker 692 inform the user of the operation status of the devices including a normal operation or error by producing a blinking light or sound.

In addition to these, the RSC 600 includes an RFID tag with the original identification number of the device, and can be tracked by the RF reader installed at the gates of the store or the shopping center.

(2) POPT, Purchase Order Processing Terminal

The purchase order processing terminal is an mobile terminal a store worker uses to receive a shopping order and related information from the RSC 600, to read the commodity information, and to sent the processed results of shopping.

Figure 6:
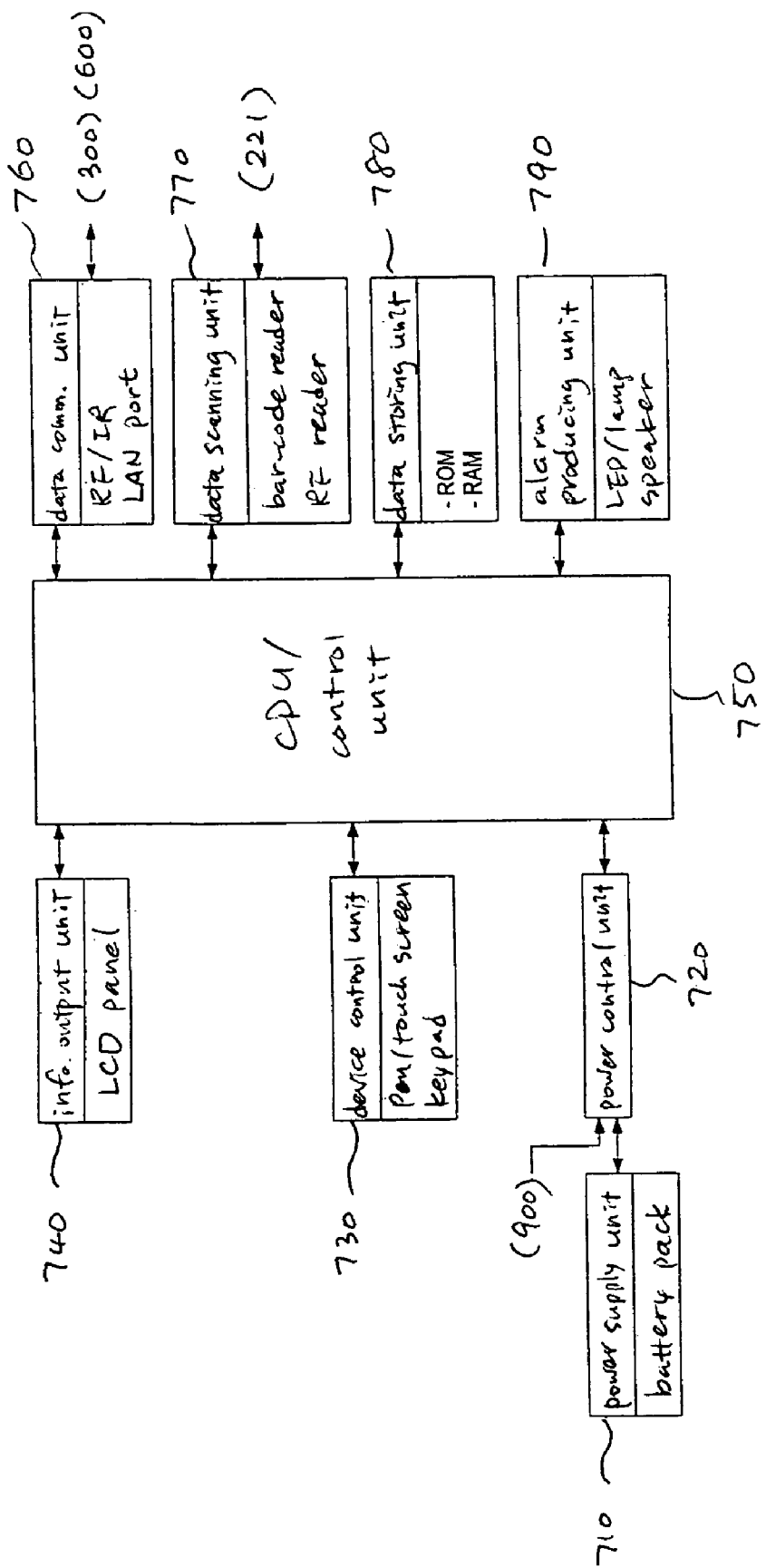
FIG. 6 is a block diagram of internal circuitry of the POPT.

FIG. 6 shows a block diagram of internal circuitry of the POPT. The POPT 700 includes a power supply unit 710, a power control unit 720, a device control unit 730, an information output unit 740, a CPU 750, a data communication unit 760, a data scanning unit 770, a data storing unit 780, and an alarm sound/light producing unit 790.

The power supply unit 710 includes a battery to supply electric power to each unit of the POPT 700 while the POPT is moving off the external power source. The battery includes nickel-cadmium (Ni—Cd), lithium ion (Li-Ion), and lithium polymer (LiPo) batteries, and they are rechargeable by the RSC charging station 900 from the wall outlet.

The power control unit 720 rectifies the electric power from the POPT charging station 900 to supply stable voltage. While the POPT 700 is in use, the power control unit 720 supplies the power to the CPU 750 as an operating power for the POPT 700. When the POPT 700 is being charged, the power is supplied to the power supply unit 710 to charge the battery.

The device control unit 730 includes a key, a switch, and a button, generates an electrical signal according to the store worker's manipulation, and performs tasks such as scanning of the commodity information, wireless communication, and information inquiry. The device control unit 730 can includes a keypad and touch pen or screen.

The information output unit 740 including an LCD panel displays and informs the store worker of the shopping information, commodity list, and direction menu that the RSC 600 acquired.

The CPU 750 acquires and shows to the store worker the commodity information and communicates data with the host server 300, and controls all the operations of the POPT 700.

The data communication unit 760 communicates, with the host server 300 or the RSC 600 through the host server 300, data obtained by the POPT 700 including the commodity information and the instruction from the RSC 600. The data communication unit 760 includes devices for a wireless LAN and a wired communication. The wireless LAN is used for the communication with the host server 300 or the RSC 600 while the POPT 700 moves, and includes RF or IR transceiver. The wired communication is used to communication with the host server 300 while the POPT 700 is being charged, and includes a various type of ports.

The data scanning unit 770 verifies and collects the shopping item the customer wants to purchase, and takes the commodity information by scanning the bar-code or RFID tag on the commodity. The type depends on the type of the commodity information. A bar-code scanner or reader is used for the bar-code type information, which is being widely used. For the RFID tag (transponder) type, an RF reader is used.

The data storing unit 780 includes RAM and flash ROM, and the shopping item list from the RSC 600 and the processed shopping result are stored in the RAM. The code of commodity information, the detailed information, the device operating software, and the application software are stored in the flash ROM, which is nonvolatile and repeatedly deleted or recorded.

The alarm sound/light producing unit 790 produces an alarm sound or alarm light to inform the store worker of the arrival of the shopping order from the RSC 600 and the operation status of the devices in reading or sending the commodity information and in handling the operation errors of the devices. The unit 790 includes a built-in speaker, an LED or a lamp.

Figure 7A:
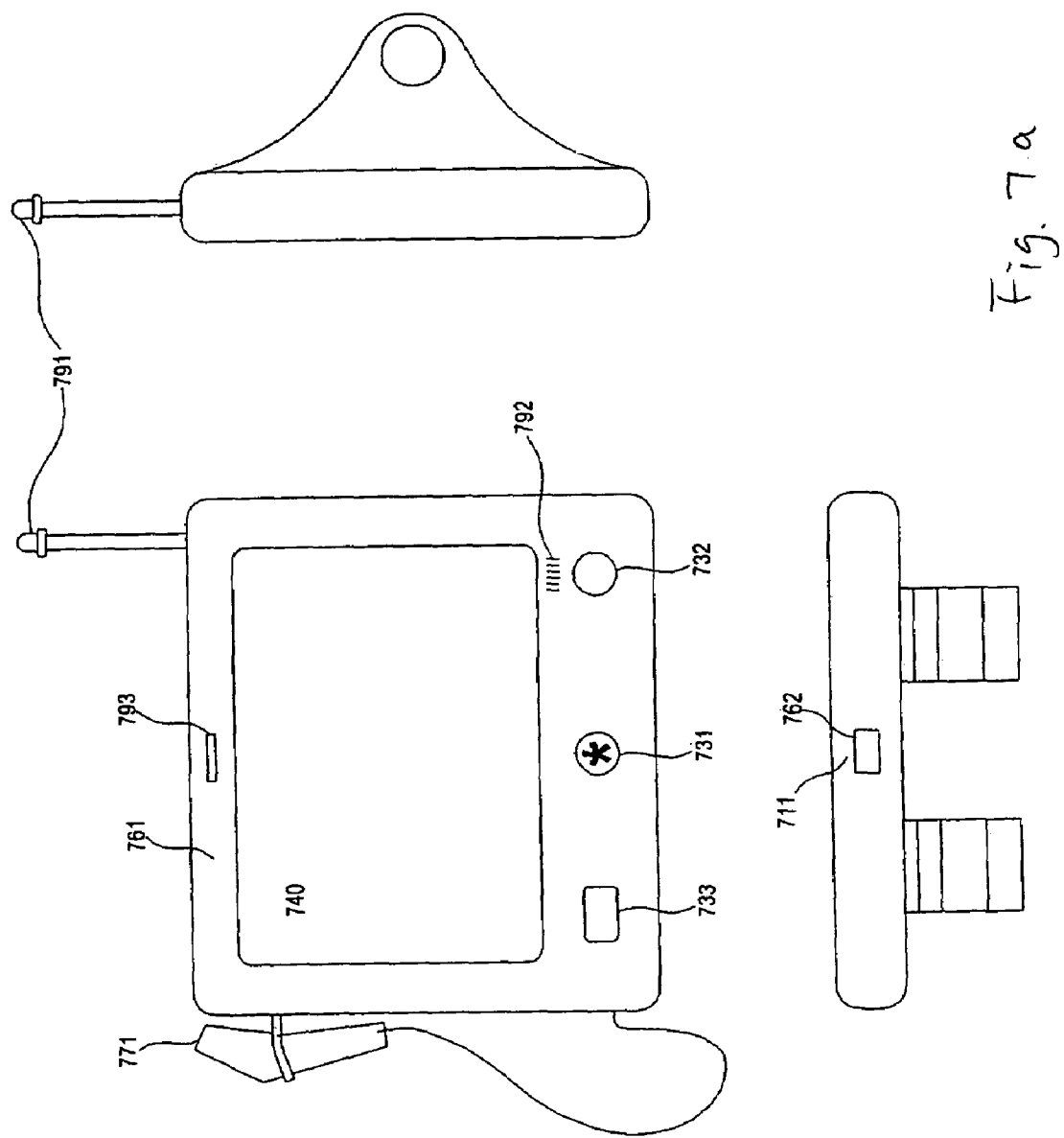
FIG. 7a is a perspective view of an embodiment of the POPT.

FIG. 7a shows an embodiment of the RSC 600 according to the block diagram in FIG. 6. The outlook or other details can be accommodated for the convenience within the objectives of the invention. The POPT 700 of the embodiment includes a connecting structure in the back for easy attachment and detachment to the traditional shopping cart, an LCD display 740 in the front for the information including the commodity information, and a key pad at the bottom for controlling devices. The key 732 is used to disengage the alarm informing the reception of the shopping order from the RSC 600, the key 731 to change the screen or verify the processing, and the key 733 to input the commodity information and send the processed result. The POPT 700 includes a bar-code reader or an RF reader for inputting the commodity information. The bar-code reader is installed on the POPT 700 such that the bar-code reader accesses a commodity and reads the information as either attached to the POPT 700 or detached from the POPT 700. The RF reader is installed on the POPT 700 as one and is able to read the commodity information of the items within a certain range thanks to the relatively long detection range. The RF or IR transceiver 761 for receiving a shopping order information and a wireless transmission of the processed results is included in the POPT 700 along with an antenna. The POPT 700 includes an alarm sound/light producing unit 790 to inform the store worker of the reception of a shopping order from the RSC 600. The alarm light 791 is installed on a stick at the top of the POPT 700 at a predetermined height, and blinks at the same time with the speaker 792 when a shopping order is received. The alarm lamp 793 and the speaker 792 make a predetermined light and sound to inform the store worker of the operation status of the devices including a normal operation or errors while the store worker performs the tasks. At the bottom of the POPT 700 installed the interface ports 762, 711 for a wired communication with the host server 300 when the POPT 700 is inserted into the charging station 900. The functions of communication and charging are either combined into a single port or separated into a port for each.

Figure 7B:
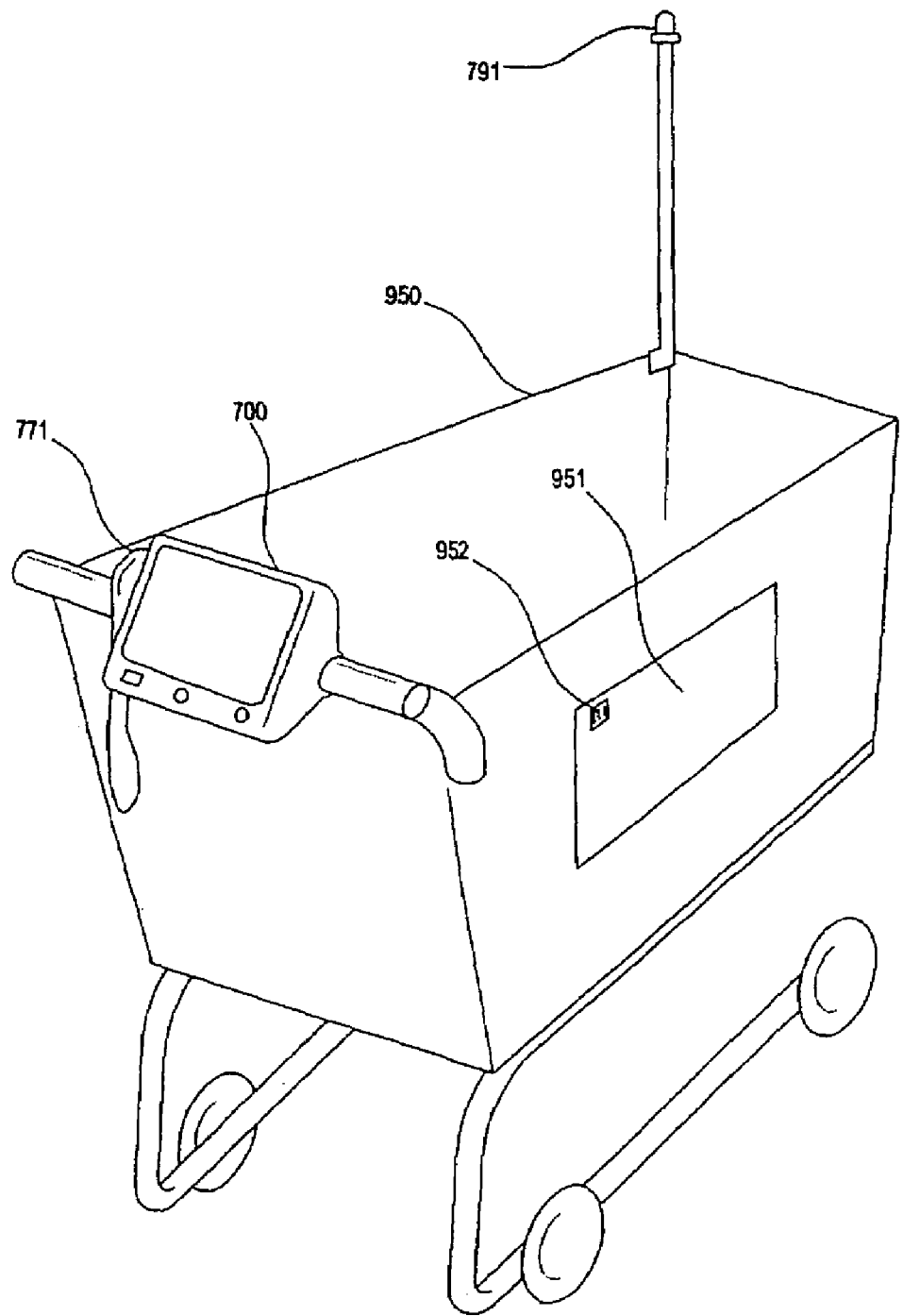
FIG. 7b is a perspective view of a POPT installed on a shopping cart.

FIG. 7b shows an embodiment of a POPT installed on a shopping cart. The alarm light 791 is installed high on a stick attached to the shopping cart 950 such that the store worker is informed that the POPT 700 received a shopping order even from a far. The cart includes a number plate 951 with the original identification number of the cart, and a bar-code or RFID tag 952 recorded with the original identification number of the cart 950. The POPT 700 is provided either in a single body with the shopping cart 950 or in a separated type.

(3) Operation of the Shopping System

The real-time remote shopping according to the invention can be embodied in various ways. A preferable embodiment is suggested below.

1) Operation of RSC

FIGS. 8a-8d show the flow charts for the operation of the RSC. The operation of the RSC 600 includes the steps for charging, pre-shopping, shopping, and post-shopping.

Figure 8A:
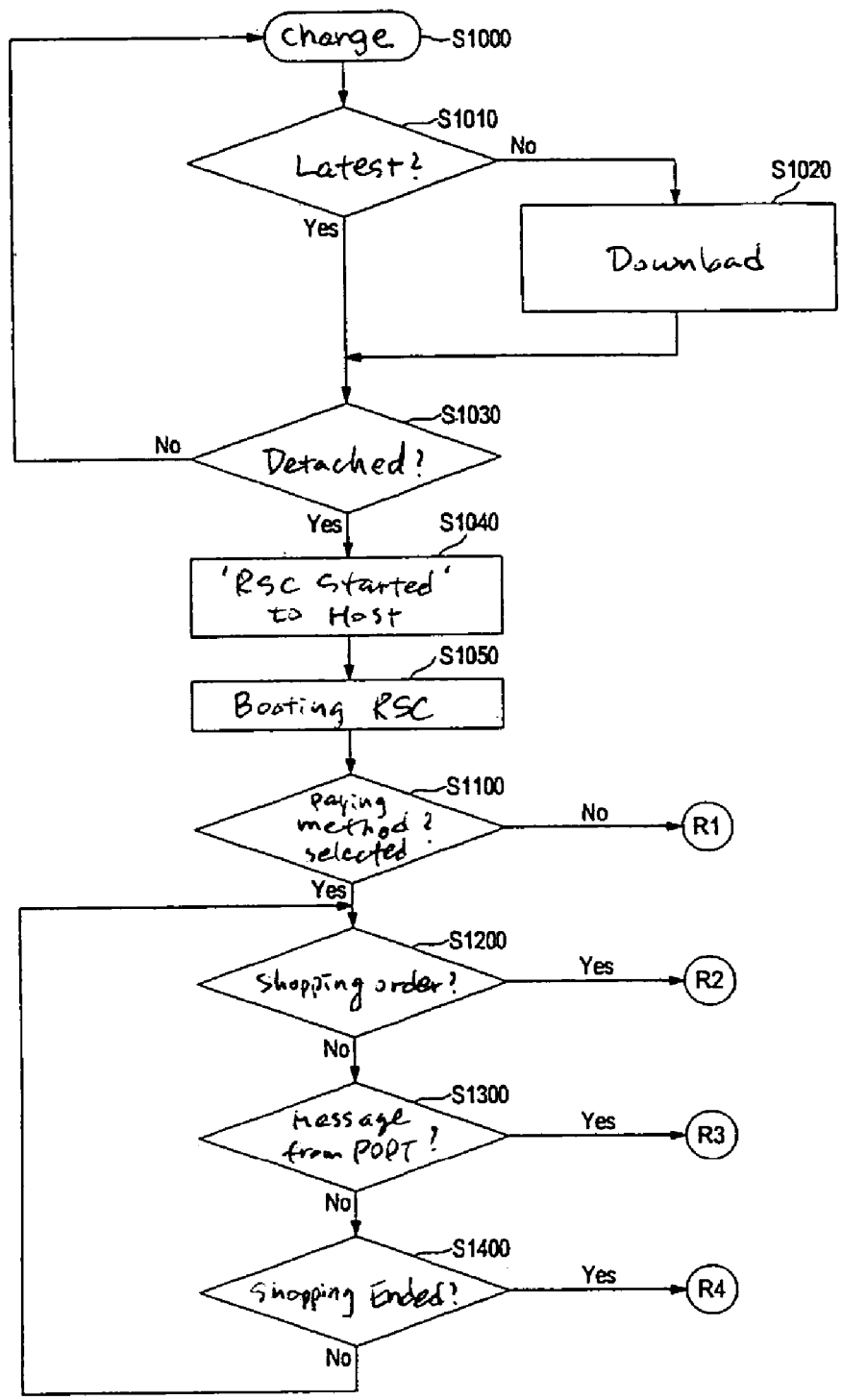
FIGS. 8a through 8e are flow charts for the operation of the RSC.

The step for charging corresponds to the steps from S1000 to S1020 in FIG. 8a. The RSC 600 is placed on the charging station and connected to the power source and the host server 300. The built-in battery of the RSC 600 is charged by the connected power source (S1000). The host server 300 is connected with the RSC 600 in wire, recognizes the original identification number of the device and the commodity information stored in the memory of the RSC 600 (S1010), and upgrades with a latest version of commodity information if necessary (S1020). The commodity information sent to the RSC 600 includes all the necessary information for the shopping such as the specification or price of the items. In other embodiment, the RSC 600 does not obtain the commodity information from the host server 300, but during the shopping (S2100) the information (bar-code or RFID tag) of the sample items corresponding the shopping items is read in by the bar-code or RF reader built in the RSC 600 and sent to the host server 300 through the wireless LAN. And, a detailed information on the items is received and used as a shopping information. When the information stored in the bar-code or RFID tag is enough, the customer use the information for the shopping without the detailed information from the host server 300. The RSCs are placed on the charging stations 800, and the customer chooses an RSC 600 arbitrarily from them on entering the store. The customer gets to know of the status of the RSC 600 according to the lamp light provided on the charging station; green for full charged status, red for partly charged status, and blinking for file downloading in progress.

Figure 8B:
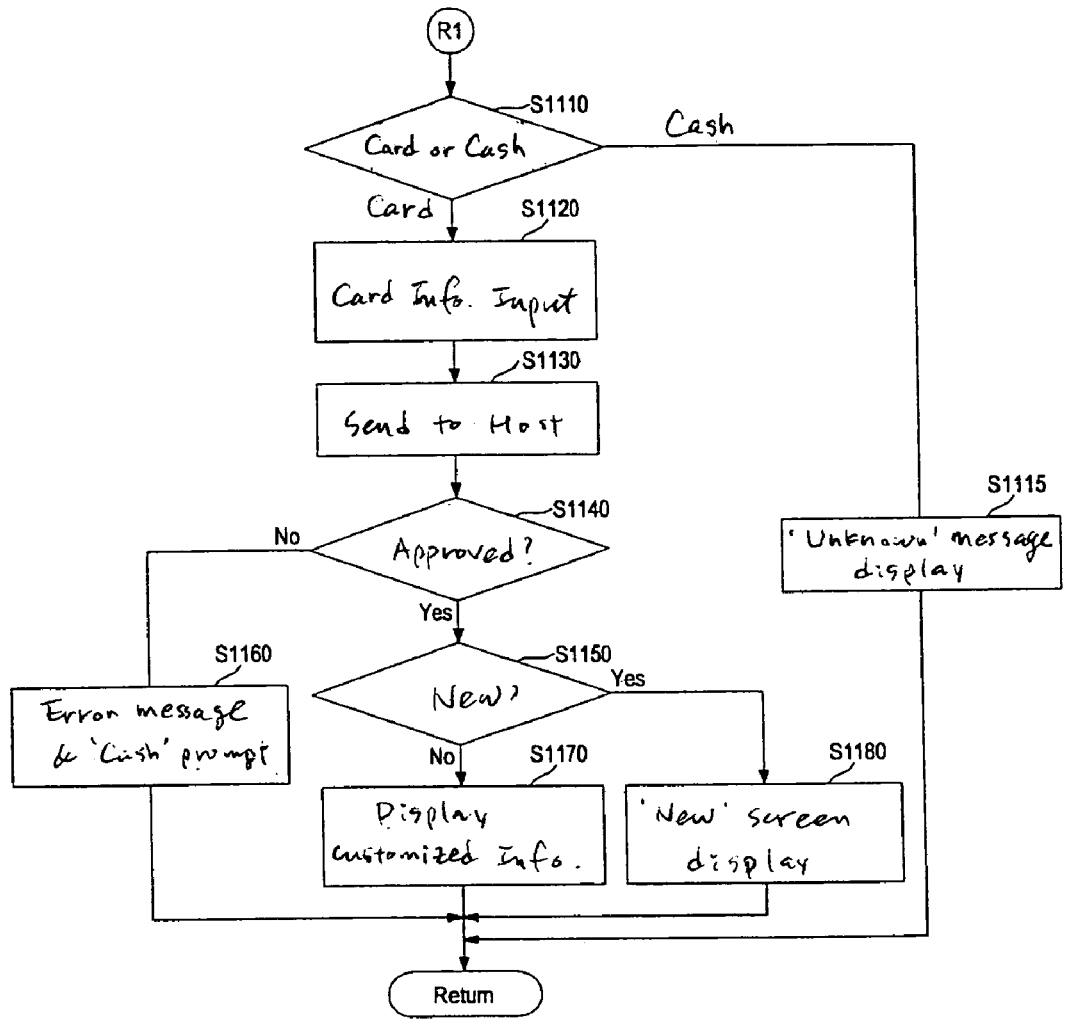

The pre-shopping step corresponds to the steps from S1030 through S1100 of FIG. 8a and up to the step S1180 of FIG. 8b, and includes the steps for the customer's detaching the RSC 600 from the charging station 800, inputting the customer information, and the customer's selecting how to pay. If the RSC 600 is detached, the RSC 600 is recognized as starting operation by the host server 300 (S1040). The detached RSC 600 is switched on automatically or manually and booted up (S1050), and recognizes the customer and prompts the customer to choose how to pay (S1100). FIG. 8b shows a flow chart of recognizing the customer and choosing how to pay. The RSC 600 prompts the customer to choose how to pay, in credit card or cash. For paying by credit card, the RSC 600 requests the credit card information, and the customer inputs the information by swiping the credit card through the card reader 673 (S1120). The read-in card information is sent wirelessly to the host server 300, and the verification result is displayed on the RSC screen. If the card is approved (S1140), an old customer is given with information including a benefit according to the purchase point or contribution (S1170), and a new customer is given with information including a customer registration (S1180). If the credit card is not approved, the customer is prompted to choose how to pay again with error message (S1160). The customer is registered as an associate member when the information on the customer that the credit card company provides when the customer inputs the credit card information for shopping, and becomes eligible for the basic benefit in promotion or sales according to the purchase point. The associate member can be upgraded to the full member when the customer fills out and submit the customer information form at the store. If the customer chooses to pay in cash (S1115), the RSC 600 does not request further verification or recognition and even the non-member customer is allowed to shop.

Figure 8C:
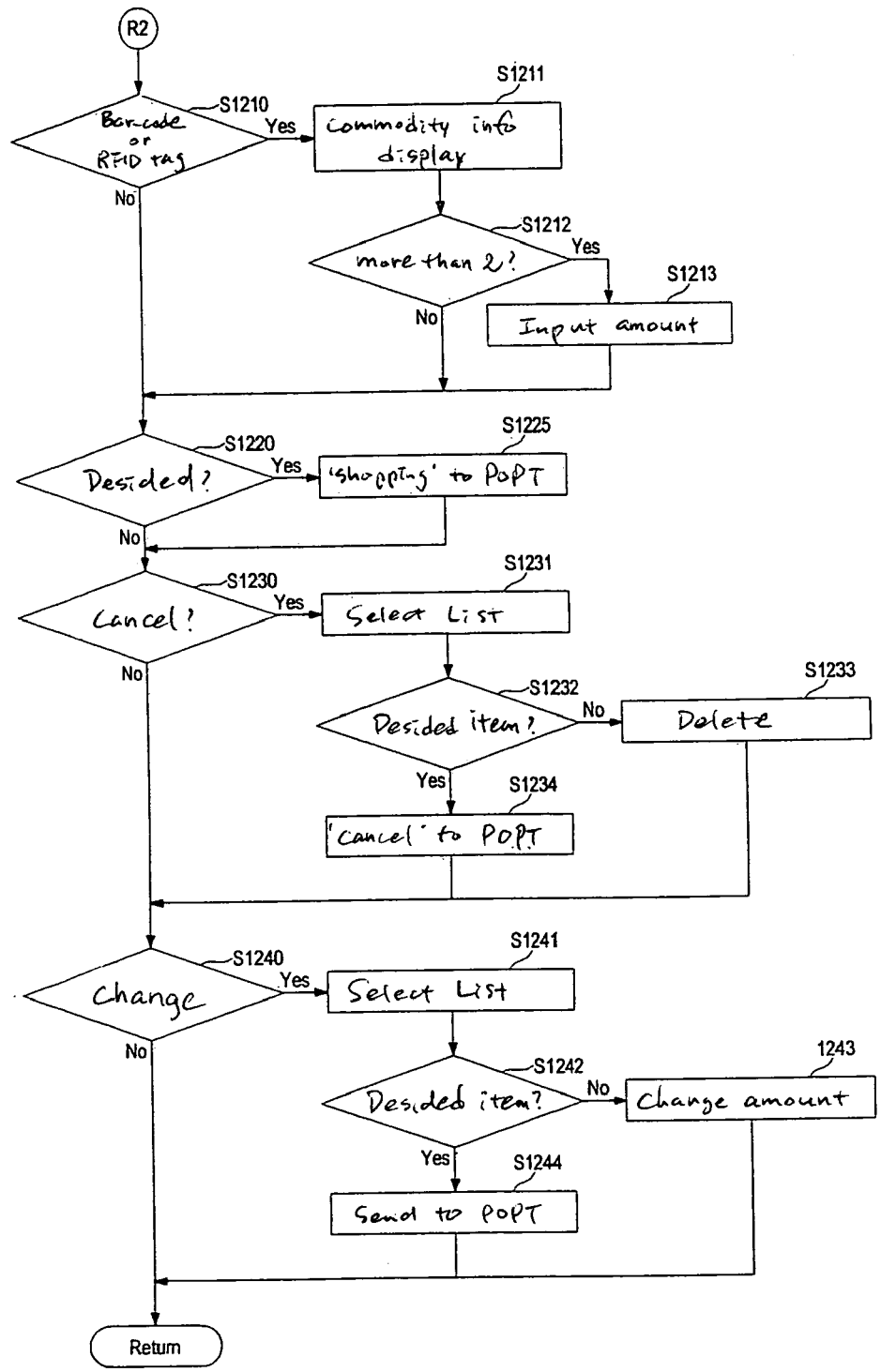
Figure 8D:
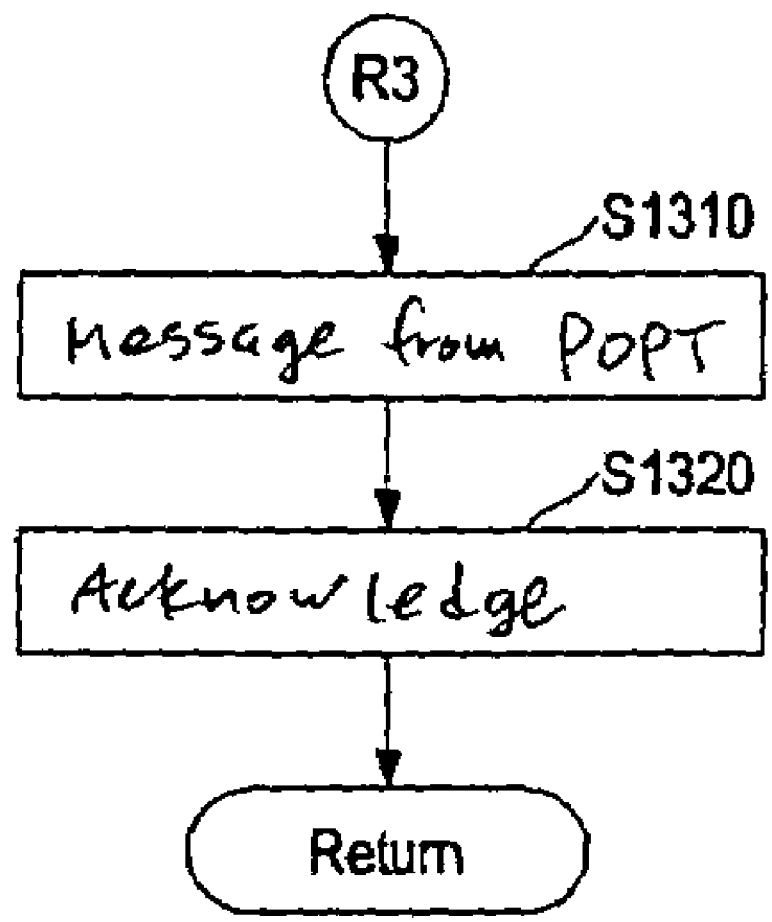

The shopping step corresponds to the steps form S1210 to S1244 of FIG. 8c, and includes the steps of verifying the commodity information of the shopping items, determining the shopping items, and changing or canceling the shopping items. The customer looks around the sample item display section of the shopping center, reads in the bar-code or RFID tag of the shopping items with the bar-code reader or the RF reader built in the RSC 600 (S1210), and verifies the information displayed on the screen (S1211). The detailed information displayed on the RSC screen includes the commodity information stored in the memory of the RSC 600, received from the host server 300 with the commodity number read-in with the bar-code reader or RF reader in the RSC 600, or read-in directly from the bar-code or RFID tag with the bar-code reader or RF reader in the RSC 600. If the customer select/inputs the amount after verifying the shopping items (S1213), the selection of the shopping items is finished. Purchasing of the selected shopping items is determined by sending a purchase order to the POPT 700 (S1225). Canceling a shopping item inputted into the RSC 600 (S1230) is done by selecting (S1231) the shopping item from the screen, and then deleting (S1233) it from the shopping item list if before determining shopping, or sending (S1234) the purchase-cancelled order to the POPT 700 if after the determining shopping. Changing some shopping items (S1240) is done by selecting (S1241) the shopping item from the screen, and then changing (S1243) the amount of the selected item from the shopping item list if before determining shopping, or sending (S1244) the purchase change order to the POPT 700 if after the determining shopping. The shopping or changing/canceling shopping orders are taken care of by the store worker in the commodity item display section, and the results are sent to the POPT 700 through the RSC 600 (S1300). As shown in FIG. 8d, the messages received by the RSC 600 (S1310) is displayed on the RSC screen and verified by the customer (S1320). Sending of shopping order by the RSC (S1200 of FIG. 8a and FIG. 8c) and receiving by the POPT (S1300 of FIG. 8a and FIG. 8d) are performed repeatedly during the shopping.

If the customer stops shopping temporarily to the neighboring facilities 400 including restaurant, cinema, and health club, the customer sends "shopping cart standing by" command to the POPT, and the POPT produces a order-received alarm and displays "shopping cart standing by" command. If there are temperature-sensitive items (needed to keep frozen, fridge or warmed) among the collected items, the POPT displays on the screen and instructs the store worker to keep them in an appropriate place. Then, the store worker puts the shopping cart in standing-by state, and stores the temperature-sensitive item in a special place with constant temperature. Or, the temperature-sensitive items can be collected in a special temperature-controlled box. To resume the shopping, the customer sends a "shopping-resumed" command to the POPT 700 with the RSC 600. During the shopping suspended time period, the RSC 600 can be set in a power save mode. When the customer uses the neighboring facilities, the customer can use the RSC to pay for the other commodity or service, which will be paid along with the shopping items from the store.

The RSC 600 includes an RFID tag with the original identification number of the device, and the RF readers 370 is installed at a predetermined locations of the store. With those, the customer can be traced in the store and the inadvertent carrying out of the RSC 600 is detected by the RF reader 370.

Figure 8E:
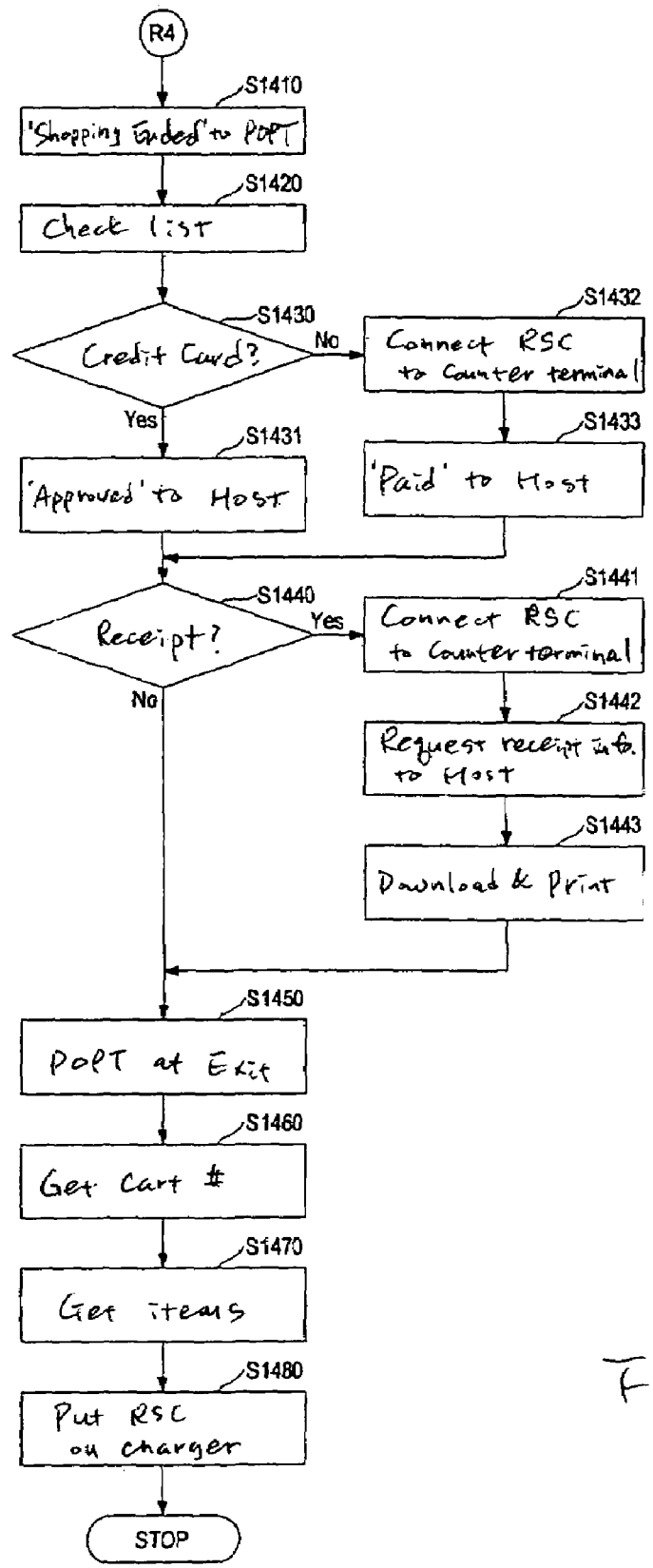

The post-shopping step S1400 corresponds to the steps from S1410 to S1480 of FIG. 8*e*, which includes paying, issuing receipt, and picking up the items. The customer sends a "shopping finished" message to the POPT 700 with the RSC 600 (S1410). The customer verifies the shopping items displayed on the screen of the RSC 600 to pay (S1420), and the host server 300 recognizes the finish of shopping and request paying (S1430). To pay in cash, the customer connects the RSC 600 to the server interface at the counter (S1432) and pay in cash, and the cashier inputs the result into the counter terminal 340 and sends the information to the host server 300. When the customer wants a receipt (S1440), the RSC 600 is connected to the server interface at counter 350 (S1441), the cashier requests the host server 300 for the contents for the receipt (S1442), the host server 300 sends the requested contents, and the cashier prints out (S1443) and gives the receipt to the customer. The shopping cart loaded with the shopping items is positioned at the store exit 1202, and the customer receives with the RSC 600 and verifies a "waiting at exit" message (S1450), and verifies the shopping item pick-up number (shopping cart number) sent by the host server 300 verifying paying (S1460). The customer with the shopping item pick-up number or the receipt proceeds to the shopping item pick-up window 1203, shows the shopping item pick-up number or the receipt, and picks up the shopping cart (S1470) to finish the shopping. The used RSC 600 is switched off and placed on the RSC charging station 800 (S1480).

2) Operation of Host Server

FIGS. 9*a* through 9*e* are flow charts for a flow of information and a control process between the host server 300 and other machines, which includes monitoring the devices on the charging station, recognizing the customer in the pre-shopping step, interconnecting the devices during the shopping, and verifying of paying after shopping.

Figure 9A:
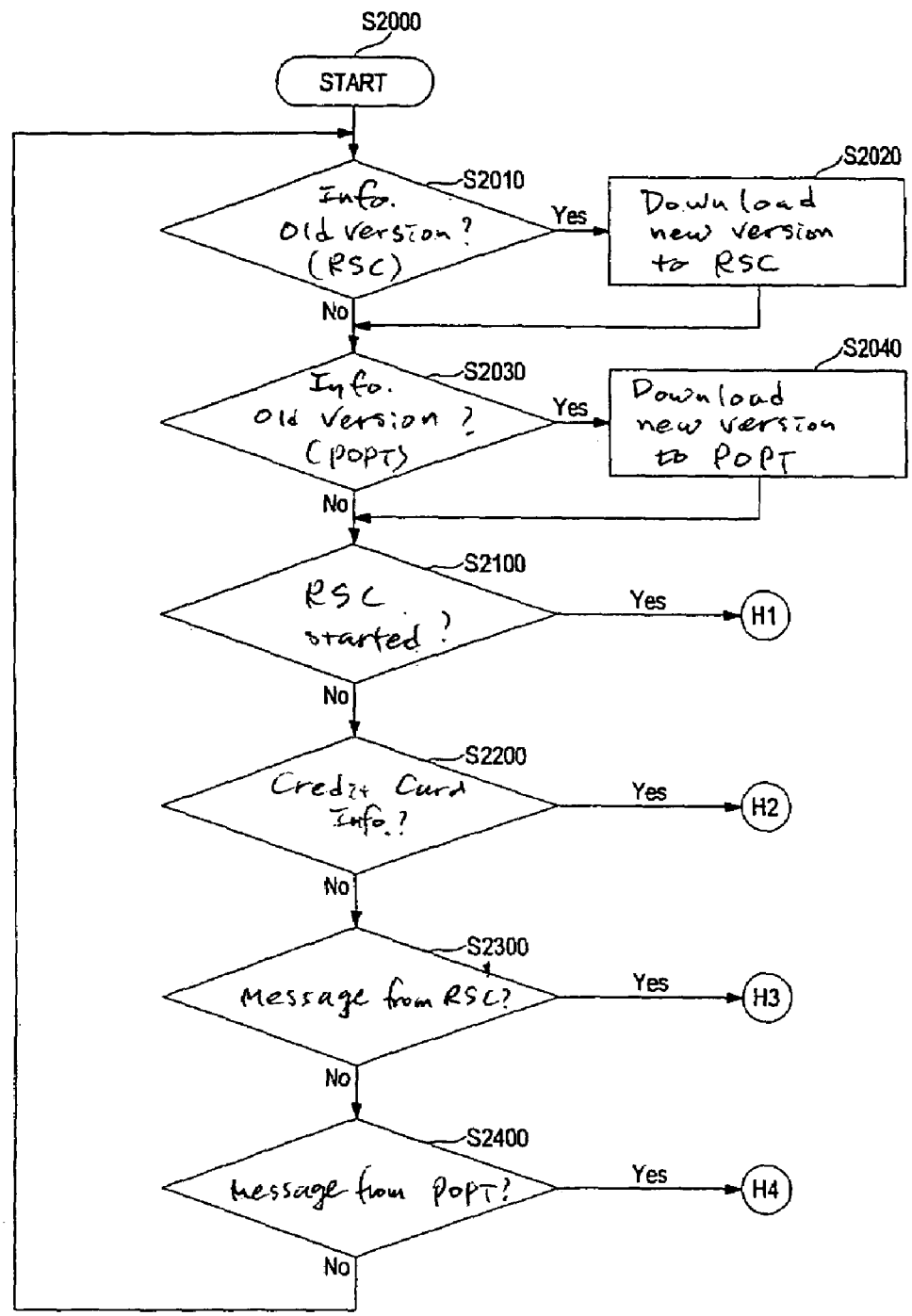
FIGS. 9a through 9e are flow charts for a flow of information and a control process between the server and other machines.
Figure 9B:
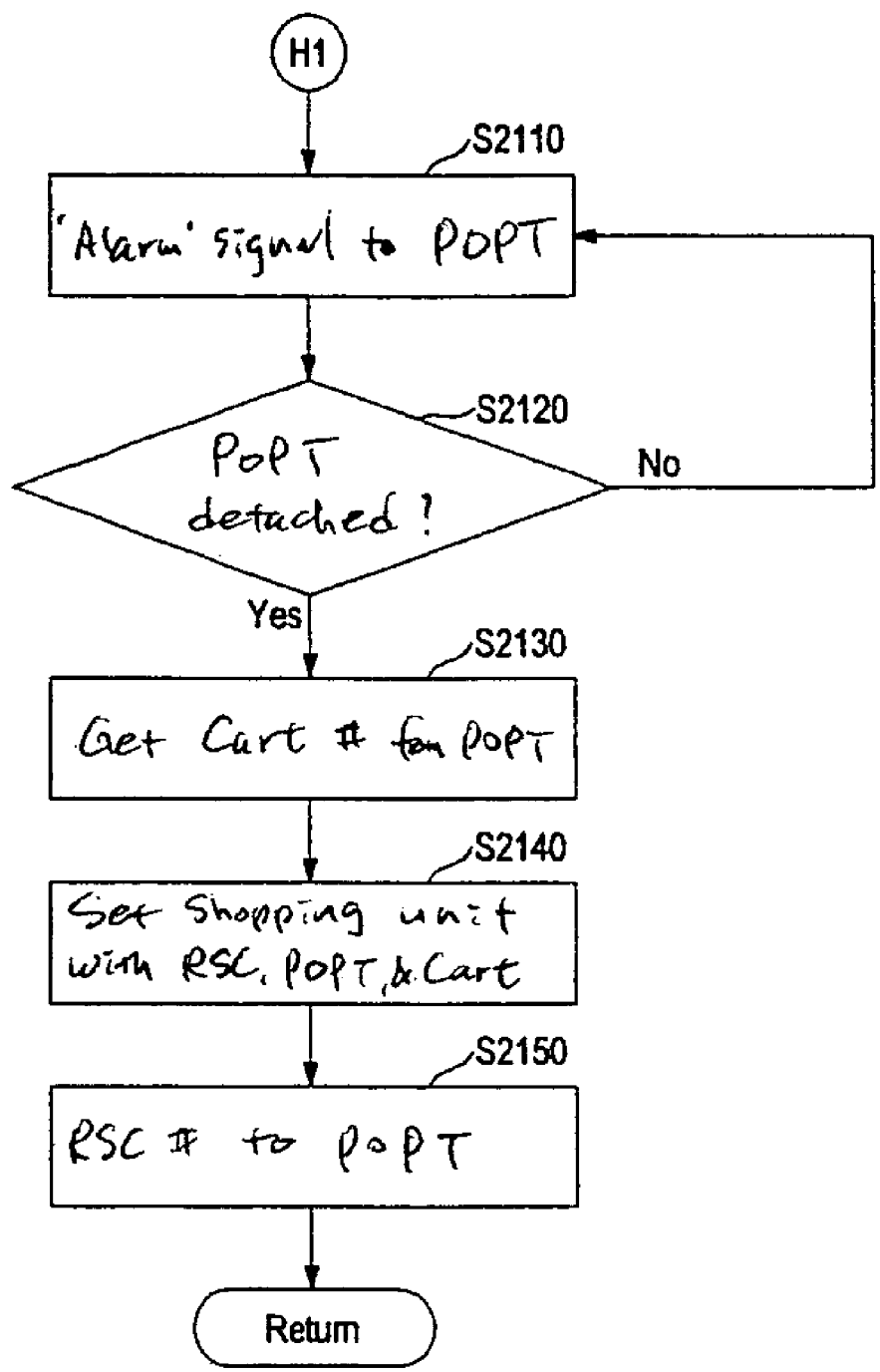

The step of monitoring of the devices on the charging station is shown in the steps from S2000 to S2100 of FIG. 9*a* and up to the step S2150 of FIG. 9*b*, in which the host server 300 recognizes the original identification number of the RSC 600 and the POPT 700 which are being charged on the charging stations 800, 900, checks the version of the commodity information file (S2010, S2030), and upgrades with the latest version of file if necessary (S2020, S2040) The host server 300 also recognizes the original identification number of the RSC 600 which is detached from the charging station 800, and sends an alarm signal to the POPT 700 which is going to work with the RSC 600 in pair (S2110). The host server verifies if the POPT 700 is detached from the charging station 900, recognizes the original identification numbers of the POPT 700 and the shopping cart 950, and establishes a shopping unit with the set of identification numbers of the RSC 600, the POPT 700, and the shopping cart 950 (S2140). Also, the host server sends the original identification number of the RSC 600 to the POPT 700 (S2150).

Figure 9C:
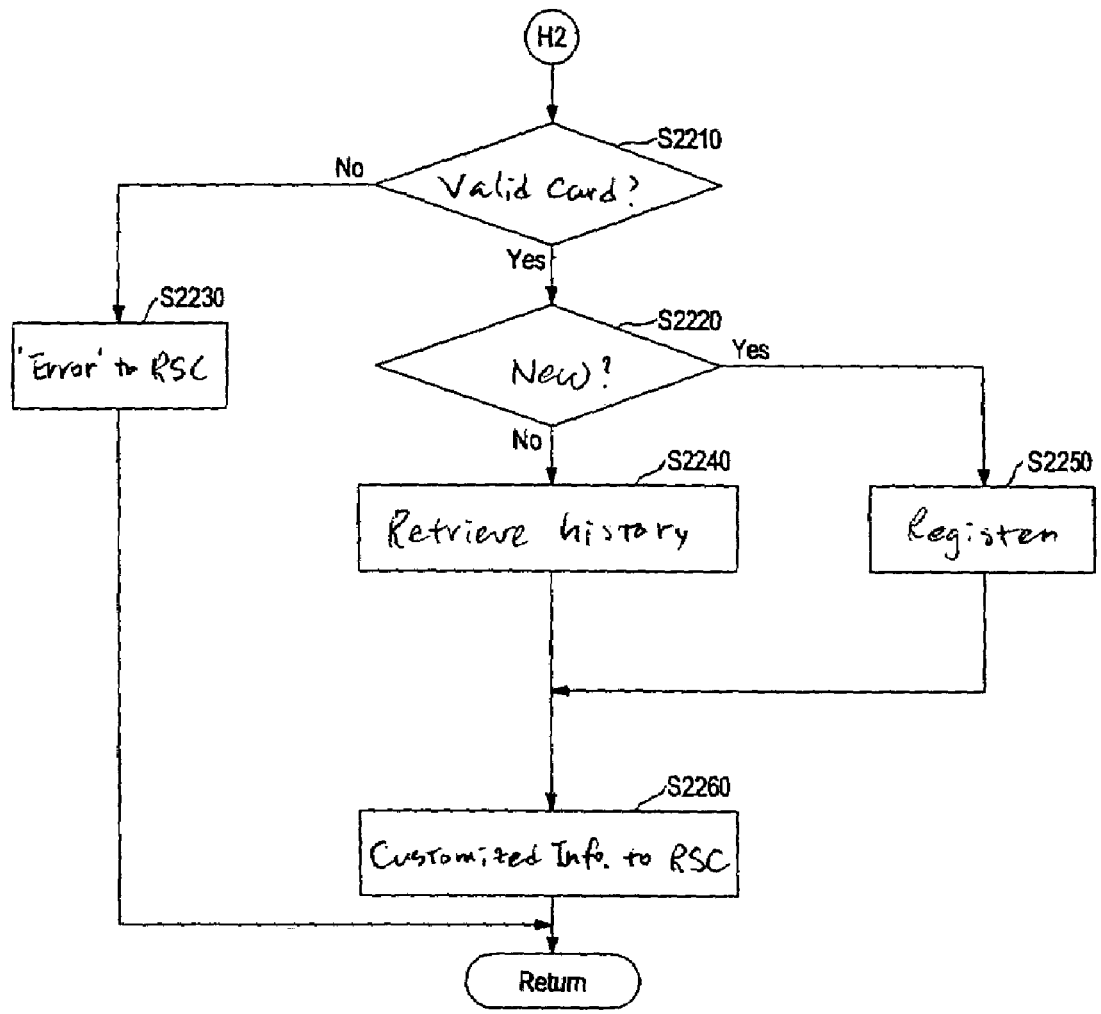

The step of recognizing the customer in the pre-shopping step corresponds to the steps from S2200 of FIG. 9*a* to S2260 of FIG. 9*c*, in which the host server 300 recognizes the information on the credit card or membership card from the RSC 600, verifies the validity of the cards using an external database through an internal or external communication network (S2210), estimates the purchase points or history of the customer if she or he is an old customer, and sends the benefit information and other guides to the RSC 600 (S2260). To a new customer, the host server 300 registers the customer (S2250), and sends the related information and other guide to the RSC 600 (S2260). If the card is not valid, the host server 300 sends an error message and a request to select how to pay (S2230). A registration of a customer is done through an external computer or self-registration process as well as through the RSC 600.

Figure 9D:
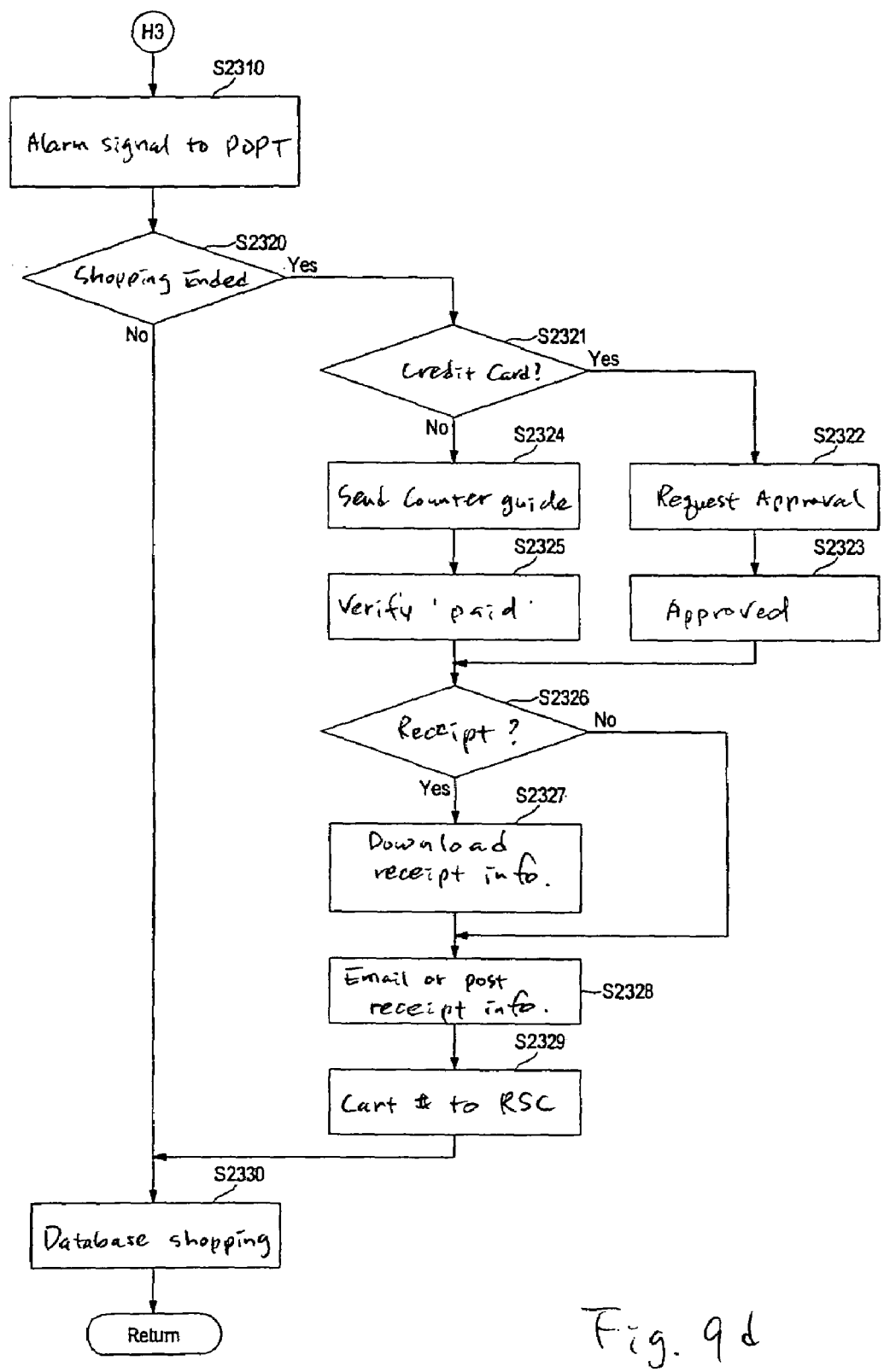
Figure 9E:
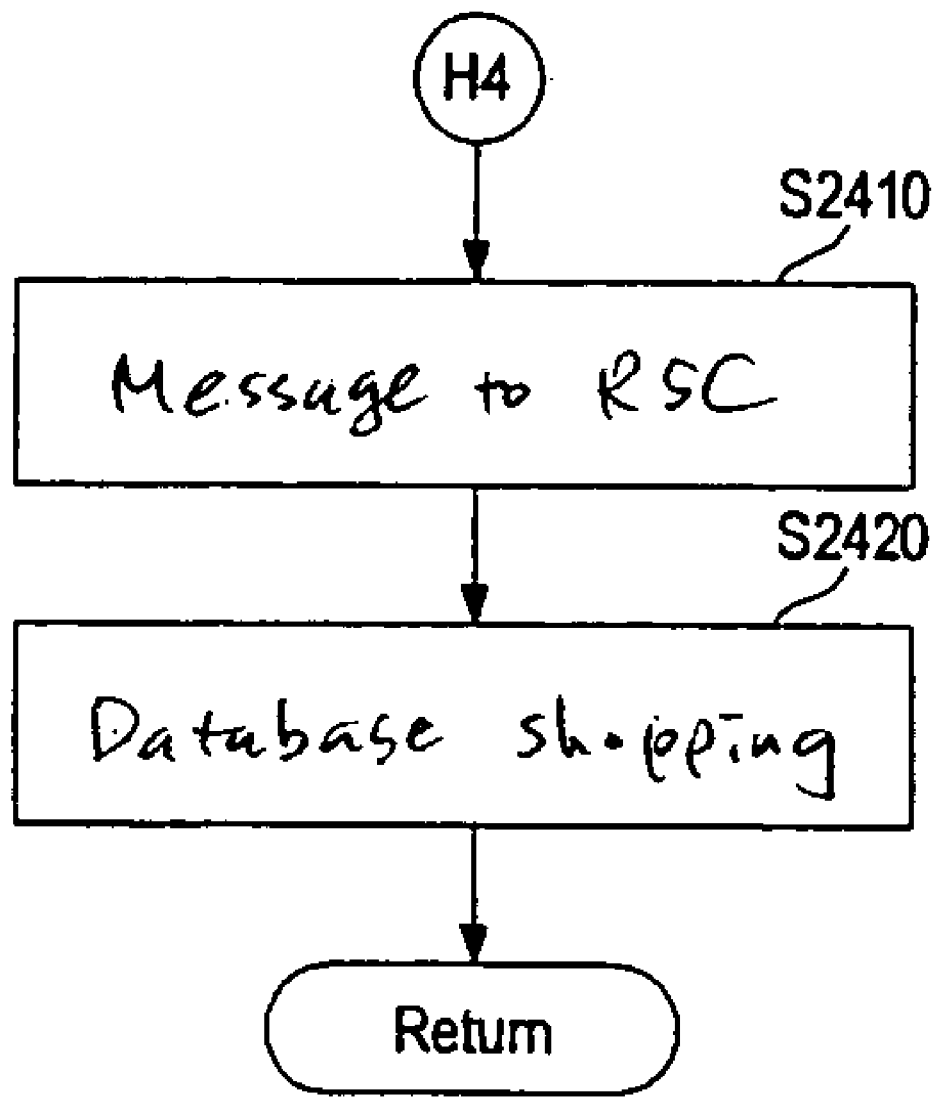

The step of interconnecting the devices during the shopping corresponds to the steps from S2300 of FIG. 9*a* to S2310 of FIG. 9*d*, S2330 of FIG. 9*d*, and from S2400 of FIG. 9*a* to S2420 of FIG. 9*e*, in which the host server 300 sends to the POPT 700 the shopping order related messages from the RSC 600 along with an alarm-issuing signal (S2310), and sends to the RSC 600 the processed result related information from the POPT 700 (S2410). In order for the customer to verify the shopping item, whenever the customer scans or reads the bar-code or RFID tag with the bar-code reader or RF reader the host server 300 extracts from the database 310 and sends the related commodity information to the RSC 600. During this process, the shopping history is stored in the database for the further analysis (S2330, S2420).

The step of verifying of paying after shopping corresponds to the steps from S2320 to S2329 of FIG. 9*d*, in which after the host server 300 receives a "shopping-finished" message from the RSC 600 (S2320), the host server 300 requests (S2322) the RSC 600 to pay by the credit card the information of which was inputted before the shopping started if the customer selected the credit card, receives and verifies a "paying approved" message from the RSC 600, and sends (S2323) a message to inform that the RSC 600 that paying is done. If the customer selected to pay in cash before the shopping started, the host server 300 sends (S2324) a message to guide the customer to a counter and verifies that the paying is done (S2325) after receiving a "paid" message from the counter terminal 340. The means to pay can be changed during the step of paying from the customer's selection before starting the shopping.

If received a request of a receipt from the RSC 600 (S2326), the host server 300 recognizes the original identification number of the RSC 600 connected to the server interface 350, downloads the related contents of receipt from the counter terminal (S2327), and prints out the receipt to the customer. The receipt contents can be emailed to the customer or posted to an Internet homepage such that the customer is able to consult (S2328). The host server 300 sends to the RSC 600 the shopping item pick-up number or a shopping cart number after verifying that it was paid (S2329).

The host server 300 allows the customer to check the shopping history or provides services on receipt and bookkeeping and suggesting the list of commodity that the customer might be interested in and recommendable items through the Internet homepage or an Email. The host server 300 interconnects the shopping centers scattered over a region to share the information. Also, a higher level of server can be introduced to handle the integrated management, or builds a network with the collaborating companies or suppliers.

3) Operation of POPT

FIGS. 10a through 10d are flow charts for the operation of the POPT, in which the shopping order from the RSC 600 and cancellation or changing of the shopping items are displayed on the screen of POPT 700. The operation includes the steps of charging, pre-shopping, and shopping, post-shopping.

Figure 10A:
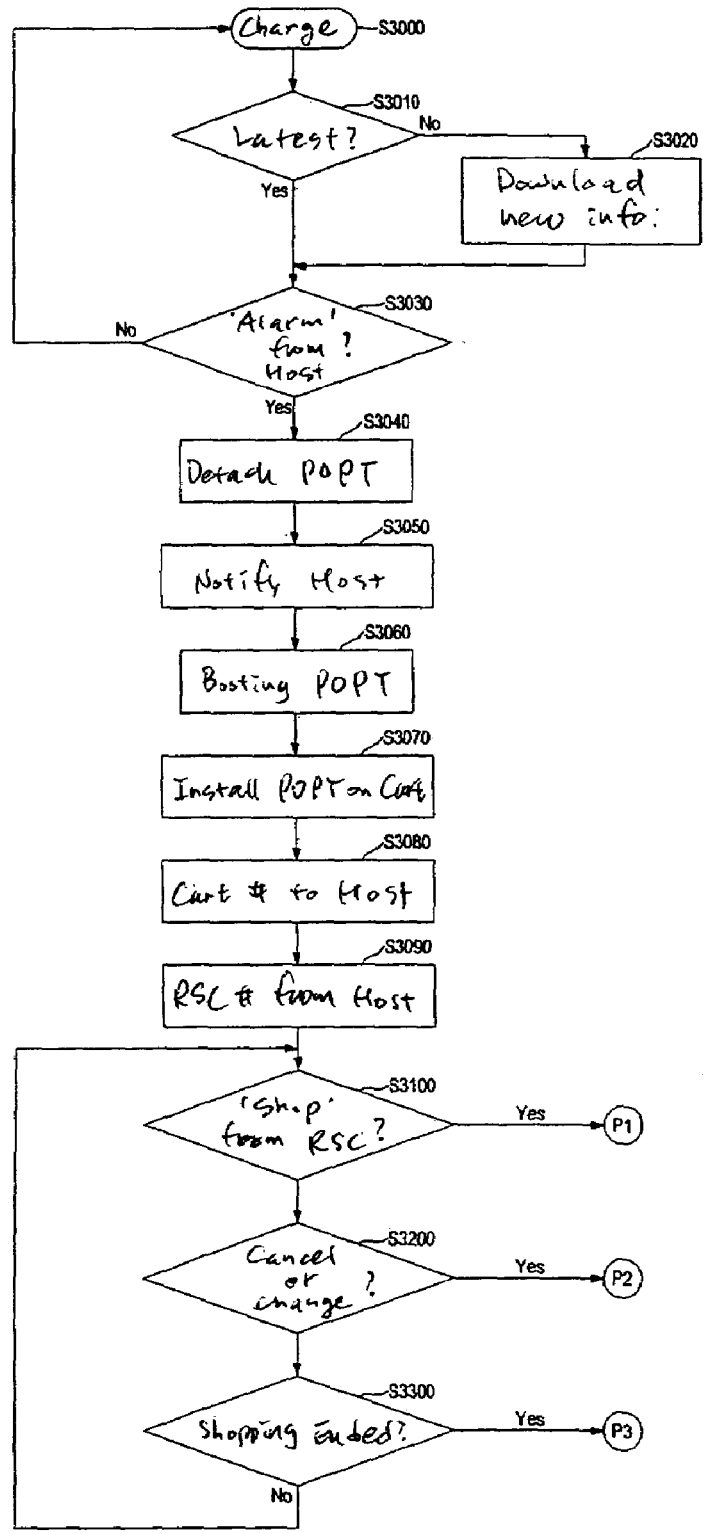
FIGS. 10a through 10d are flow charts for the operation of the POPT.

The step of charging corresponds to the steps from S3000 to S3030 of FIG. 10*a*, in which the POPT 900 is put on the charging station 900, and connected to the host server 300 and the power source. The built-in battery of the POPT 700 is charged by the power source (S3000). The host server 300 is connected to the POPT 700 in wire, recognizes (S3010) the original identification number and the version of the commodity file in the memory of the POPT 700, and upgrades (S3020) with the latest version of file if necessary. The commodity information file that the host server 300 sends to the POPT 700 includes the information such as the commodity number or specification that the store worker needs in order to do the work. In other embodiment, the POPT 700 does not obtain the commodity information from the host server 300, but the host server 300 receives a shopping order from the RSC 600 and sends the related commodity information to the POPT 700, or the information (bar-code or RFID tag) of the sample items corresponding the shopping items is received from the RSC 600 and sent to the host server 300 wirelessly. When the information stored in the bar-code or RFID tag is enough, the customer use the information for the shopping without the detailed information from the host server 300. The POPTs are placed on the charging stations 900, and when the customer chooses an RSC 600 arbitrarily from them on entering the store, the alarm at the POPT charging station is issued. The customer gets to know of the status of the POPT 700 according to the lamp light provided on the charging station; green for full charged status, red for partly charged status, and blinking for file downloading in progress. A plurality of shopping carts are deployed around the commodity item display section entrance.

The pre-shopping step corresponds to the steps from S3030 to S3090, in which the POPT 700 receives an operation start command from the host server 300 and the store worker installs the POPT 700 on the shopping cart 950 and puts the shopping cart with POPT in the commodity item display section. The host server 300 recognizes a new operation of the RSC 600 and instructs the POPT 700 with an alarm signal to start an operation (S3030). According to the instruction from the host server 300, the store worker detaches (S3040) the POPT 700 from the charging station 900, and the original identification number of the POPT 700 and the operation start message are sent to the host server 300 (S3050). The detached POPT 700 is switched on automatically or manually, booted up (S3060), and installed on the shopping cart 950 (S3070). The shopping cart 950 is identified with a traditional number plate and includes a bar-code or an RFID tag to make it easy to input the identification number into the POPT 700. The store worker reads the identification number with a bar-code reader or RF reader built in the POPT 700 and sends it to the host server 300 (S3080), and receives the identification number of the RSC from the host server 300 (S3090) and stores.

Figure 10B:
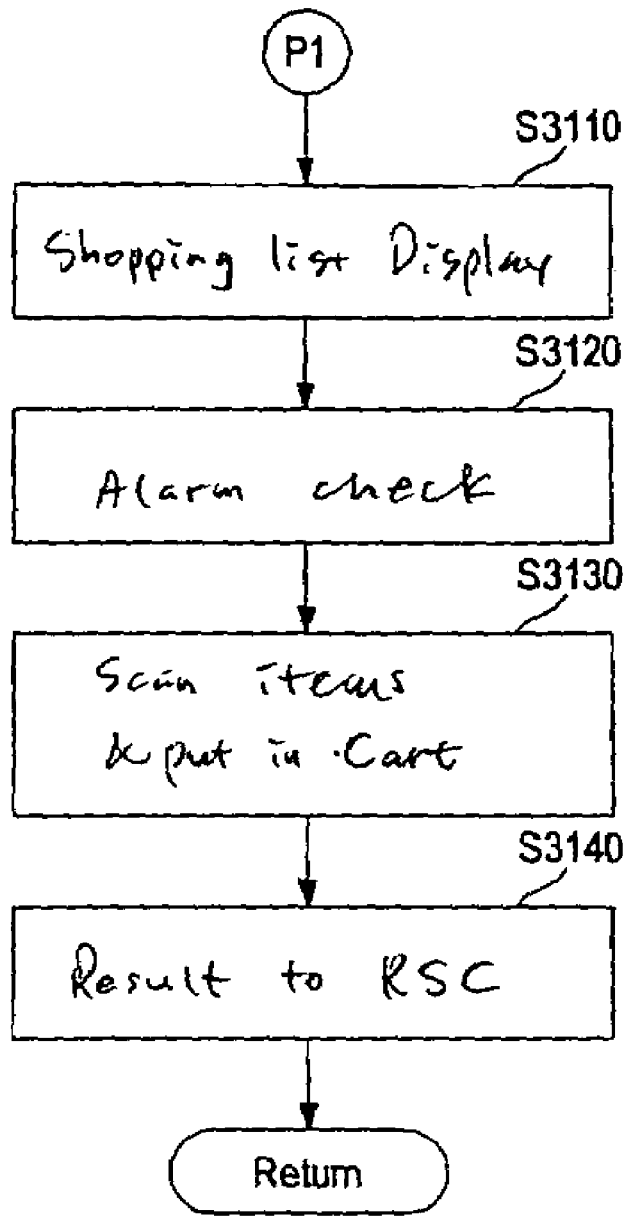
Figure 10C:
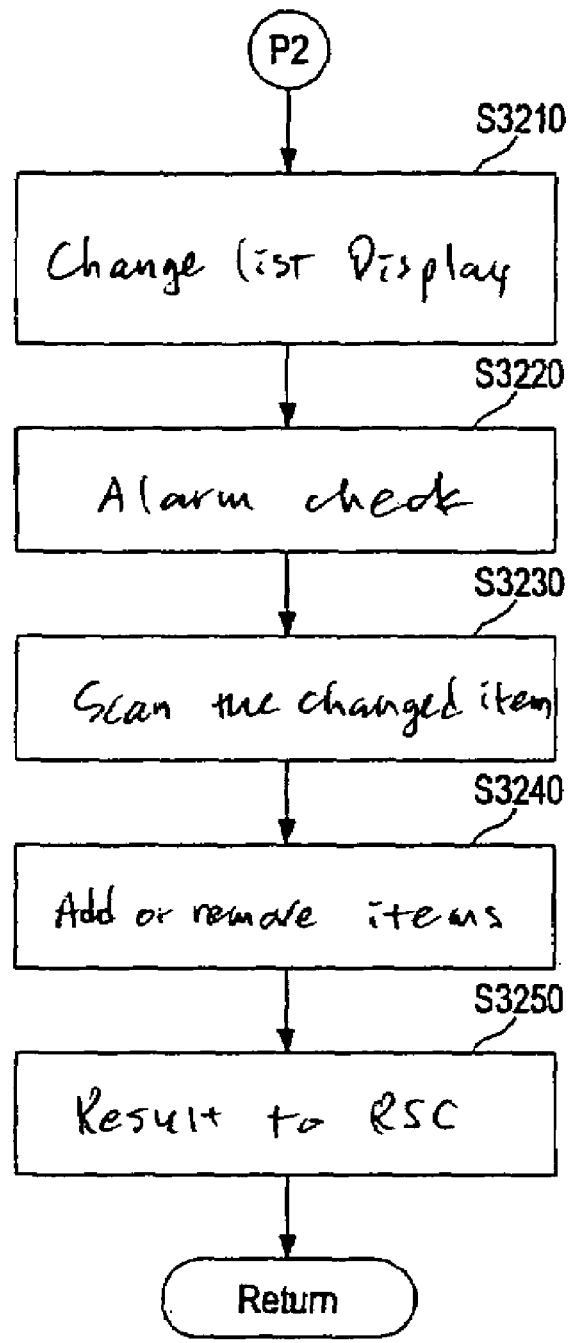

The shopping step corresponds to the steps S3100 and S3200 of FIG. 10*a*, the steps from S3110 to S3140 of FIG. 10*b*, and the steps from S3210 to S3250 of FIG. 10*c*, in which the store worker receives the shopping order from the RSC 600, collects the shopping items, removes or changes some of the items from the shopping cart upon the request of the customer, and sends the processed results to the RSC 600 with the POPT 700. The POPT 700 receives a shopping order from the RSC 600 and issues an alarm to inform the store worker (S3110). The store worker verifies (S3120) the received shopping list, moves to the commodity item display rack, reads in the information of the items with the bar-code or RF reader, and collects the shopping items in the shopping cart (S3130). When the shopping items are collected, the store worker sends the processed results to the RSC 600 through the POPT 700 (S3140). If the customer cancels or changes some of the items, the POPT 700 receives the cancel or change command, and issues an alarm to inform the store worker of the cancellation or change. The store worker verifies (S3220) the cancel or change command, reads (S3230) the information of the items to cancel or change with the bar-code or RF reader in the POPT 700, removes or changes the number of the items in the shopping cart (S3240). When the cancel or change order is done, the processed results are sent to the RSC 600 (S3250). The detailed information of the shopping items received from the RSC 600 is either the information stored in the memory of the POPT, the commodity information received from the host server 300 using the commodity number read in by the bar-code or RF reader in the RSC 600, or the commodity information directly read from the bar-code or the RFID tag with the bar-code or RF reader of the RSC 600. While doing the tasks such as a shopping order from the RSC 600, the bar-code or RF reader of the POPT 700 can be made to be limited to reading the bar-code or RF information of the shopping items only.

The POPT 700 may receive a "shopping cart: temporary waiting" command from the RSC 600. If it receives the command, the POPT 700 displays the command on the screen and issues an alarm. The POPT 700 may place a special order to store separately the temperature-sensitive items from the other items by displaying the list of the temperature-sensitive items on the screen. Then, the store worker puts the shopping cart on a waiting location and performs the task about the temperature-sensitive items if it is the case. In another embodiment, the temperature-sensitive items is put in a box of constant temperature from when collected in the shopping cart. The shopping is resumed when the POPT 700 receives a "shopping-resumed" command from the RSC 600. While the shopping was being suspended, the POPT 700 can be switched to a waiting mode to save the power of the battery.

Figure 10D:
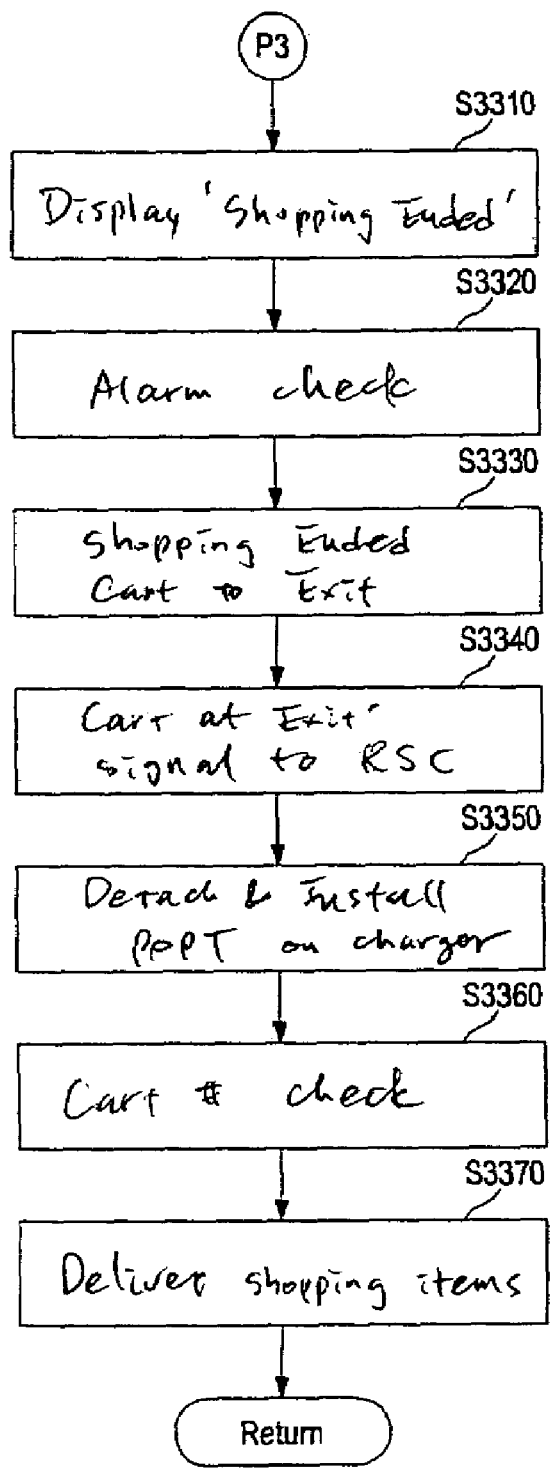

The post-shopping step corresponds to the step S3300 of FIG. 10*a* and the steps from S3310 to S3370 of FIG. 10*d*, in which the shopping cart is moved to the commodity item display section exit 1203 and the shopping items are handed over to the customer. If the customer informs finishing the shopping, the POPT 700 receives the "shopping-finished" message through the host server 300 and issues an alarm to let the store worker recognize (S3310). The store worker verifies (S3320) the message, performs the ordered task, and moves the shopping cart to the store exit (S3330). The store worker sends (S3340) a "shopping cart: waiting at the exit" message to the RSC 600, detaches the POPT 700 from the shopping cart, switches off, and puts on the charging station 900 (S3350). The cashier at the counter hands over the shopping cart with the shopping items to the customer (S3370).

The used shopping carts are retrieved by the store worker and put at a predetermined spot for the next customer. Also, it can be used traditionally by other customers. A traditional coin-unlocking system can be applied to encourage the customers to take the shopping cart to the predetermined spot, in which a customer is paid back the coin used to unlock the cart by returning the cart to the stack. The host server 300 charges to the RSC 600 in default in the beginning of the shopping, and reimburses the same amount when the customer returns the cart to a predetermined spot. The cashier can insert a coin into the coin-unlocking system right before the cart is put in the commodity item display section.

4) Data Interchange Between Devices

Figure 11A:
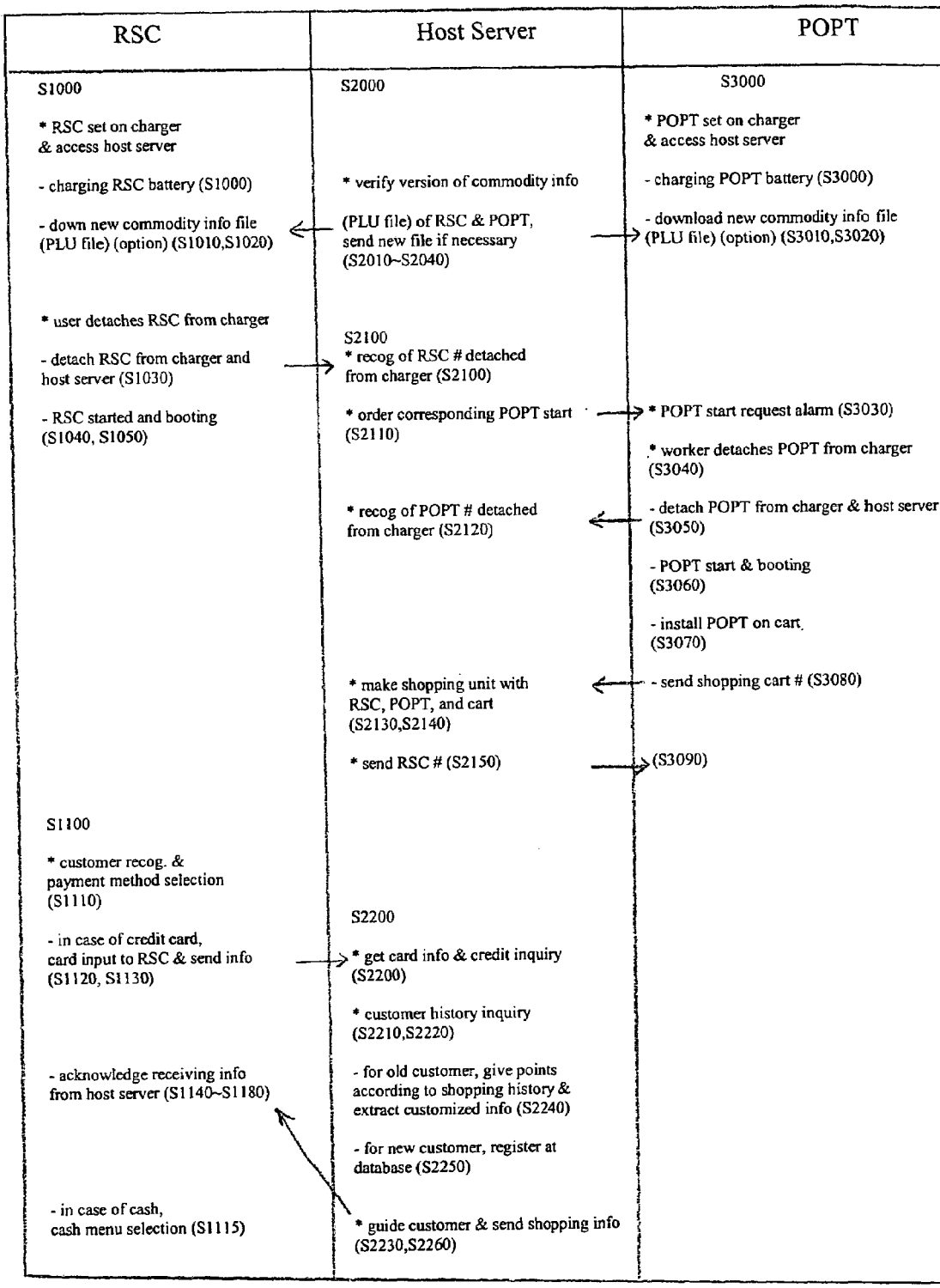
FIGS. 11a through 11c are diagrams showing the shopping procedures of the RSC, the server, and the POPT, and data flow between the devices.
Figure 11B:
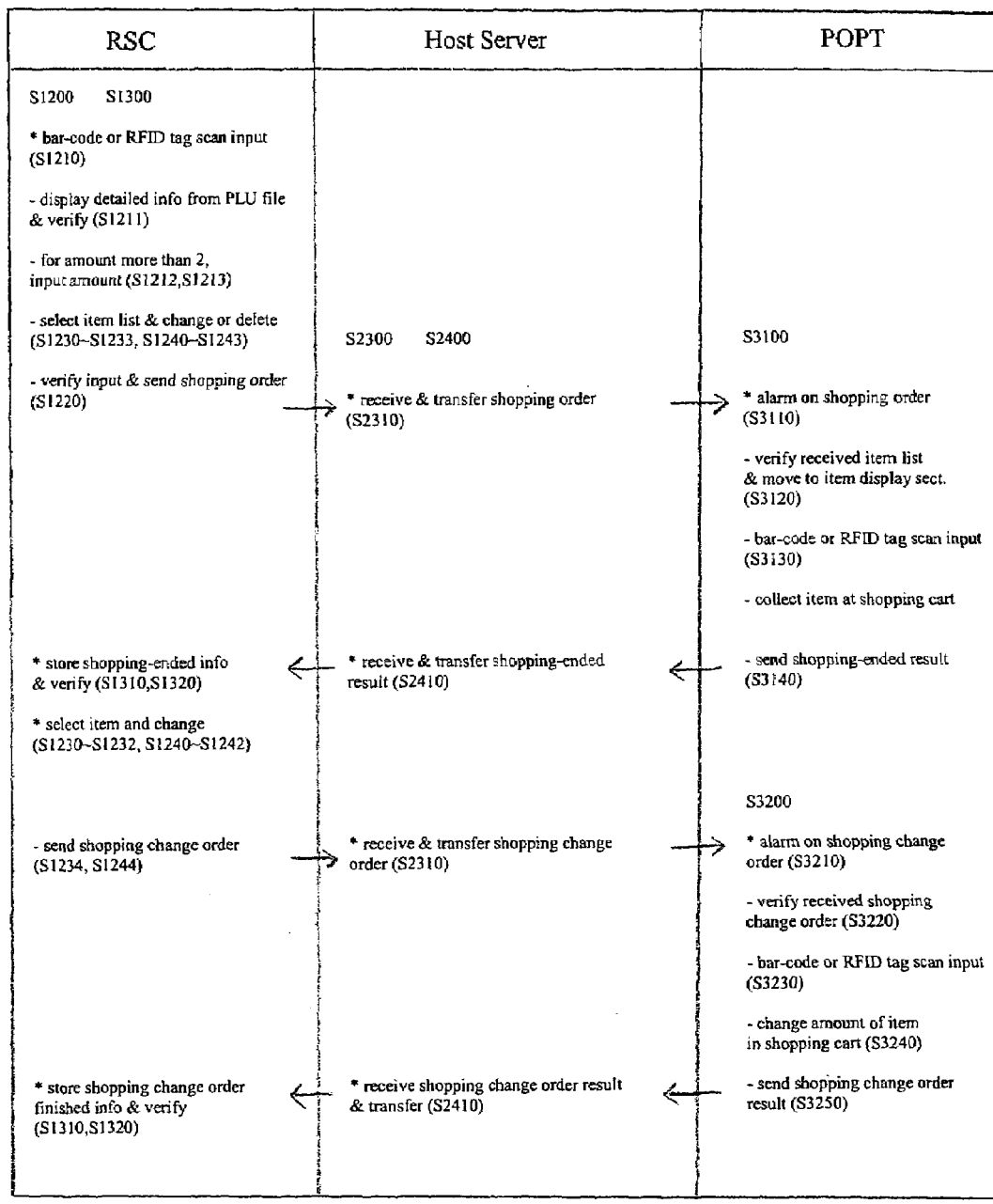
Figure 11C:
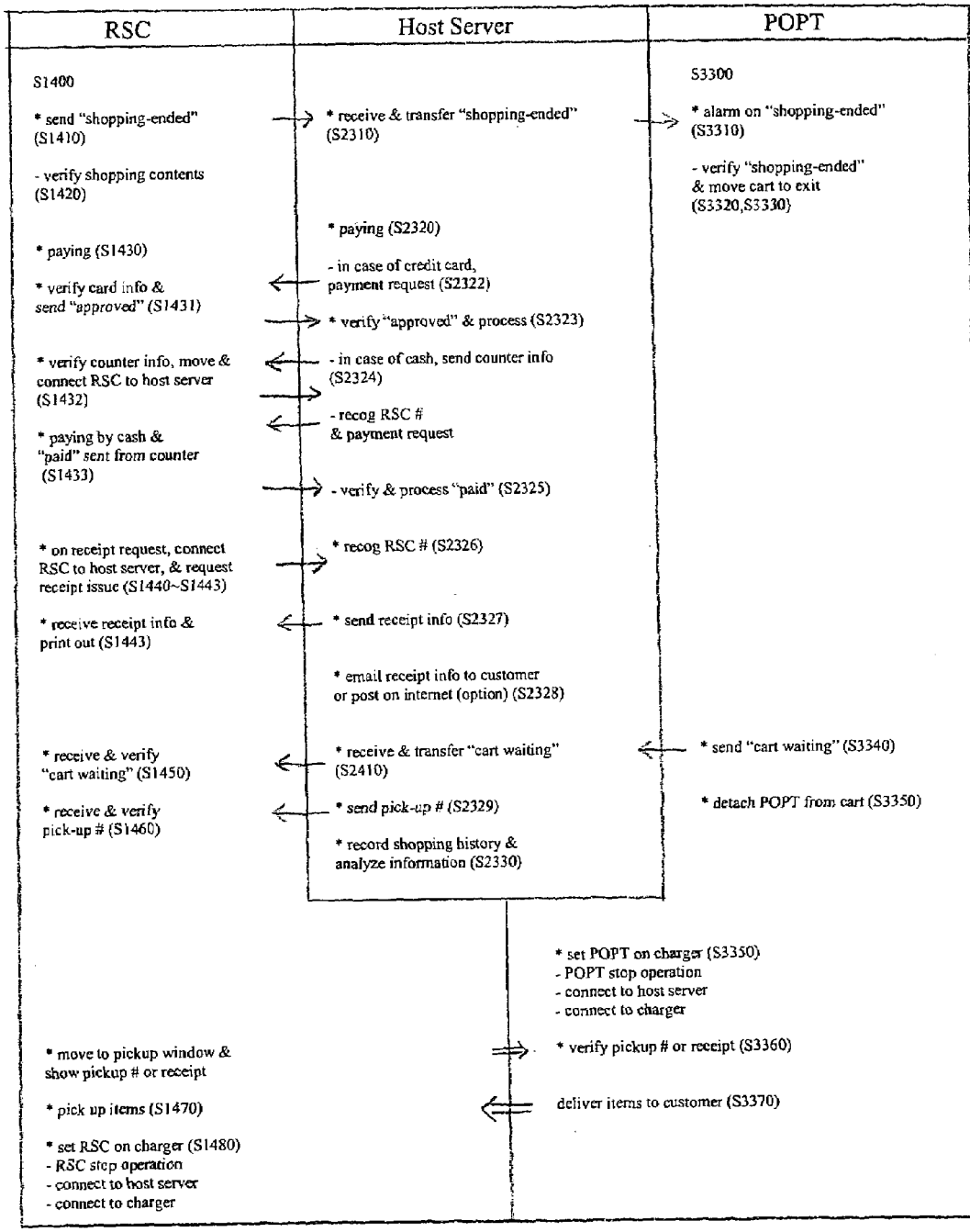

FIGS. 11a through 11c are diagrams showing the shopping procedures of the RSC, the server, and the POPT, and data flow between the devices. The flow of tasks are as shown in FIGS. 8 to 10. The data exchange between devices is denoted by the arrows.

Before the remote shopping starts, the RSC 600 and the POPT 700 are put on the charging stations 800, 900 respectively, and the host server 300 recognizes their status by wire 300. The host server 300 checks the version of the commodity information files in the memories of the RSC 600 and the POPT 700 and upgrades them with the latest version if necessary (S2010-S2040). This process can be skipped in an embodiment where the commodity information is not stored in the memories of the RSC 600 and the POPT 700. If the customer detaches and starts to operate the RSC 600 from the charging station 800, the host server 300 detects (S2100) it, commands (S2110) the start of operation of the POPT 700 on the charging station 900, and the store worker detaches (S3050) the POPT from the charging station, installs the POPT 700 on the shopping cart 950, and sends (S3080) the cart number to the host server 300. While the RSC 600 and the POPT 700 are detached and move around the store during the shopping, the data communication between the host server 300, the RSC 600, and the POPT 700 is performed through the wireless LAN 320. The host server 300 recognizes (S2120) the POPT, establishes (S2130, S2140) a shopping unit with the identification numbers of the RSC 600, the POPT 700, and the shopping cart 950, and sends (S2150) the original identification number of the RSC 600 to the POPT. After booting up, the RSC 600 prompts the customer to select how to pay. To pay by credit card, the customer swipes the credit card through a slot of the card reader 673 provided in the RSC 600, the RSC 600 sends the information to the host server 300 (S1130), and the host server categorizes the credit cards to old customers and new customers, prepares and sends a customized information to the RSC 600 (S2230, S2260). If the credit card is not approved, the host server issues an error message and request to select how to pay. If the customer chooses to pay by cash, the shopping starts (S1115) without any further verification procedures.

In a remote shopping, the customer decides on the shopping items by reading the bar-code or RFID tag with the bar-code or RF reader 671 and seeing the detailed information displayed on the screen of the RSC 600. The detailed information of the shopping items displayed on the screen of the RSC 600 is either the information downloaded from the host server 300 before the shopping starts, the commodity information received from the host server 300 using the commodity number read in by the bar-code or RF reader in the RSC 600, or the commodity information directly read from the bar-code or the RFID tag with the bar-code or RF reader of the RSC 600. The customer verifies or changes the list of the shopping items in the RSC 600, and sends (S1220) the shopping order to the POPT 700. The host server 300 receives the shopping order and sends it to the POPT 700 (S2310). The POPT 700 receives (S3120) the shopping order along with the "message-received" alarm (S3110), moves to the commodity item display rack, reads in the commodity information with the bar-code or RF reader 770 of the POPT 700, and collects the items in the shopping cart 950. The detailed information displayed on the screen of the POPT 700 is either the information stored in the internal memory, the commodity information received in real-time from the host server 300 using the commodity number read in by the bar-code or RF reader in the RSC 600, or the commodity information directly read from the bar-code or the RFID tag. The store worker sends (S3140) the processed results to the RSC 600 with the POPT 700, and the host server 300 transfers (S2410) the message to the RSC 600. If the customer wants to cancel or change some of the shopping items, the RSC 600 sends (S1234, S1244) the cancel or change command of the shopping order, the host server 300 sends (S2310) the command to the POPT 700, and the POPT 700 receives and verifies (S3220) the command. The store worker inputs (S3230) the bar-code or RFID tag of the items into the POPT 700, removes or changes (S3240) the amount of the items, and sends (S3250) the processed results to the RSC 600. The host server 300 receives the results and transfers (S2410) it to the RSC 600.

When the shopping is suspended temporarily, the RSC 600 sends the "shopping cart: temporary waiting" command, and the POPT 700 which receives the command via the host server 300 displays the "shopping cart: temporary waiting" on the screen along with the "command-received" alarm. On receiving the instruction, the store worker holds the shopping cart, and take a necessary measures on the temperature-sensitive items. To resume the shopping, the customer sends the "shopping-resumed" command to the POPT 700 with the RSC 600, the POPT 700 receives the command, and resumes the shopping.

After finishing the shopping, the customer sends (S1410) the "shopping-finished" message to the POPT 700 with the RSC 600, the host server 300 transfers (S2310) it to the POPT 700. The POPT 700 receives the "shopping-finished" message with the "message-received" alarm, and the store worker finishes the collecting of items and moves the shopping cart to the store exit (S3330). The host server 300 sends the request of paying to the RSC 600. To pay by credit card, the RSC 600 asks (S2322) the customer if she or he wants to pay with the same card as she or he provided the information before starting the shopping, and the customer verifies the card information and approves the paying (S1431). The host server 300 verifies and processes (S2323) the approval of paying from the RSC 600, and sends (S2329) the shopping item pick-up number or the card number to the RSC 600. The customer can pay by a credit card different from what she or he has chosen before the shopping starts. If the customer wants to pay in cash, the host server 300 sends (S2324) a guiding message to the RSC 600, the customer proceeds to the counter 340, connects the RSC 600 to the server interface 350, pays to the cashier at the counter, and the cashier sends (S1433) the "paid" message by inputting it to the counter terminal. The host server 300 recognizes (S2325) the processed results, and sends (S2329) the shopping item pick-up number or the card number to the RSC 600. When the customer wants a receipt, the customer connects the RSC 600 to the server interface at counter 350, downloads (S2327) the receipt information from the host server 300, and prints out (S1443) and gives the receipt to the customer. The shopping cart loaded with the shopping items is positioned at the store exit 1202, and the store worker sends (S3340) the "waiting at exit" message to the RSC 600, the host server 300 transfers (S2410) the message, and the customer verifies (S1450) the "waiting at exit" message. The used POPT 700 is switched off and placed on the POPT charging station 900 (S3350). The customer with the shopping item pick-up number or the receipt proceeds to the shopping item pick-up window 1203, shows the shopping item pick-up number or the receipt, and picks up the shopping cart (S1470) to finish the shopping. The used RSC 600 is switched off and put on the RSC charging station (S1480).

(4) Other Functions of the Remote Shopping System

By applying the remote shopping system of the invention, the following additional shopping method or service providing is possible.

1) Internet Shopping

The experienced customer with the above shopping system and method can perform a shopping even without a real shopping center. That is, the customer can perform a shopping just by accessing the host server, on which the shopping center manager builds a virtual shopping center in the cyber space. Preferably, the three-dimensional virtual shopping mall has the same layout as the real sample item display section such that the Internet shopping be similar to the real shopping performed with the RSC.

Figure 12:
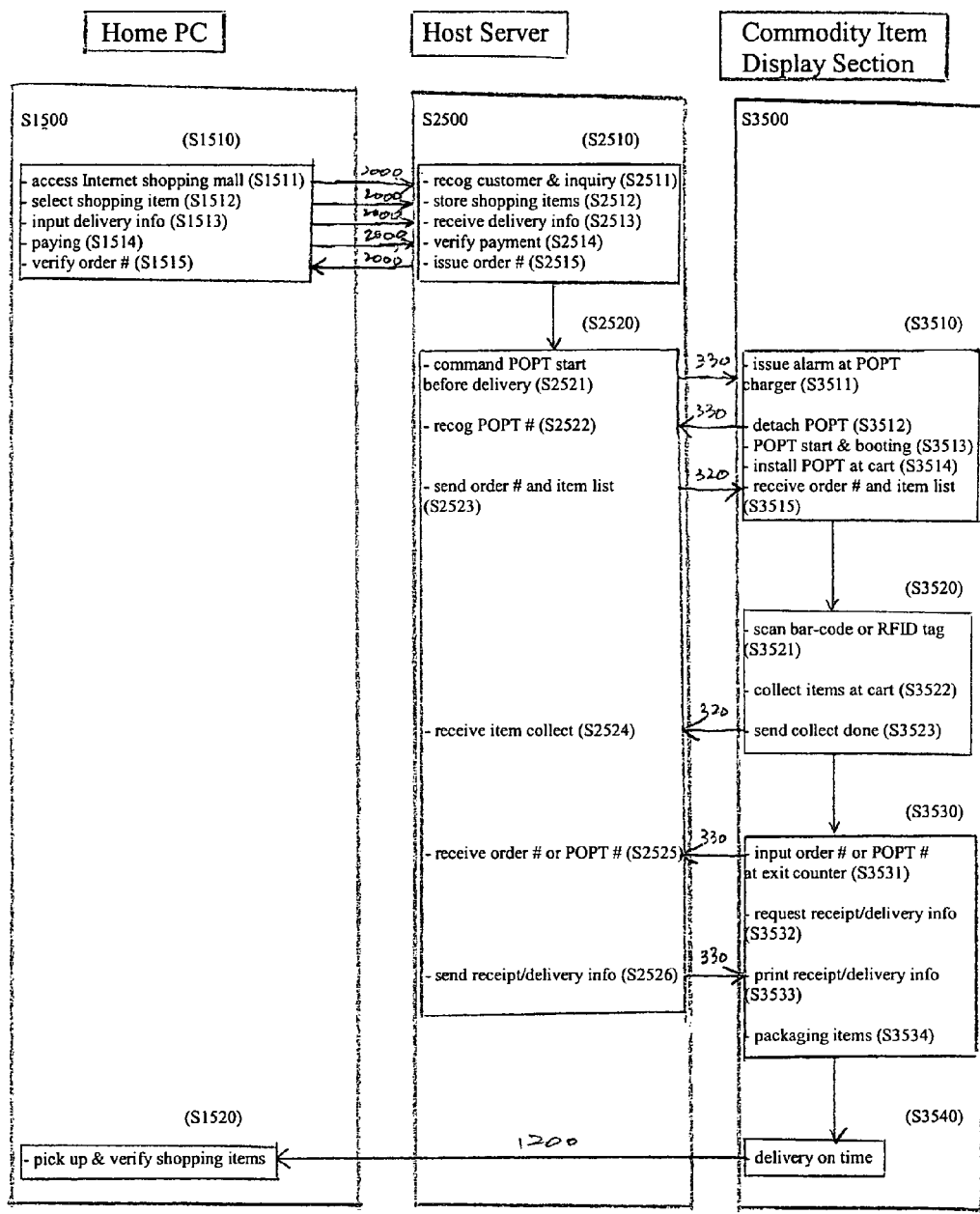
FIG. 12 is a diagram showing a Internet shopping procedures using the invention.
Figure 15:
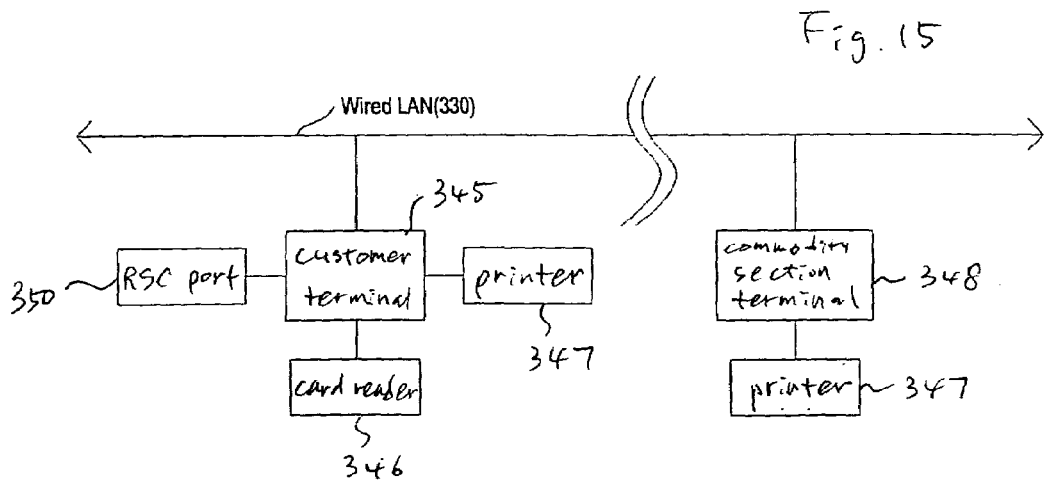
FIG. 15 is a diagram showing the layout of the terminals in the store.

FIG. 12 is a diagram showing a Internet shopping procedures using the invention. The host server builds and manages a virtual shopping mall (S2510) in the cyber space, which is similar to the sample item display section of the real shopping center. The customer accesses (S1511) the virtual shopping mall through the Internet 2000, registers, performs (S1512) a shopping by selecting the items, inputs (S1513) the delivery time and place, pays (S1514) for the items, and receives (S1515) an order number. In the virtual shopping mall (S1514) the host server of the shopping center recognizes the customer, verifies (S2511), stores (S2512) the list of shopping items, receives the shipping information of the customer, verifies (S2514) the approval of the paying, and issues (S2515) an order number to the customer. The host server stores the shopping order information and commands (S2521) to collect the ordered items a predetermined time period before the delivery time and to ship the shopping items to the customer, and the POPT in the commodity item display section follows the instruction from the host server and ships (S3500) the collected shopping items to the customer. If the host server orders (S2521) the POPT in the commodity item display section to operate, an alarm is issued (S3511) at the POPT charging station, the POPT is detached from the charging station by the store worker, and the host server recognizes (S2522) it. The POPT is booted up (S3513) on starting to operate, installed (S3514) on the shopping cart, and receives (S3515) the order number and the list of shopping items from the host server though the wireless LAN 320. The POPT proceeds to the commodity item display section, finishes the shopping by collecting (S3522) the items in the shopping cart while inputting the commodity information of the ordered items, and sends (S3523) a "shopping-finished" message to the host server. After finishing to collect the ordered items, the POPT inputs (S3531) the order number or the POPT original identification number to the store terminal 348 with a printer 347 in the commodity item display section in order for the host server to recognize (S2525), and requests (S3532) the information for the receipt and shipping, as shown in FIG. 15. The host server sends (S2526) the receipt and shipping information (time and place), and the store terminal 348 prints out (S3533) the information at the printer 347. The store worker packages the items, attaches (S3534) the receipt and the shipping information, and ships (S3540) to the address of the customer to meet the delivery date. The customer verifies the delivered shopping items and accepts (S1520) them.

2) Purchase by Reservation

The remote shopping system can be applied to a server of purchase by reservation. The purchase by reservation is to perform a shopping and pick up the shopping items later in a predetermined time, especially when the customer cannot shop due to a tight schedule or high concentration of purchase for a short time.

The purchase by reservation can be provided with the Internet shopping as well as with the remote shopping in a real shopping center. As shown in FIG. 12, in the purchase by reservation on the Internet, the customer inputs (S1513) the delivery time and location for the shopping items. In the purchase by reservation in the shopping center, the customer is provided with an option menu for the purchase by reservation on the RSC screen. The customer selects the option and inputs the delivery time and location on the RSC. After that, the customer inputs the credit card information into the RSC, inputs the commodity information for the shopping items with the bar-code or RF reader in the RSC in the sample item display section, and sends the list of shopping items and the delivery information to the host server. The following procedures are same as the steps S2520, S3510~S3540, and S1520 of FIG. 12 for the Internet shopping method.

The method for purchase by reservation using the Internet can be used conveniently even while the customer is on a trip, domestically or abroad, and applicable to interconnect a plurality of shopping centers scattered all around the world such that the customer on a trip purchases a necessary item at the destination in advance.

3) Purchase of Self-Packaging Commodity

The commodity items sold in the shopping center are packaged in advance and the information about them can be represented by the bar-code or RFID tag attached on the items. In some cases, the item is not pre-packaged, but the customer decides on the purchasing amount of the item displayed in the display rack.

The commodity of such a kind includes the items such as agricultural, fishing, or ranch products. The remote shopping can be applied to those commodities.

Figure 13:
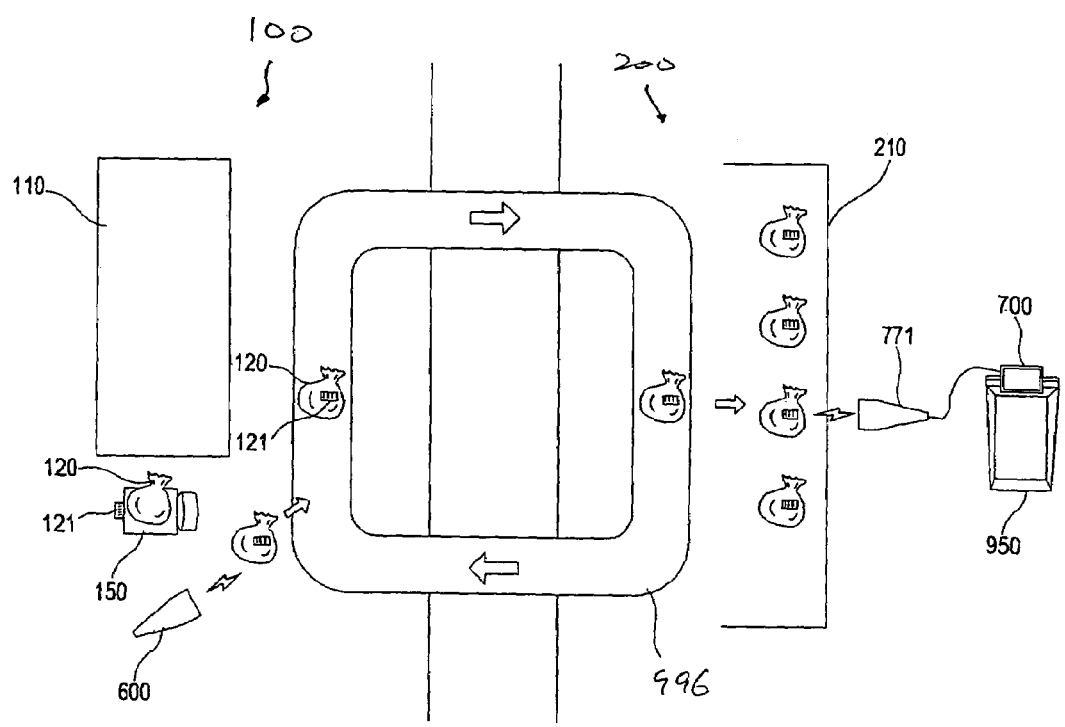
FIG. 13 is a schematic diagram showing a remote shopping of non-packaged items.

FIG. 13 is a schematic diagram showing a remote shopping of non-packaged items, in which the customer selects and packages the items in the sample item display section, carries them to the commodity item display section by the conveyor system 996 installed between the sample item display section and the commodity item display section. The unpackaged items are displayed in one section 110 of the display rack for sale such that the customer selects the item and its amount. There is a scale 150 in the display section 110, which includes a bar-code issuer that issues a bar-code 121, and a conveyor belt 996 is installed to transport the shopping items to the commodity item display section 200.

Figure 14:
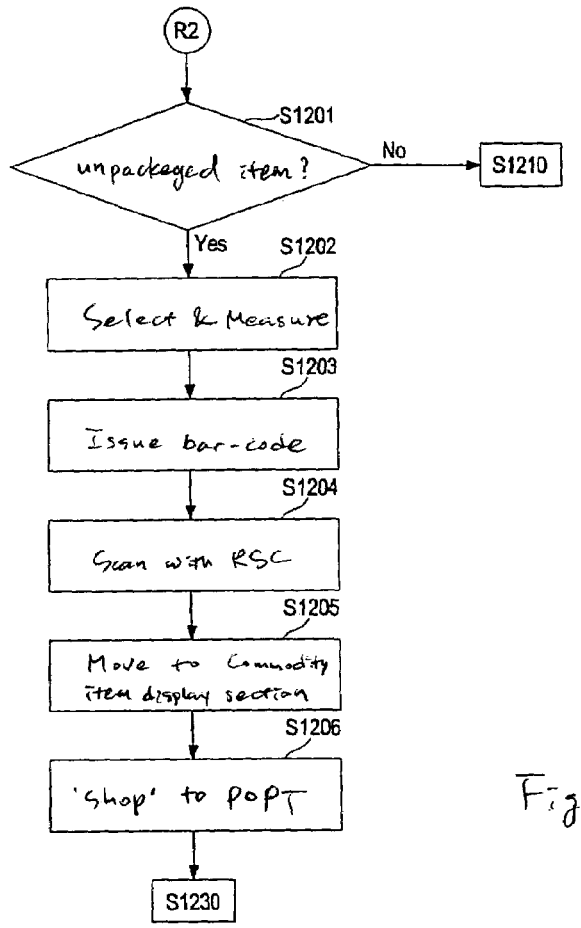
FIG. 14 is a flow chart of remote shopping of non-packaged items.

FIG. 14 is a flow chart of remote shopping of non-packaged items. When the customer purchases the unpackaged items (S1201), the customer chooses and packages 120 the items (S1202), weighs the items with the scale 150, and gets the bar-code 121 issued (S1203). The issued bar-code 121 includes the information on the name, weight, purchase time of the item. The customer attaches the bar-code 121 to the packaged item 120 and scans (S1204) the bar-code 121 with the bar-code reader built in the RSC 600. The scanned items 120 are placed on the conveyor belt 996, moved to the commodity item display section 200, and displayed at the corresponding location of the display rack 210. The customer sends (S1206) the shopping order inputted to the POPT 700. The store worker in the commodity item display section 200 receives the shopping order through the POPT 700, moves to the display rack 210, and collects into the shopping cart 950 the shopping items 120 the customer sent from the sample item display section 100. There can be a lot of items sent by a plurality of customers on the display rack 210, but they can be easily distinguished from one another by scanning the information such as the weight and purchase time of the items off the bar-code with the bar-code reader 771 built in the POPT 700. That is, if the bar-code information read by the POPT 700 does not match with the bar-code information sent by the RSC 600, an error message is issued. Therefore, it is easy to locate and collect into the shopping cart 950 the shopping items 120 the customer sent from the sample item display section 100. The RFID tag system is also used instead of the bar-code system for the invention. The shopping items are weighed and the information including weight and purchase time is stored in the RFID tag and the RFID tag is attached to the item, which is read by the RF reader built in the POPT 700.

4) Customer Management and Marketing

In the remote shopping system, since the customers register their credit cards or membership cards to pay, the shopping history is accumulated at the host server 300, and the store manager can use the database to analyze the customer's shopping amount and trends in order to provide the customer with a customized service. Using those analyses, the store manager can make the purchasing or inventory management or planning of them more efficient. The store manager can provide the information or service including the customized service, event, an shopping information to the customers in shopping with the RSC 600 or through the Email or Internet homepage.

Especially, the host server 300 analyzes the customer's shopping patterns including the frequency of sale and preference of a specific item from the accumulated database, produces the list of commodity items the customers would purchase most probably, and provides them to the customers. The customer consults the host server 300 for the list of hot commodity items with a computer before coming to the shopping center, adds other items she or he wants, or deletes some unnecessary items for the list, and finalizes and saves the list. The customer can perform the Internet shopping about the decided list of items or go to the shopping center to perform the real-time remote shopping. Or the customer downloads the list of the hot commodity items from the host server 300 through the RSC 600, adds them to the already inputted shopping items list D650-1, and performs the shopping by editing the list.

5) Calling Out Helper

During the remote shopping, a helper is needed when an operation error of devices or other unexpected events takes place. For that kinds of situation, there are installed a plurality of microphones and speakers across the store and the customer in trouble can push a button to call out a helper from the store. It can be done with a wired or wireless communication means. Or, the function of calling out helper can be added to the RSC 600 and the POPT 700. The device includes a built-in speaker, microphone, and a button and the communication is done by a wireless type. Therefore, the customer pushes the button on the caller device to talk with a helper or the store worker working in the commodity item display section through the host server if necessary.

6) Express Shopping

Some customers want to purchase predetermined shopping items within a short period of time without walking around the sample item display section. These customers can be served with a special terminals and related devices installed in the shopping center.

Figure 16:
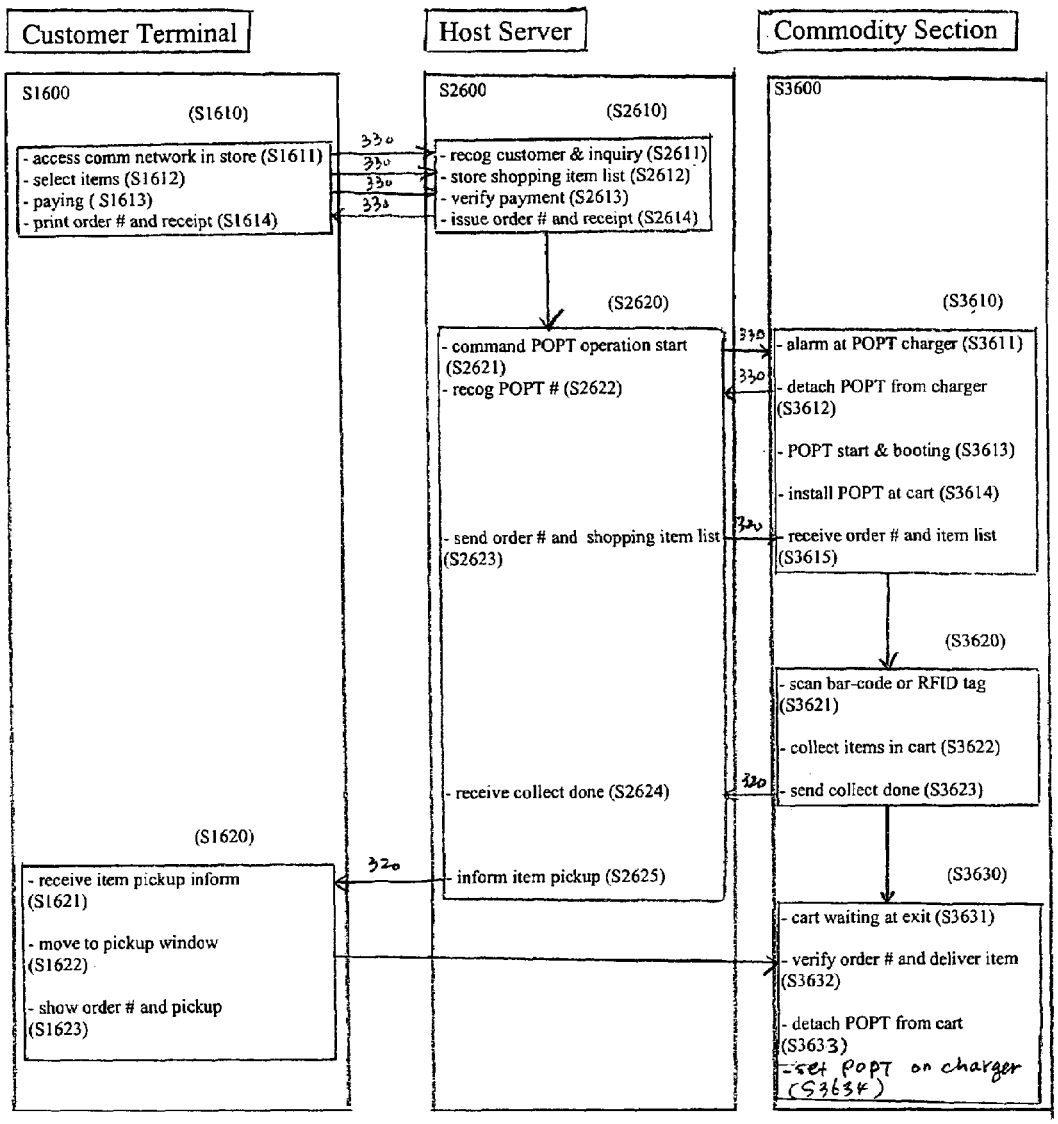
FIG. 16 is a schematic diagram showing the flow of tasks for the shopping.

FIG. 15 is a diagram showing the layout of the terminals in the store. One or more customer terminals with the related devices including card reader 34, printer 347, and RSC interface 350 are installed around the sample item display section 100, which are connected to the communication network 330 of the shopping center. FIG. 16 is a schematic diagram showing the flow of tasks for the shopping. The customer who wants the express shopping searches and decides (S1611, S1612) on the shopping items at the customer terminal 345 installed in the sample item display section using the commodity information contents provided by the host server 300. Or the customer can use the list of commodity items stored in the her or his own RSC 600 by connecting it to the interface 350. The contents on the commodity information the host server 300 provides can be organized according to the customer's convenience, one of which is the Internet shopping mall. The customer verifies the list of shopping items and pays (S1613) with the credit card or membership card by swiping the card through the card reader 346. If the customer uses her or his own RSC connected to the system, since the credit information of the customer stored in the customer's RSC can be used there is no need to go through the card reader to pay. The host server recognizes (S2611) the customer's access, provides the customer with the contents of commodity information, receives (S2612) the list of commodity items the customer selected, processes (S2613) the customer's paying, and orders (S2621) the POPT to start to operate. The host server also issues (S2614) the order number to pick up the items with and the receipt, and the customer downloads to the RSC or prints out (S1614) the order number and the receipt with a printer 347. The POPT charging station that received the request to start operation breaks an alarm (S3611), the POPT is detached (S3612) by the store worker, and the host server recognizes (S2622) it. The POPT is booted up (S3613) on starting operation, installed (S3614) on the shopping cart, and receives (S3615) the customer's order number and list of shopping items, which is recognized as an express shopping by the store worker. The store worker with the POPT proceeds to the commodity item display section, scans (S3621) and collects (S3622) the ordered items, and sends (S3623) the "shopping-finished" message to the host server. The host server which received (S2624) the "collection-finished" message informs (S2625) the customer with the RSC wirelessly. The shopping cart with the collected items is moved to and waits (S3631) at the store exit, and the customer proceeds (S1622) to the shopping item pick-up window. The customer shows the order number or receipt and picks up (S1623) the shopping items waiting at the exit to finish the shopping. After the shopping items are handed over (S3632), the POPT is detached (S3633) from the shopping cart and placed (S3634) on the charging station for the next use.

In this type of shopping, the number of commodity items is not large, what to shop is clear from the start, and the customer can save time to do the shopping.

(6) Personal Hand-held Electronic Device with RSC

The RSC 600 mentioned so far is provided at the store entrance in order for the customer to pick and use for the shopping, and the customer returns the RSC after shopping.

In another embodiment, the customer uses her or his own RSC without bothering to rent or return the RSC of the store. The personally owned RSC is either a type of specialized terminal with the function of RSC or a type of multi-functional terminal in which the function of RSC is combined with an arbitrary personal hand-held devices. The personal hand-held electronic device includes the personal devices with an information output or display means and information input and device control means. The combining type of RSC function includes an internal type and an external type. The personal electronic devices to which the RSC function can be combined include a cellular phone, PDA, digital camera, etc. which have the means for information display and device control.

Figure 17:
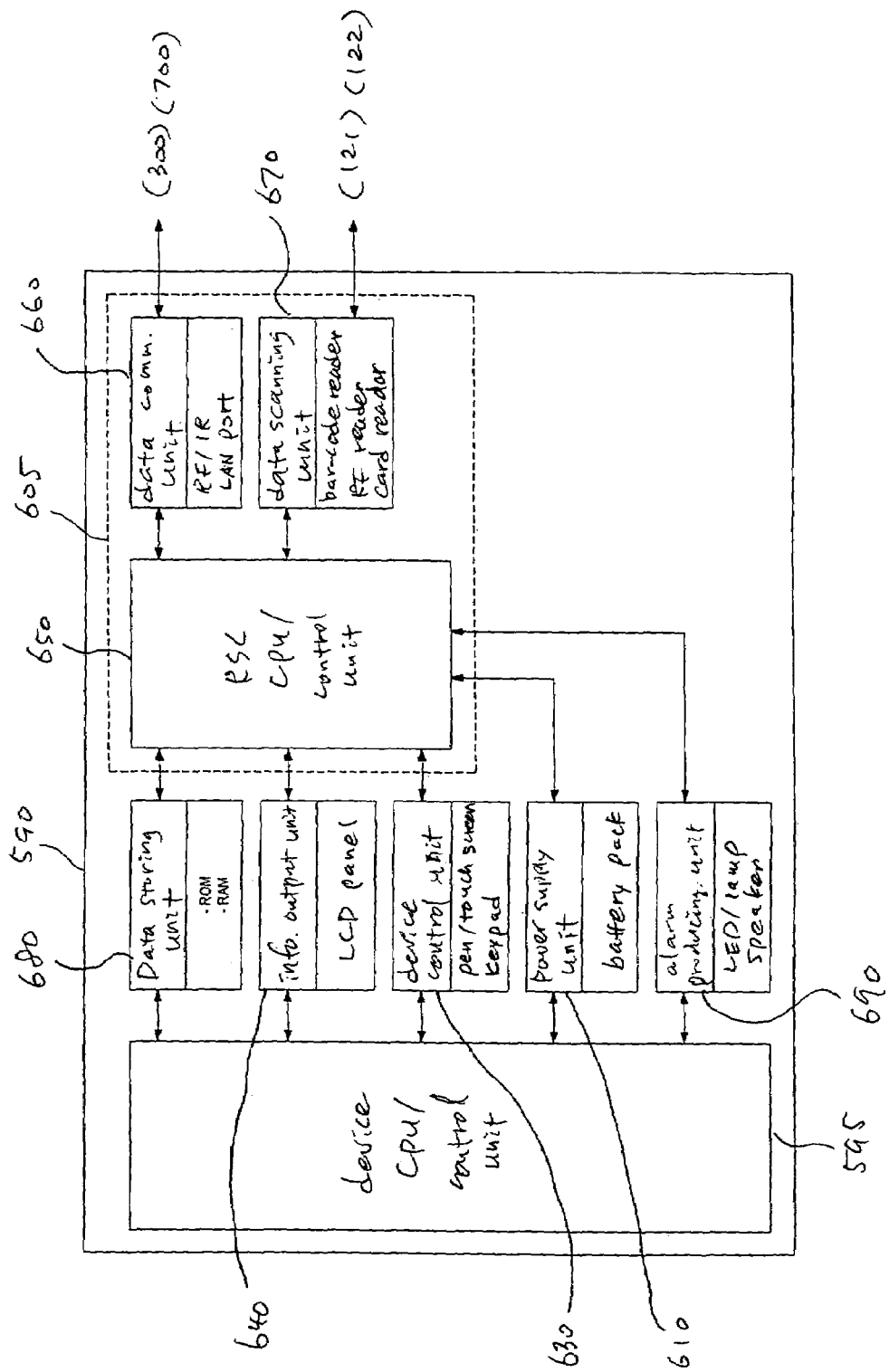
FIG. 17 is a block diagram of internal circuitry of a personal electronic device with functions for RSC.

FIG. 17 is a block diagram of internal circuitry of a personal electronic device with functions for RSC. The personal electronic device is preferably a cellular phone or PDA with the RSC function built in. The personal hand-held electronic device 590 includes a core module and general-purpose modules. The general-purpose modules include a data storing unit 680, an information output/display unit 640, a device control/information input unit 630, a power supply unit 610, and an alarm sound/light producing unit 690, and interacts with the core module including a CPU 595 to make the device work properly. The personal hand-held electronic device 590 includes an internal type of RSC 605. The internal RSC 605 does not include a data storing unit 680, an information output unit 640, a device control unit 630, a power control unit 620, a power supply unit 610, and an alarm sound/light producing unit 690 among the parts for the regular RSC shown in FIG. 4, but shares the data storing unit 680, the information output unit 640, the device control unit 630, the power supply unit 610, and the alarm sound/light producing unit 690 with the personal hand-held electronic device 590. In the internal type of RSC 605 combined with the personal hand-held electronic device 590, the CPU 650 can be included in the original CPU 595 of the personal hand-held electronic device 590 to form a CPU. Also, the credit information of the customer can be input by the key inputs or by downloading from a computer using an interface such as LAN port of data communication unit 660, in which case the magnetic tape or RF card reader in the data scanning unit 670 can be discarded. This multi-purpose device can be used for the original purpose of the device in normal situation, and can work as an RSC by a simple switching of the functions. The customer can switches the functions of the device 590 back and forth as frequently as she or he wants. If the device 590 is a cellular phone, the customer can talk with the store worker performing the shopping. The communication is achieved with a traditional cellular phone network (WAN) or wireless LAN (WLAN) for the store.

Comparing to the regular RSC 600, the personally owned hand-held RSC or multi-purpose electronic device with RSC function 590 is easy to use because there is no need to check out or return. Also, since the customer is accustomed to the device already, the customer can control the device in storing or editing the shopping information.

Figure 18:
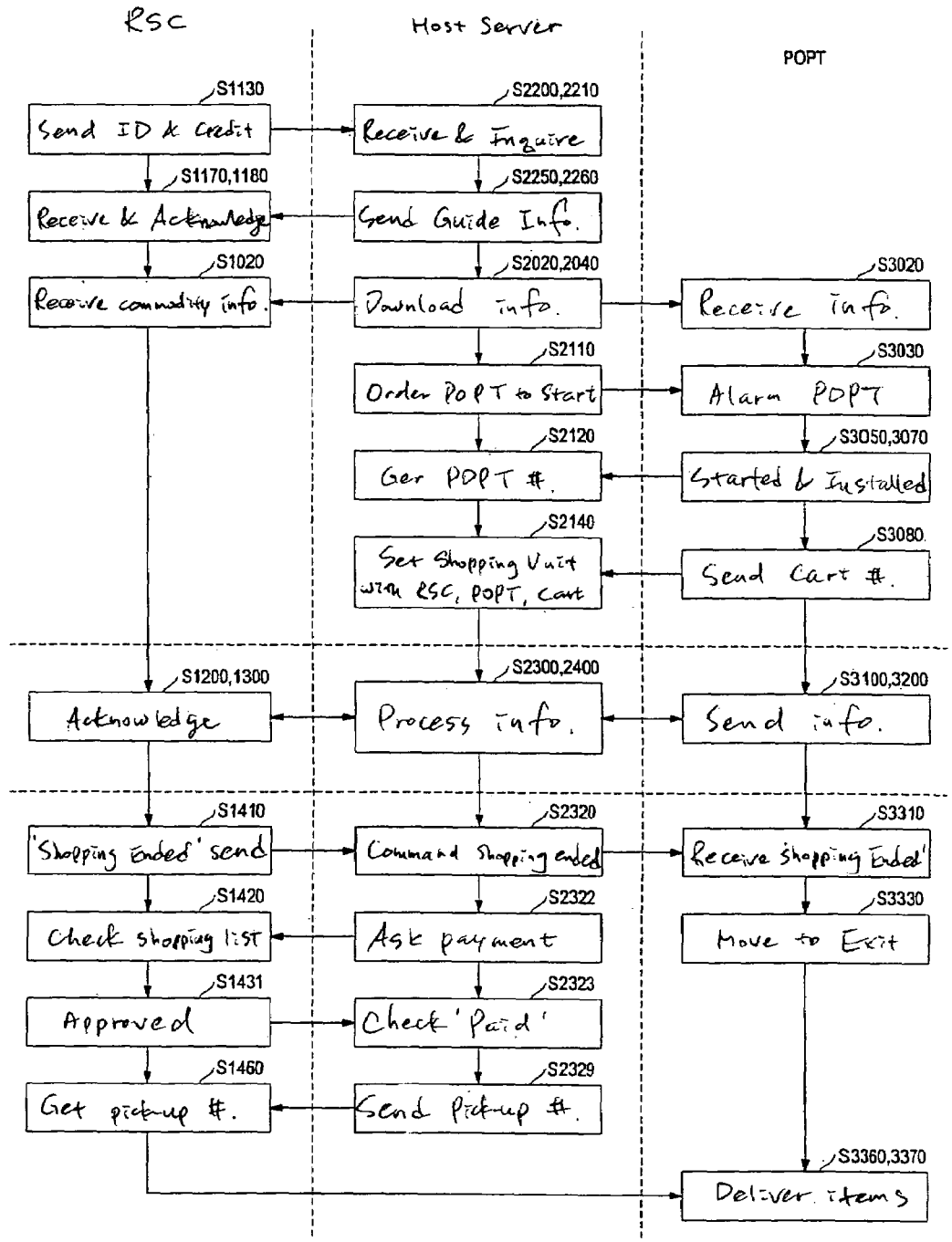
FIG. 18 is a schematic diagram showing the shopping procedures of the personal RSC, the server, and the POPT, and data flow between the devices.

FIG. 18 is a schematic diagram showing the shopping procedures of the personal RSC, the server, and the POPT, and data flow between the devices.

The operation of the personally owned hand-held RSC or multi-purpose electronic device with RSC function 590 can be divided into the pre-shopping, shopping, and post-shopping stages as shown in FIG. 18.

The pre-shopping step with the personal RSC 590 corresponds to the steps from S1130 to S1020 of FIG. 18. The personal or credit information of the customer, which is already input/stored to the personal RSC by the key pad or computer or Internet access, is sent (S1130) to the host server 300 in a wired or wireless communication. The host server 300 receives the personal credit information, verifies (S2200, S2210) it using its own database 310 or the database of other external organization 3000 through the external communication network 2000, produces a guide or shopping information customized to the old or new customers, and sends (S2250, 2260) them to the personal RSC 590. The host server 300 downloads (S2020) the commodity information file to the personal RSC 590, and the personal RSC 590 receives and stores (S1020) the information. On the other hand, the POPT, which is being charged in the commodity item display section, downloads (S3020) the commodity information file from the host server 300. The host server 300, which downloaded the credit information from the personal RSC 590, commands (S2110) the POPT to start operation, the POPT alerts (S3030) the command from the host server 300, and the store worker detaches the POPT from the charging station, installs it on the shopping cart, and starts (S3050, S3070) the operation of the POPT. The host server 300 establishes (S2140) as a shopping unit out of the identification number of POPT (S2120) and the identification number of the shopping cart (S3080) along with the proper identification number of the customer based on the credit information. By using the personal RSC 590 in the pre-shopping step, the customer takes advantages regarding to the checking out of the RSC and the paying. The related operation of the host server and the POPT is disclosed in the explanation of FIGS. 8 through 11. The additional explanation of operation of the host server and the POPT can be found in the explanation about FIG. 8a, FIG. 8b, FIG. 9a, FIG. 9b, FIG. 9c, FIG. 10a, and FIG. 11a.

The shopping step with the personal RSC 590 corresponds to the steps S1200 and S1300 of FIG. 18, which is same as that with RSC 600. In the case of multi-purpose electronic device, its functions can be switched back and forth during the shopping. The operation of the host server and the POPT is same as in the explanation for FIGS. 8 through 11, and therefore the detailed shopping steps can be found in the explanation for FIG. 8a, FIG. 8c, FIG. 8d, FIG. 9a, FIG. 9d, FIG. 9e, FIG. 10a, FIG. 10b, FIG. 10c, and FIG. 11b.

The post-shopping step with the personal RSC 590 corresponds to the steps from S1410 to S1460, in which if the customer sends (S1410) a "shopping-finished" signal to the host server, the server receives (S2320) it, and sends it to the POPT. The host server calculates the shopping items and requests (S2322) a payment to the personal RSC 590 of the customer, and then the customer verifies (S1420) the shopping list and selects the paying means including the credit card and approves (S1431) the paying. The host server receives the approval, processes (S2323), and then sends (S2329) the item pick-up number or cart number to the personal RSC 590. On the other hand, the POPT finishes the work up the reception (S3310) of the "shopping-finished" signal, and moves to the store exit (S3330). There the POPT is detached from the shopping cart and placed on the charging station, and the shopping cart with the collected items waits at the store exit. The customer who received (S1460) the item pick-up number with the personal RSC proceeds to the commodity item display section exit, shows the item pick-up number, and picks up (S3360, S3370) the shopping items. The step to return the RSC is discarded by using the personal RSC. The operation of the host server and the POPT is found in the explanation for FIGS. 8 through 11, and therefore the detailed or additional steps are found in the explanation for FIG. 8a, FIG. 8e, FIG. 9a, FIG. 9d, FIG. 9e, FIG. 10a, FIG. 10d, and FIG. 11c.

The personal hand-held electronic device or terminal 590 including the RSC may have a various size of screens or various types of keypads.

The method and system for the real-time remote shopping in the above has the following features. The shopping center is divided into two parts; a sample item display section and a commodity item display section and includes some neighboring facilities. The RSC and the POPT communicate the shopping information in real-time through a wired or wireless communication controlled by the host server, and perform the registration, shopping, and paying. Additional shopping methods including the Internet shopping, purchasing by reservation, and express shopping are possible under the invention, and the management of the store and the customers is facilitated.

The combination of the various embodiments of the present invention may be preferable. The real-time remote shopping, Internet shopping, purchasing by reservation, and express shopping using the regular RSC 600 and the personal RSC 590 can be performed at the same time at the same shopping center. In such a situation, the procedures of recognizing the customer, providing the commodity information, managing the shopping information, paying the shopping, managing the customers may be embodied in various ways. Also, the variation of the devices and systems is possible within the scope of the present invention. That is, the specification of the units of the RSC or POPT may be changed; added or discarded. The terminals or ports in the communication network and the change of locations for the devices can be changed, too.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A method for real-time remote shopping using a real-time remote shopping system, wherein the system comprises:

a first building space comprising a sample item display section;

a second building space comprising a commodity item display section;

a first terminal for communicating a shopping information in the first building space; and a second terminal for communicating the shopping information in the second building space, wherein the method comprises the steps of:

obtaining the shopping information with the first and second terminals;

processing the shopping information with the first and second terminals to produce a shopping data; and communicating the shopping information and the shopping data among the first terminal and the second terminal, wherein the system further comprises 1) a hand-held terminal for customer in a sample item display section comprising a device for registration and pay, a device for obtaining a commodity information, and a communication device to communicate a shopping request information with other corresponding terminals;

2) a mobile terminal for worker in a commodity item display section comprising a communication device to communicate the shopping request information with other corresponding terminals and a device to obtain a commodity information; and 3) a host server comprising a wired/wireless communication device relaying the shopping request information between the terminals and providing a derived information to the terminals, wherein the method further comprises the steps of:

a) obtaining the commodity item information from the hand-held terminal for customer and registering the information on the customer;

b) sending the shopping request information including the commodity item information to the host server or the mobile terminal for worker through the wired/wireless communication device;

c) receiving, at the mobile terminal for worker, the shopping request information from the hand-held terminal for customer or the host server, and sending the shopping data processed in real-time to the host server or the hand-held terminal for customer;

d) receiving, at the hand-held terminal for customer, the shopping data from the server or the hand-held terminal for customer; and e) sending, at the hand-held terminal for customer, a shopping-ended signal to the host server or the hand-held terminal for customer, and paying the price.

2. The method of claim 1, wherein each of the hand-held terminal and the mobile terminal for worker has a proper identification information including identification number or owner's credit information, wherein the host server produces and assigns an additional identification number to the hand-held terminal and the mobile terminal for worker during the wired or wireless communication, wherein the host server recognizes the hand-held terminal and the mobile terminal for worker by the proper identification information or by the additionally produced/assigned identification number.

3. The method of claim 1, wherein the host server checks the version of the commodity information file stored in the built-in memories of the hand-held terminal and the mobile terminal for worker and upgrades with a latest version.

4. The method of claim 1, wherein the hand-held terminal and the mobile terminal for worker are switched on automatically or manually, boot up, and display a predetermined initial screen when detached from the charging stations.

5. The method of claim 1, wherein the host server issues an alarm to request starting operation to the mobile terminal for worker on the POPT charging station, when the host server detects the detachment of the hand-held terminal for customer from the RSC charging station or receives the personal or credit information of the hand-held terminal.

6. The method of claim 1, wherein the host server recognizes the identification numbers of the hand-held terminal, the mobile terminal for worker, and cart, and establishes a shopping unit with the set of the identification numbers.

7. The method of claim 1, wherein the host server receives the personal or credit information from the hand-held terminal, categorizes the customer into new, present, or anonymous, produces a shopping information customized to the customer, and sends the shopping information to the hand-held terminal.

8. The method of claim 1, wherein the commodity information displayed on the hand-held terminal for customer to verify is retrieved from the built-in memory of the hand-held terminal, from the database of the host server, or from the bar code or RF tag on the sample item.

9. The method of claim 1, wherein the mobile terminal for worker having an alarm device receives a purchase orders of commodity items, including changing and canceling, issues an alarm, and displays the shopping item list on the mobile terminal for worker.

10. The method of claim 1, wherein inputting the commodity information into the mobile terminal for worker is allowed under the condition that the commodity information matches with the information on the commodity items, including changing and canceling, received from the hand-held terminal for customer, and the processed result of the information on the commodity items, including changing and canceling, is sent in real-time to the hand-held terminal for customer.

11. The method of claim 1, wherein when the hand-held terminal for customer sends out the shopping-ended message the host server issues message-received alarm to the hand-held terminal for customer, the mobile terminal for worker sends a cart's waiting-at-exit message to the hand-held terminal for customer, the host server sends a pay-requesting message to the hand-held terminal for customer, and the hand-held terminal for customer sends a pay-approved message to a host server through a wired or wireless communication network.

12. The method of claim 1, wherein on receiving the pay-approved message the host server sends a receipt or an identification number of a cart for picking up of items to the hand-held terminal for customer.

13. The method of claim 1, wherein the hand-held terminal for customer is rented in the sample item display section, wherein the method comprises the steps of:
 1) charging the hand-held terminal for customer and the mobile terminal for worker on respective charging stations, and upgrading the commodity information in the hand-held terminal for customer and the mobile terminal for worker on the same charging stations, wherein the charging station comprises a charging port and a server interface, wherein a battery in the hand-held terminal for customer or the mobile terminal for worker is charged by the charging port, wherein the commodity information on the terminal memory built in the hand-held terminal for customer or the mobile terminal for worker is checked and upgraded with the latest version of the commodity information by the host server;
 2) starting the hand-held terminal for customer or the mobile terminal for worker before shopping and setting as a shopping unit with an identification number, on detaching from the RSC or POPT charging station, wherein the hand-held terminal for customer detached from the RSC charging station is started automatically or manually and initialized, wherein the host server recognizes the hand-held terminal for customer detached from the RSC charging station and issues an alarm to the POPT charging station in the commodity item display section, wherein the mobile terminal for worker detached from the POPT charging station is started automatically or manually and initialized, wherein the identification number of a cart is inputted into the mobile terminal for worker installed automatically or manually on the cart and sent to the host server;
 3) selecting paying method and recognizing a customer, comprising categorizing the customer into new, present, or anonymous, by the host server, producing a shopping information customized to the customer, and sending the shopping information to the hand-held terminal for customer;
 4) taking and verifying the commodity information including bar-code or RFID tag, comprising inputting the commodity information and the amount into the hand-held terminal for customer comprising a bar-code/RF reader;
 5) requesting and transacting shopping, comprising sending the purchase orders on commodity list, including changing and canceling, that inputted into the hand-held terminal for customer, to the host server or the mobile terminal for worker, issuing an order-received alarm on receiving orders at the mobile terminal for worker in the commodity item display section, and collecting, including changing the amount or removing, the ordered items in the cart, inputting the information on the collected items, and sending the transaction results to the hand-held terminal for customer;
 6) ending shopping and paying, comprising sending the shopping-ended message to the hand-held terminal for customer, the mobile terminal for worker's issuing an message-received alarm, finishing the shopping in process, moving the cart to the commodity item display section exit, the host server's sending the pay-requesting message according to the selected paying method to the hand-held terminal for customer, sending the paying-by-credit approval message to the host server in the case of paying by credit, the host server's sending a counter-guide message to the hand-held terminal for customer in the case of paying by cash, recognizing the hand-held terminal for customer connected to the communication network at the counter, inputting the 'paid' message at the counter terminal with paying by cash; and
 7) picking up the shopping commodity and retrieving the shopping equipments by switching off and returning to the respective charging stations for the next usage, wherein the host server sends the identification number of the cart to the hand-held terminal for customer to pick up the shopping commodity, the mobile terminal for worker on the shopping cart that moved to the commodity item display section exit sends a waiting message to the hand-held terminal for customer, and the customer proceeds to the pick-up window, picks up the shopping commodity on showing the cart identification number.

14. The method of claim 1, wherein the hand-held terminal for customer comprises a hand-held electronic device owned personally by the customer, wherein the shopping method comprises steps of:
 1) storing and upgrading the personal or credit information in the hand-held terminal, wherein the hand-held electronic device takes and stores the personal and credit information through an input means including a keypad or a card reader or by wired or wireless accessing of a related database, and the hand-held electronic device downloads or upgrades the commodity information through the wired or wireless communication network;
 2) charging and upgrading the commodity information of the mobile terminal for worker on the POPT charging station comprising a charging port and a server interface, wherein a battery in the hand-held electronic device is charged by the charging port, and the commodity information on the memory built in the hand-held electronic device is checked and upgraded with the latest version of the commodity information by the host server;

3) starting the hand-held electronic device before shopping and setting a shopping unit with an identification number, wherein when the hand-held electronic device is switched on and sending the personal and credit information to the host server, the host server recognizes the hand-held electronic device and issues an alarm to the POPT charging station in the commodity item display section, and a mobile terminal for worker recognized by the host server is switched on automatically or manually and initialized, and the identification number of a cart is inputted into the mobile terminal for worker installed on the cart automatically or manually and sent to the host server;

4) providing the customer with a pre-shopping guide, wherein the host server searches for the credit information and purchase history of the customer, producing the information on service and shopping customized for the customer, and sends the information to the screen of the hand-held electronic device through the wired or wireless communication network inside the store;

5) taking and verifying the commodity information, comprising inputting the commodity information and the amount of the item to shop with the hand-held electronic device having bar-code or RFID tag reader and verifying the detailed information including commodity information by retrieving from the built-in memory of the hand-held electronic device or from the database of the host server and displaying at the screen of the hand-held terminal for customer;

6) requesting and transacting shopping, comprising sending the purchase orders on commodity list, including changing and canceling, that inputted into the hand-held electronic device, to the host server or the mobile terminal for worker issuing an alarm on receiving orders at the mobile terminal for worker in the commodity item display section, and collecting, including changing the amount or removing, the ordered items in the cart, inputting the information on the collected items, and sending the transaction results to the hand-held electronic device;

7) ending shopping and paying, comprising sending the shopping-ended message to the hand-held electronic device, the mobile terminal for worker's issuing an message-received alarm, finishing the shopping in process, moving the cart to the commodity item display section exit, the host server's sending the pay-requesting message to the hand-held electronic device, and the hand-held electronic device's sending pay approval message to the host server; and 8) picking up the shopping commodity and retrieving the mobile terminal for worker by switching off and returning to the POPT charging station for the next usage, wherein the host server sends the identification number of the cart to the hand-held electronic device to pick up the shopping commodity, the mobile terminal for worker on the shopping cart that moved to the commodity item display section exit sends a waiting message to the hand-held terminal for customer, and the customer proceeds to the pick-up window, picks up the shopping commodity on showing the cart identification number.

15. A system for real-time remote shopping comprising a first building space comprising a sample item display section;

a second building space comprising a commodity item display section;
a first terminal for communicating a shopping information in the first building space comprising a hand-held terminal for customer; and
a second terminal for communicating the shopping information in the second building space comprising a mobile terminal for worker,
wherein the first and second terminals communicate the shopping information with each other to perform a remote shopping in real-time,
wherein the system further comprises a host server comprising a wired/wireless communication device relaying the shopping information between the first and second terminals and providing a derived information to the first and second terminals,
wherein the system further comprises:
a) a hand-held terminal for customer in a sample item display section comprising a device for registration and pay, a device for obtaining a commodity information, and a communication device to communicate a shopping request information with other corresponding terminals;
b) a mobile terminal for worker in a commodity item display section comprising a communication device to communicate the shopping request information with other corresponding terminals and a device to obtain a commodity information; and
c) a host server comprising a wired/wireless communication device relaying the shopping request information between the terminals and providing a derived information to the terminals.

16. The system of claim 15, wherein the sample item display section comprises
a) a sample item with an electronically readable commodity information attached;
b) a sample item display rack;
c) a wired or wireless communication network for exchanging information between wired or wireless terminals in the store;
d) a charging station for charging a battery of the hand-held terminal and accessing the host server; and
e) a customer terminal and a counter terminal connected to the wired or wireless communication network for processing the shopping task of the customer and the worker.

17. The system of claim 15, wherein the commodity item display section comprises
a) a commodity item with an electronically readable commodity information attached;
b) a commodity item display rack;
c) a wired or wireless communication network for exchanging information between wired or wireless terminals in the store;
d) a charging station for charging a battery of the mobile terminal for worker and accessing the host server;
e) a plurality of shopping carts; and
f) a store terminal connected to the wired or wireless communication network for processing the shopping task of the worker.

18. The system of claim 15, wherein the host server comprises
a) a computer for relaying transmission and reception of the shopping information between the wired or wireless terminals in the store and analyzing and manipulating the accumulated commodity information and shopping information;

b) a data storing device for storing the shopping information and customer information and providing the commodity information and shopping information to the customer;
c) a wired or wireless communication network for exchanging the information among the wired or wireless terminals; and
d) an Internet for a data communication with an external device outside of the store.

19. The system of claim 15, wherein, in order to register and pay, obtain a commodity information, and to communicate a shopping request information with other corresponding terminals, the hand-held terminal for customer comprises
   a) a bar-code or RF reader for inputting the commodity information of the sample item in the sample item display section;
   b) a card reader in a type of magnetic-tape or RF recognition for inputting information on the customer's credit card or membership card;
   c) an RF or IR transceiver for a wireless data communication with the host server or the mobile terminal for worker;
   d) an interface for a wired data communication with the host server;
   e) a control device and output device comprising a keypad, a touch (pen) screen, and LCD panel;
   f) a power supply or charging device comprising a battery and charging port;
   g) a central processing unit for operating and controlling the system;
   h) a memory device for storing software and data for operating the system; and
   i) an alarming device for representing the status of operation with sound and light.

20. The system of claim 15, wherein the hand-held terminal for customer comprises a hand-held terminal, wherein the hand-held terminal normally works with original functions and works as an hand-held terminal for customer when shopping in the sample item display section of the store, wherein the hand-held terminal comprises a central processing unit for original functions and a plurality of auxiliary devices including a data storing device, an output device, a control device, a power supply device, and an alarm sound/light device, wherein the hand-held terminal is combined with a built-in or external module comprising a central processing unit for original functions the hand-held terminal for customer and a plurality of auxiliary devices including a host server, a data communication device for communicating with the mobile terminal for worker, and a data scanning device for obtaining the commodity information and credit information, wherein the hand-held terminal shares the auxiliary devices including a data storing device, an output device, a control device, a power supply device, an alarm sound/light device.

21. The system of claim 15, wherein the mobile terminal for worker performing a shopping operation including obtaining of a commodity information and communicating the shopping information with a corresponding terminal, comprises
   a) a bar-code or RF reader for inputting the commodity information of the commodity item in the commodity item display section;
   b) an RF or IR transceiver for a wireless data communication with the host server or the hand-held terminal;
   c) an interface for a wired data communication with the host server;
   d) a control device and output device comprising a keypad, a touch (pen) screen, and LCD panel;
   e) a power supply or charging device comprising a battery and charging port;
   f) a central processing unit for operating and controlling the system;
   g) a memory device for storing software and data for operating the system;
   h) a message-received alarm device comprising an alarm lamp or buzzer to acknowledge a reception of a message from the host server or the hand-held terminal; and
   i) an alarming device for representing the status of operation with sound and light.

22. The system of claim 15, wherein the charging station comprises a charging port for charging the battery of the terminals and a server interface for a wired communication with the host server, wherein the charging station further comprises an alarm device for informing the operation request of the mobile terminal for worker.

23. The system of claim 15, wherein the wired communication network comprises auxiliary devices including a wireless LAN interface, an interface to the hand-held terminal for customer, a customer terminal, a counter terminal, a store terminal, a printer, a card reader, and an RF reader at an end, and performs a wired or wireless communication among the host server and the auxiliary devices.

24. The system of claim 15, wherein each of the hand-held terminal for customer and mobile terminal for worker comprises an original identification information including an identification number and owner's credit information, wherein the host server produces a new additional identification number from the original identification information and assigns the new additional identification number in a wired or wireless communication with the hand-held terminal for customer or the mobile terminal for worker, wherein the host server recognizes a specific hand-held terminal for customer or mobile terminal for worker by the new additional identification number.

25. The system of claim 15, wherein the host server checks the version of the commodity information file stored in the built-in memories of the hand-held terminal for customer, and the mobile terminal for worker and upgrades with a latest version.

26. The system of claim 15, wherein the hand-held terminal for customer, and the mobile terminal for worker are switched on automatically or manually, boot up, and display a predetermined initial screen when detached from the charging stations.

27. The system of claim 15, wherein the host server issues an alarm to request starting operation to the mobile terminal for worker on the POPT charging station, when the host server detects the detachment of the hand-held terminal for customer from the RSC charging station or receives the personal or credit information of the hand-held terminal for customer.

28. The system of claim 15, wherein the host server recognizes the identification numbers of the hand-held terminal for customer, the mobile terminal for worker, and cart, and establishes a shopping unit with the set of the identification numbers.

29. The system of claim 15, wherein the host server receives the personal or credit information from the hand-held terminal, categorizes the customer into new, present, or anonymous, produces a shopping information customized to the customer, and sends the shopping information to the hand-held terminal for customer.

30. The system of claim 15, wherein the commodity information displayed on the hand-held terminal for customer to verify is retrieved from the built-in memory of the hand-held terminal for customer, from the database of the host server, or from the bar-code or RF tag on the sample item.

31. The system of claim 15, wherein the mobile terminal for worker having an alarm device receives a purchase orders of commodity items, including changing and canceling, issues an alarm, and displays the shopping item list on the mobile terminal for worker.

32. The system of claim 15, wherein inputting the commodity information into the mobile terminal for worker is allowed under the condition that the commodity information matches with the information on the commodity items, including changing and canceling, received from the hand-held terminal for customer, and the processed result of the information on the commodity items, including changing and canceling, is sent in real-time to the hand-held terminal for customer.

33. The system of claim 15, wherein when the hand-held terminal for customer sends out the shopping-ended message the host server issues message-received alarm to the hand-held terminal for customer, the mobile terminal for worker sends a cart's waiting-at-exit message to the hand-held terminal for customer, the host server sends a pay-requesting message to the hand-held terminal for customer, and the hand-held terminal for customer sends a pay-approved message to a host server through a wired or wireless communication network.

34. The system of claim 15, wherein on receiving the pay-approved message the host server sends a receipt or an identification number of a cart for picking up of items to the hand-held terminal for customer.

35. The system of claim 15, further comprising an Internet VR (virtual reality) shopping mall connected the host server through a wired or wireless Internet for an Internet shopping, wherein the Internet VR shopping mall displays VR commodities corresponding to the commodity in the sample item display section, wherein a customer accesses the Internet VR shopping mall with a computer or a wireless hand-held communication device and sends the shopping-request information to the host server, wherein the host server sends a collect-shopping-item message with a shopping order information from the customer to the mobile terminal for worker before a preferred shipping date, wherein the mobile terminal for worker takes the commodity information, collects the ordered shopping items, downloads a receipt and a shipping information, prints out in a printer, attaches the receipt and the shipping information on a shipping box, and sends out the shipping box.

36. The system of claim 15, further comprising a sample item display rack and a weighing machine with a function of printing a commodity information inside the sample item display section, and a conveyor system 996 connected to the commodity item display section, for providing a sales service combined with a customer's self-packing, wherein an Internet shopping is provided by measuring the packed shopping item with the weighing machine, attaching the commodity information including name of item, weight, and shopping time printed by the weighing machine, inputting and sending the commodity information, moving the shopped items to the commodity item display section with the conveyor system 996, having the customer to collect the items corresponding to the commodity information the mobile terminal for worker received in the cart.

37. The system of claim 15, wherein the host server comprises a module to analyze the shopping pattern of the customer using the customer's shopping history and a module to produce and send out to the customer a list of commodity the customer is expected to purchase or to provide the list of commodity to the hand-held terminal for customer through the internal communication network.

38. The system of claim 15, wherein the system comprises a customer terminal, a hand-held terminal interface, a card reader, a printer, and auxiliary devices in the sample item display section, wherein the system further comprises a store terminal and a printer in the commodity item display section, wherein the shopping is done by:
 a) the customer's determining shopping items by searching the commodity information that the host server provided, or by searching the accumulated commodity list obtained by connecting the hand-held terminal for customer to the hand-held terminal interface;
 b) the customer's approving the paying of the ordered items by inputting the credit card information through the card reader or by sending the credit information stored in the hand-held terminal for customer connected to the host server;
 c) the host server's recognizing the mobile terminal for worker that was detached from the charging station and installed on the cart, and sending the order number and the shopping list of the customer to the mobile terminal for worker;
 d) the mobile terminal's collecting the ordered items and inputting the commodity information, and sending the shopping-ended message to the host server;
 e) the host server's sending the shopping-ended message to hand-held terminal for customer, and attaching the order information printed by the printer on the package box; and
 f) the customer's displaying the order number and picking up the package box at the commodity pick-up window.

39. The system of claim 15, wherein each of the hand-held terminal for customer, and the mobile terminal for worker comprises a paging device to talk with a store clerk and the paging device is installed at a plurality of locations in the store.

40. The system of claim 15, wherein the hand-held terminal comprises an RFID tag storing an identification information of hand-held terminal, wherein the system further comprises a plurality of RF readers at predetermined locations and the entrance of the store, wherein the customer's location is tracked down and a movement outside of the store is monitored by reading the identification information of the hand-held terminal with the RF reader.

* * * * *